(12) United States Patent
Beshai

(10) Patent No.: US 12,273,228 B2
(45) Date of Patent: Apr. 8, 2025

(54) DEEP FUSING OF CLOS STAR NETWORKS TO FORM A GLOBAL CONTIGUOUS WEB

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 240 days.

(21) Appl. No.: 18/126,439

(22) Filed: Mar. 26, 2023

(65) Prior Publication Data
US 2023/0308336 A1    Sep. 28, 2023

Related U.S. Application Data

(63) Continuation-in-part of application No. 17/555,444, filed on Dec. 18, 2021, now Pat. No. 11,616,735.

(51) Int. Cl.
*H04B 10/00* (2013.01)
*H04L 27/26* (2006.01)
*H04L 27/34* (2006.01)

(52) U.S. Cl.
CPC .... *H04L 27/3472* (2013.01); *H04L 27/26532* (2021.01)

(58) Field of Classification Search
CPC . H04L 27/3472; H04L 27/26532; H04J 14/08
See application file for complete search history.

(56) References Cited

U.S. PATENT DOCUMENTS

| | | | | |
|---|---|---|---|---|
| 6,487,177 B1* | 11/2002 | Weston-Dawkes | ..... | H04L 45/04 370/254 |
| 6,567,429 B1* | 5/2003 | DeMartino | ......... | H04J 14/0307 398/43 |
| 7,016,608 B1* | 3/2006 | Ball | ..... | H04J 14/0282 398/58 |
| 7,313,094 B2* | 12/2007 | Oki | ..... | H04L 45/70 370/252 |
| 7,587,516 B2* | 9/2009 | Bhanot | ..... | G06F 9/526 370/395.31 |
| 7,613,187 B2* | 11/2009 | Choi | ..... | H04Q 11/0067 398/58 |
| 8,107,458 B1* | 1/2012 | Ranganathan | ..... | H04L 45/306 370/254 |
| 8,406,128 B1* | 3/2013 | Brar | ..... | H04L 49/1515 370/229 |
| 8,428,457 B2* | 4/2013 | Mizutani | ..... | H04Q 11/0067 398/43 |

(Continued)

*Primary Examiner* — Agustin Bello

(57) ABSTRACT

Numerous Clos Star Networks (CSNs), each constructed as a set of connectors providing single-hop paths for each pair of access nodes of a respective access group, are fused to form a large-scale global network providing at least one single-hop path for each pair of access nodes of the formed global network. The access groups are arranged into access bands of multiple access groups each. Connectors of CSNs are paired to form distributors so that each access node has multiple parallel single-hop paths to each other access node of the same access band and one single-hop path to each access node of each other access band. The distributors are clustered into a set of geographically-spread constellations and each access node of the global network has a direct multichannel link to each of a respective subset of constellations thus entirely eliminating use of cross connectors and significantly simplifying the network structure.

21 Claims, 49 Drawing Sheets

(56) References Cited

U.S. PATENT DOCUMENTS

| | | | | |
|---|---|---|---|---|
| 8,972,603 B1* | 3/2015 | Brandwine | H04L 1/0045 | 370/399 |
| 9,407,576 B1* | 8/2016 | Brar | H04L 49/15 | |
| 9,571,421 B1* | 2/2017 | Brar | H04L 49/15 | |
| 9,647,792 B2* | 5/2017 | Beshai | H04Q 11/0005 | |
| 10,412,472 B2* | 9/2019 | Beshai | H04J 14/0278 | |
| 11,146,349 B2* | 10/2021 | Shahriar | H04J 14/0267 | |
| 2003/0020982 A1* | 1/2003 | Rychlicki | H04L 45/00 | 398/79 |
| 2003/0156536 A1* | 8/2003 | Oki | H04L 45/50 | 370/254 |
| 2005/0002405 A1* | 1/2005 | Gao | H04N 21/6405 | 375/E7.025 |
| 2005/0129400 A1* | 6/2005 | Kim | H04J 14/0282 | 398/67 |
| 2006/0126996 A1* | 6/2006 | Beshai | H04Q 11/0005 | 385/17 |
| 2007/0092252 A1* | 4/2007 | Bouda | H04J 14/0232 | 398/72 |
| 2007/0248009 A1* | 10/2007 | Petersen | H04L 12/4633 | 370/412 |
| 2010/0239257 A1* | 9/2010 | Grossman | H04J 14/0282 | 398/68 |
| 2010/0254703 A1* | 10/2010 | Kirkpatrick | H04Q 11/0005 | 398/45 |
| 2011/0087799 A1* | 4/2011 | Padhye | H05K 7/1498 | 398/43 |
| 2011/0228767 A1* | 9/2011 | Singla | H04L 49/118 | 370/389 |
| 2012/0250574 A1* | 10/2012 | Marr | H04L 41/12 | 370/254 |
| 2012/0257616 A1* | 10/2012 | Beshai | H04J 14/0267 | 370/352 |
| 2012/0257636 A1* | 10/2012 | Beshai | H04J 14/0267 | 370/401 |
| 2012/0257637 A1* | 10/2012 | Beshai | H04J 14/0267 | 370/401 |
| 2012/0320753 A1* | 12/2012 | Vasseur | H04L 47/122 | 370/237 |
| 2014/0160939 A1* | 6/2014 | Arad | H04L 45/16 | 370/237 |
| 2014/0369184 A1* | 12/2014 | Keesara | H04L 12/4662 | 370/221 |
| 2015/0236980 A1* | 8/2015 | Brar | H04L 12/66 | 370/400 |
| 2015/0304046 A1* | 10/2015 | Kramer | H04B 10/25 | 398/66 |
| 2018/0287818 A1* | 10/2018 | Goel | H04L 49/10 | |
| 2018/0288505 A1* | 10/2018 | Sindhu | H04L 49/1584 | |
| 2018/0375760 A1* | 12/2018 | Saavedra | H04L 63/166 | |
| 2019/0014397 A1* | 1/2019 | Beshai | H04J 14/0284 | |
| 2020/0077166 A1* | 3/2020 | Beshai | H04J 14/0284 | |
| 2021/0067850 A1* | 3/2021 | Beshai | H04Q 11/0005 | |
| 2021/0235173 A1* | 7/2021 | Sindhu | H04Q 11/0066 | |
| 2022/0116339 A1* | 4/2022 | Beshai | H04L 5/0098 | |
| 2023/0088539 A1* | 3/2023 | Beshai | H04Q 11/0067 | 398/49 |
| 2023/0308336 A1* | 9/2023 | Beshai | H04L 27/26532 | |

* cited by examiner

| | | Distributor | | | |
|---|---|---|---|---|---|
| S(2,0) | S(0,1) | S(3,2) | S(1,3) | S(4,4) | |
| P,0,2 | P,0,0 | P,0,3 | P,0,1 | P,0,4 | |
| P,1,2 | P,1,4 | P,1,1 | P,1,3 | P,1,0 | |
| P,2,2 | P,2,3 | P,2,4 | P,2,0 | P,2,1 | |
| P,3,2 | P,3,2 | P,3,2 | P,3,2 | P,3,2 | |
| P,4,2 | P,4,1 | P,4,0 | P,4,4 | P,4,3 | |
| R,0,0 | R,1,0 | R,2,0 | R,3,0 | R,4,0 | |
| R,0,1 | R,1,1 | R,2,1 | R,3,1 | R,4,1 | |
| R,0,2 | R,1,2 | R,2,2 | R,3,2 | R,4,2 | |
| R,0,3 | R,1,3 | R,2,3 | R,3,3 | R,4,3 | |
| R,0,4 | R,1,4 | R,2,4 | R,3,4 | R,4,4 | |

2500 Access nodes to which a selected access node (P,3,2) connects through constellation Θ(P,R) of FIG. 23

2510 Distributors within constellation

2520 Access nodes belonging to access-band P $0 \leq P < R < \Pi$

2525 Access nodes of access-band R

DEEP FUSING OF CLOS STAR NETWORKS TO FORM A GLOBAL CONTIGUOUS WEB

CROSS-REFERENCE TO RELATED APPLICATIONS

The present application claims priority to U.S. patent application Ser. No. 17/555,444, filed on Dec. 18, 2021, entitled "Deep fusing of Clos star networks to form a global contiguous web", the specification of which is incorporated herein by reference in its entirety.

FIELD OF THE INVENTION

The invention is related to global data communication, data centers, cloud computing, and edge computing. In particular, the invention is concerned with a network having a large number of access nodes interconnected through distributors, which may be optical-based or electronic-based, and efficient distribution of payload data and control data.

BACKGROUND

A major challenge in the art of telecommunication-network design is the enablement of graceful network growth while maintaining structural simplicity, ease of control, and high performance. There is a need to explore methods and apparatus for meeting the challenge.

SUMMARY

The invention provides a contiguous network comprising a plurality of access nodes interconnected through a plurality of distributors. The plurality of access nodes is arranged into a number $\Pi$ of bands, each band comprising a number $\Omega$ of groups, each group comprising a respective number of access nodes, $\Pi>4$, $\Omega>2$.

Each band is arranged into a first arrangement of $\Omega$ type-1 formations and a second arrangement of $\Omega$ type-2 formations. Each type-1 formation comprises $\Omega$ identical type-1 sets of access nodes of a respective group. Each type-2 formation comprises $\Omega$ type-2 sets of access nodes, each type-2 set comprising one access node of each group. The selection of the access nodes of the type-2 sets ensures that: (1) the sets of each type-2 formation are disjoint; and (2) each type-2 set of any type-2 formation is orthogonal to each type-2 set of each other type-2 formation, having at most a predefined number of common access node. The predefined number is a rounded-up ratio of an upper bound of the respective number of access nodes and the number, $\Omega$, of groups per band.

The plurality of distributors is arranged into a plurality of constellations, each constellation comprising $\Omega^2$ distributors with each pair of bands connecting to a respective constellation. Within a constellation, each type-1 set of each type-1 formation of one band and a respective type-2 set of a respective type-2 formation of another band connect to a respective distributor. Each band, of the $\Pi$ bands, connects to at least one constellation and at most ($\Pi-2$) constellations according to the first arrangement.

Thus, the network provides multiple parallel single-hop paths for each pair of access nodes belonging to a same band and one single-hop path for each pair of access nodes belonging to different bands.

A type-1 formation of a band connecting to a constellation may be paired with any type-2 formation of the other band connecting to the constellation. A distributor may connect to any type-1 set of the type-1 formation and any of the $\Omega$ type-2 sets of the type-2 formation.

Each access node of the plurality of access nodes connects to each constellation of a selected set of ($\Pi-1$) constellations through a respective dual link of $\Omega$ dual channels, where each dual channel connects an access dual port of an access node to a dual port of a respective distributor of a constellation.

Each dual channel connecting an access dual port of an access node to a distributor dual port of a distributor comprises an upstream channel from the access dual port to the distributor dual port and a downstream channel from the distributor dual port to the access dual port. The access dual port is time aligned to the distributor dual port along the upstream channel.

Each access node of the plurality of access nodes comprises dual inner ports connecting to distributors of selected ($\Pi-1$) constellations and dual outer ports connecting to data sources and data sinks through outer dual channels. The dual inner ports connect to the ($\Pi-1$) constellations though respective ($\Pi-1$) dual links of $\Omega$ dual channels each. The collective capacity of the outer dual channels is determined according to a total capacity of the ($\Pi-1$) dual links and a predetermined dilation factor.

Optionally, the network may employ a global controller which may be coupled to a selected access node of the plurality of access nodes.

Each distributor of the plurality of distributors comprises a respective distributing mechanism and a respective distributor controller configured to schedule paths through the respective distributing mechanism. Optionally, a distributor controller may establish a path from an upstream channel originating from an access node coupled to the distributor to a downstream channel directed to the same access node; thus, enabling the access node to test a round-trip path through the distributor.

Each inner dual port of an access node is designated to connect to a respective constellation. Each access node of the plurality of access nodes comprises an access controller configured to determine for each inner dual port of an access node an identifier of a constellation to which the each inner dual port connects.

According to the first arrangement of type-1 formations of a band, an access node of index $\nu$ within a group of index $\gamma$ of a band of index $\beta$, $0 \leq \nu < M(\beta,\gamma)$, $0 \leq \gamma < \Omega$, $0 \leq \beta < \Pi$, $M(\beta,\gamma)$ denoting a predetermined number of access nodes within a group of index $\gamma$ of a band of index $\beta$, is allocated to $\Omega$ type-1 sets of indices $\rho$, $0 \leq \rho < \Omega$, of a type-1 formation of index $\gamma$, wherein the $\Pi$ bands are indexed sequentially between 0 and ($\Pi-1$), groups within any band are indexed sequentially between 0 and ($\Omega-1$), and access nodes within a group are indexed sequentially in steps of 1.

According to the second arrangement of type-2 formations of a band, an access node of index $\nu$ within a group of index $\gamma$ of a band of index $\beta$, is allocated to $\Omega$ type-2 sets of indices $(\nu+\gamma \times \chi)_{modulo\ \Omega}$, $\chi$ being an index of a type-2 formation, $0 \leq \chi < \Omega$, where $0 \leq \nu < M(\beta,\gamma)$, $0 \leq \gamma < \Omega$, $0 \leq \beta < \Pi$, $M(\beta,\gamma)$ denoting a predetermined number of access nodes within a group of index $\gamma$ of a band of index $\beta$, wherein the $\Pi$ bands are indexed sequentially between 0 and ($\Pi-1$), groups within any band are indexed sequentially between 0 and ($\Omega-1$), and access nodes within a group are indexed sequentially in steps of 1.

According to the first arrangement, a type-1 set of index $\rho$ of a type-1 formation of index $\chi$, of a band of index $\beta$, $0 \leq \rho < \Omega$, $0 \leq \chi < \Omega$, $0 \leq \beta < \Pi$, comprises a number $M(\beta,\gamma)$ of access nodes of indices $(\beta,\gamma,\nu)$ where $\gamma=\chi$, and $0\le\nu<M(\beta,\gamma)$, wherein the $\Pi$ bands are indexed sequentially between 0 and $(\Pi-1)$, groups within any band are indexed sequentially between 0 and $(\Omega-1)$, and access nodes within a group are indexed sequentially in steps of 1.

According to the second arrangement, a type-2 set of index $\rho$ of a type-2 formation of index $\chi$, of a band of index $\beta$, $0\le\rho<\Omega$, $0\le\chi<\Omega$, $0\le\beta<\Pi$, comprises a number $M(\beta,\gamma)$ of access nodes of indices $(\beta,\gamma,\nu)$ where for each value of $\gamma$, $0\le\gamma<\Omega$, there are $(J+1)$ values of $\nu$ determined as:

$$((\rho-\gamma\times\chi)_{modulo\,\Omega},+J\times(\Omega), 0\le J<\lceil M(\beta,\gamma)/\Omega\rceil],$$

wherein the $\Pi$ bands are indexed sequentially between 0 and $(\Pi-1)$, groups within any band are indexed sequentially between 0 and $(\Omega-1)$, and access nodes within a group are indexed sequentially in steps of 1.

In an implementation of the network, at least one distributor of the plurality of distributors is configured as an optical distributor comprising: an optical distributing mechanism having a plurality of input ports and a plurality of output ports; an optical temporal multiplexer; an optical temporal demultiplexer; a distributor controller; a time indicator; a plurality of optical splitters, and a plurality of optical combiners.

Each optical splitter directs an upstream optical signal, originating from a respective access node to a respective input port and to the optical temporal multiplexer. The optical combiners cyclically connect to the distributor controller through the optical temporal demultiplexer. The optical temporal multiplexer is configured to cyclically connect the plurality of optical splitters to the distributor controller, during designated time slots, through an optical-to-electrical converter. Each optical combiner is configured to insert a respective downstream message from the distributor controller into a respective downstream signal directed from a respective output port to a corresponding access node.

In another implementation of the network, at least one distributor of the plurality of distributors is configured as an optical distributor comprising an optical distributing mechanism and a distributor controller.

The optical distributing mechanism comprises a plurality of input ports for receiving upstream optical signals originating from respective access nodes, a plurality of output ports for sending downstream optical signals to the respective access nodes, an upstream control port; and a downstream control port. Each upstream optical signal is organized into segments, each segment occupying a time slot of a predefined duration. The distributor controller is coupled to a steering controller, a time indicator, the upstream control port, and the downstream control port. The distributor controller is configured to exchange control messages with the respective access nodes and schedule paths establishment through the optical distributing mechanism.

The steering controller is configured to:
(a) direct signals from the input ports to the output ports, through the optical distributing mechanism, according to instructions from the distributor controller;
(b) cyclically direct upstream control signals from the input ports to the upstream control port during designated time slots; and
(c) cyclically direct downstream control signals from the downstream control port to the output ports.

In a further implementation of the network, at least one distributor of the plurality of distributors is configured as an electronic distributor comprising: an electronic distributing mechanism having a plurality of input ports and a plurality of output ports; a plurality of optical-to-electrical converters for detecting baseband signals from upstream optical signals received from a number of access nodes, a plurality of 1:2 fan-out units; a plurality of 2:1 temporal multiplexers; an electronic temporal multiplexer; an electronic temporal demultiplexer; a distributor controller; and a time indicator.

Each optical-to-electrical converter is coupled to a respective fan-out unit connecting to a buffer preceding a respective input port and to the electronic temporal multiplexer. The electronic temporal multiplexer is configured to cyclically connect the plurality of fan-out units to the distributor controller, during designated time slots. The electronic temporal demultiplexer cyclically connects the distributor controller to the 2:1 temporal multiplexers. Each 2:1 temporal multiplexer is configured to insert, during a respective control time slot, a respective control message from the distributor controller into a respective downstream signal directed from a respective output port to a respective access node.

In an additional implementation of the network, at least one distributor of the plurality of distributors is configured as an electronic distributor comprising:
(i) a plurality of optical-to-electrical converters for detecting baseband signals from upstream optical signals received from a plurality of access nodes;
(ii) a plurality of input buffers;
(iii) an electronic distributing mechanism having a plurality of input ports, a plurality of output ports, an upstream control port, and a downstream control port; and
(iv) a distributor controller coupled to a steering controller, a time indicator, the upstream control port, and the downstream control port.

The distributor controller is configured to exchange control messages with the access nodes and schedule paths establishment through the electronic distributing mechanism.

The steering controller is configured to:
(A) direct signals from the input ports to the output ports, through the electronic distributing mechanism, according to instructions from the distributor controller;
(B) cyclically direct upstream control signals from the input ports to the upstream control port during designated time slots; and
(C) cyclically direct downstream control signals from the downstream control port to the output ports.

Each input port is coupled to a respective input buffer. Each output port is coupled to a respective electrical-to-optical converter coupled to a respective downstream optical channel to a respective access node.

For each of the four implementations of distributors, in order to time-align an output port of a particular access node to the distributor to which the output port connects, each upstream optical signal originating from the particular access node is organized into segments, including content segments and control segments, each segment occupying a time slot of a predefined duration. Each segment contains two identical identifiers of the particular access node starting at designated time instants within a respective time slot. The distributor controller is configured to:
(1) extract one of the two identical identifiers during a respective designated control time slot;
(2) determine an arrival time of the extracted identifier according to the time indicator; and
(3) determine a magnitude of discrepancy between the arrival time and a respective designated time instant.

If the magnitude of discrepancy exceeds a prescribed threshold, the distributor controller communicates a value of the discrepancy to the particular access node to adjust transmission time accordingly.

BRIEF DESCRIPTION OF THE DRAWINGS

Features and implementations will be further described with reference to the accompanying exemplary drawings, in which:

FIG. 25 tabulates access nodes to which a specific access node connects through respective single-hop paths;

FIG. 27 is a continuation of FIG. 26;

TERMINOLOGY

Figure 1:
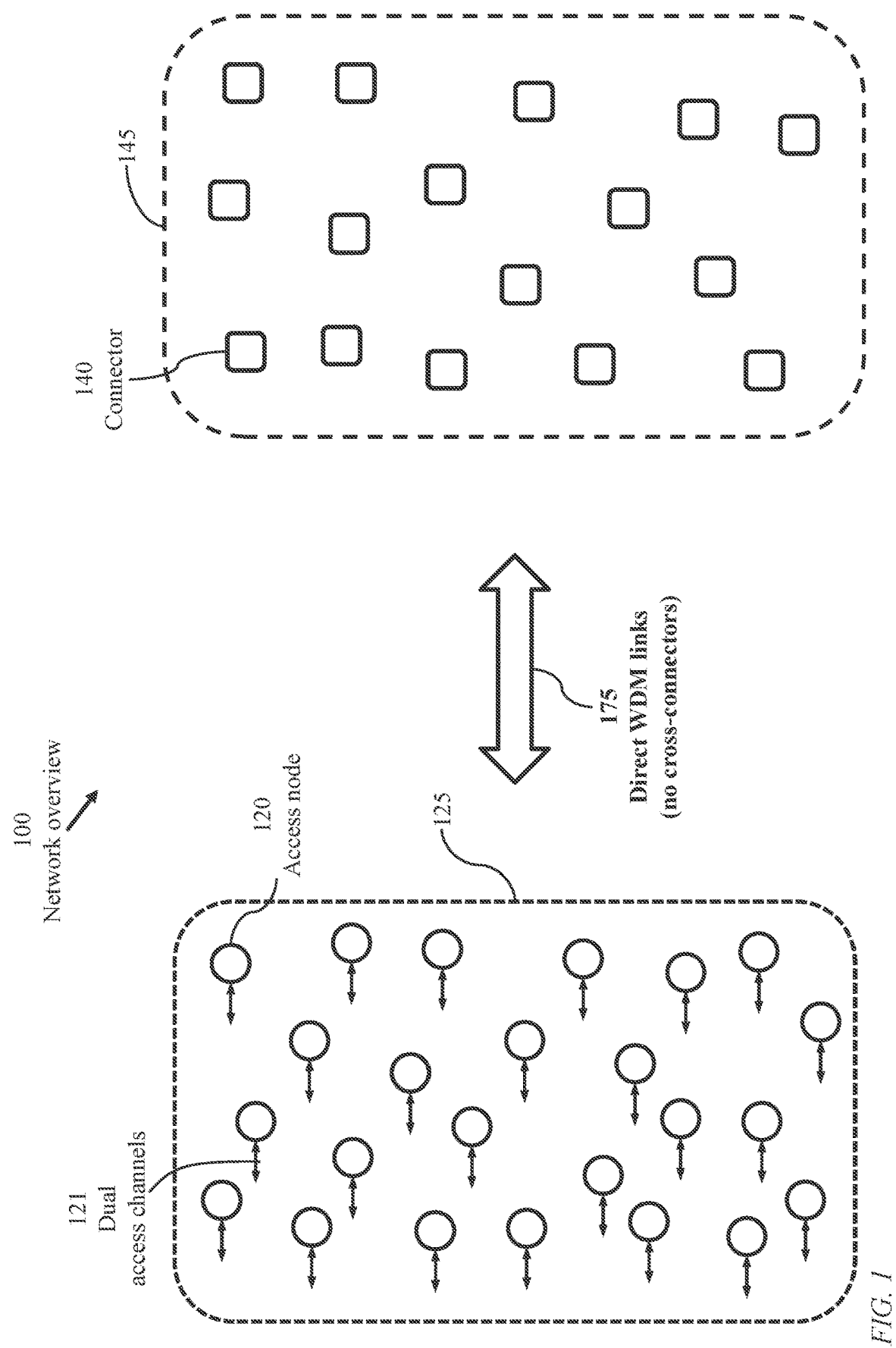
FIG. 1 illustrates a network of a plurality of access nodes exchanging data through a plurality of connectors through direct links.

Terms used in the present specification are defined below.

Access node: A switching device connecting to data sources and data sinks, and configured to transfer data from the data sources to a distributor and transfer data from a distributor to the data sinks is referenced as an access node or an edge node, each access node comprises a respective access controller.

Access group: An access group comprises a number of access nodes that connect to each distributor of a respective set of distributors. The number of access nodes per access group may vary from one access group to another. In order to simplify addressing of access nodes in a growing network, the number of access nodes per access group is limited to a predefined upper bound. An access group is also referenced as "group".

Access-group size: The number of access nodes of an access group is referenced as the access-group size.

Access band: The accesses nodes of the entire network are arranged into access groups. The access groups are arranged into a plurality of access bands, each access band comprising a predetermined number of access groups. An access band is also referenced as "band".

Formations: An access band is arranged into formations of access nodes.

Switch: A switch comprises a switching mechanism for transferring data from a set of input ports to a set of output ports. In the switching system of the present application, a switch transfers data from one set of access nodes connecting to input ports of the switch to another set, or the same set, of access nodes connecting to output ports of the switch. A switch may use an electronic or a photonic switching mechanism.

Distributor: A device comprising a plurality of input ports and a plurality of output ports where any input port may transfer data to any output port is herein referenced as a distributor. The transfer of data may be selective or cyclic. A distributor configured to transfer data from any input port to selected output port is conventionally called a "switch, as defined above. A distributor configured to cyclically transfer data from each input port to each output port is conventionally called a "rotator". Thus, the term "distributor" refers to either a switch or a rotator. Certain architectural aspects of the contiguous network of the present invention are independent of the type of distributor. Each distributor comprises a respective distributor controller.

Dual channel: A dual channel comprises two channels of opposite directions.

Dual port: A dual port comprises a sending port and a receiving port.

Access dual port: A dual port of an access node is referenced as "an access dual port".

Distributor dual port: A dual port of a distributor (switching device interconnecting access nodes) is referenced as a "distributor dual port".

Inner dual port: An access dual port of an access node connecting to a dual channel directed to a distributor (within a constellation) is referenced as an "inner dual port".

Outer dual port: An access dual port of an access node connecting to a dual channel directed to external data sources and sinks is referenced as an "outer dual port".

Inner dual link: An inner dual link comprises a number of dual channels connecting to inner dual ports of an access node.

Dilation factor: A dilation factor is a ratio of the collective capacity of inner ports to the collective capacity of outer ports of an access node.

Dimension of an access node or a distributor: The number of dual ports of any switching, routing, or generally distributing, device used for receiving and transmitting content data defines a "dimension" of the device. A device may also support dual ports used for control purposes.

Single-hop path: The term refers to a path from one access node to another traversing only one distributor.

Adjacent: Two access nodes are said to be adjacent if there is a path traversing only one distributor connecting the two access nodes Disjoint: Two sets of access nodes are said to be disjoint if the two sets have no common access nodes Orthogonal: Two sets of access nodes are said to be orthogonal if the two sets have at most a predefined number of common access node.

Upstream: The direction from an access node to a distributor is referenced as an upstream direction Downstream: The direction from a distributor to an access node is referenced as an upstream direction.

Upstream path: A path (a channel) from an access node to a distributor is referenced as an upstream path.

Downstream path: A path (a channel) from a distributor to an access node is referenced as a downstream path.

Star network: The term refers to a network comprising a plurality of access nodes interconnected through a single connector, which may be a switch, a router, or a simple rotator. The plurality of access nodes is said to form an access group.

Clos Star network (CSN): A network comprising multiple independent connectors (switches, routers, rotators, or a mixture thereof) of equal dimensions (i.e., each having a same number of dual ports) interconnecting access nodes of an access group is said to form a Clos Star Network (CSN). Each access node has multiple parallel single-hop paths to each other access node of the access group, the number of single-hop paths being equal to the number of connectors. The connector dimension dictates the number of access nodes of the access group. For an electronic connector, the dimension may vary over a very wide range; 16 to 8192, for example. For a fast optical connector, the dimension would be limited to 128, or so, with the present state of the art.

Three-stage network: The terms "Clos star network" and "three-stage network" are used synonymously in the present application.

First-order distributor: A first-order distributor connects to access nodes belonging to two access groups Second-order distributor: A second-order distributor connects to access nodes of more than two access groups First-order Fusing of CSNs: Merging each connector of each CSN with one connector of each other CSN, of a plurality of CSNs, to share a common distributing mechanism of a respective distributor, is herein referenced as "first-order fusing". First-order fusing forms a contiguous network where each access node of each CSN has one single-hop path to each access node of each other CSN while still having a number of parallel single-hop paths, equal to the number of connectors per CSN, to neighboring access nodes of the same CSN. Thus, first-order-fusing of 120 CSNs, each CSN comprising 100 access nodes, for example, forms a network of 12000 access nodes where each access node of each CSN has 119 parallel single-hop paths to each other access node of the same CSN and one single-hop paths to each of the remaining 11900 access nodes.

Second-order Fusing of CSNs: Merging connectors of a plurality of CSNs to form a plurality of distributors, so that the dual ports of each distributor connect to all access nodes of only one CSN and selected access nodes from each of a predefined number of other CSNs, is herein referenced as "second-order fusing". Second-order fusing forms a contiguous network where each access node of each CSN has multiple parallel single-hop paths to each access node of a band of several access groups. For example, selected the predefined number of access groups of the band to be 24, second-order-fusing forms a network of 12000 access nodes where each access node of a community of 2400 access nodes has multiple parallel single-hop paths to each other access node of the community and one single-hop paths to each of the remaining 9600 access nodes of the network.

Deep fusing: Second-order fusing as defined above, or variants thereof, are referenced as "deep fusing".

Constellation of distributors: A number of distributors may be spatially collocated to enable direct communication with access nodes through wavelength-division-multiplexed (WDM) links avoiding the need for intermediate spectral routers.

First-order constellation: A constellation of distributors that are configured to perform first-order fusing is referenced as a "first-order constellation"

Second-order constellation: A constellation of distributors that are configured to perform second-order fusing is referenced as a "second-order constellation".

Type-I second-order fusing: Within a second-order constellation fusing a first access band and a second access band, type-I second-order fusing requires that each distributor of the constellation connect to at least one access node of each access group of the second access band and all access nodes of one access group of the first access band.

Type-II second-order fusing: Within a second-order constellation fusing a first access band and a second access band, type-II second-order fusing requires that each distributor of the constellation connect to at least one access node of each access group of the first access band and all access nodes of one access group of the second access band.

Distributor identifier: In the contiguous-network configurations described in the present application, a distributor connects to access nodes of different CSNs. The total number of CSNs, hence the total number of access groups, in the entire network is denoted "$\mu$", $\mu \gg 1$. The value of $\mu$ may vary between 20 and 2000, for example. The $\mu$ access groups of the entire network are denoted $\{G_0, G_1, \ldots, G_{\mu-1}\}$.

A distributor connecting to access nodes of only two access groups, to realize first-order fusing of CSNs, may be identified according to the constituent access groups. Thus, a distributor connecting to access groups $G_x$ and $G_y$, $0 \leq G_x < \mu$, $0 \leq G_y < \mu$, may be identified as $D(G_x, G_y)$.

With second-order fusing (deep fusing) of CSNs, a distributor connects to dual channels from multiple (more than two) access groups. Additionally, in both first-order fusing and second-order fusing, the network distributors are arranged into constellations. Thus, within a constellation, a distributor is preferably identified according to position within the constellation. A constellation connects to two access bands each band comprising a number, $\Omega$, of access groups and comprises $\Omega$ distributors arranged into a matrix of $\Omega$ rows and $\Omega$ columns. A distributor, within the constellation is preferable referenced as $S(\rho, \chi)$, $0 \leq \rho < \Omega$, $0 \leq \chi < \Omega$, $\rho$ denoting a row number and $\chi$ denoting a column number.

Fully populated constellation: A constellation connecting to a pair of access bands where each access group of the pair of access bands is fully populated, i.e., having a number of access nodes less than a predefined target value is referenced as a "fully-populated" constellation.

Partially populated constellation: A constellation connecting to a pair of access bands where any access group of the pair of access bands has a number of access nodes less than a predefined target value is a "partially-populated" constellation. The two access bands connecting to a population may include access groups that are provisioned at a small fraction of an envisaged target size then grow gradually, thus enabling graceful network growth without disturbing current network operations.

Contiguous network: A network supporting access nodes interconnected through distributors in which any access node may transfer data to any other access node through a path traversing only one distributor is herein referenced as a "contiguous network).

Global network: A network comprising a large number of nodes covering a wide geographical area is traditionally referenced as a global network.

Content port: A content port is a distributor port connecting to an access node. A dual content port comprises an input content port configured to receive content data (payload data) as well as control data from an access node and an output content port configured to transmit content data as well as control data to an access node.

Control port: A control port is a dual port, having an input side and an output side, configured to receive control data from a distributor controller and transmit control data to the distributor controller.

Spectral band: The term refers to a frequency band (bandwidth) occupied by a signal in a transmission medium, such as a fiber-optic link.

Dual channel: A dual channel comprises a channel from a first device to a second device and a channel from the second device to the first device. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Multichannel link: The term refers to a transmission link comprising multiple channels-a wavelength-division-multiplexed link (WDM link) carrying multiple spectral bands is a multichannel link.

Dual multichannel link: The term refers to a transmission link comprising multiple dual channels where a dual channel comprises two channels of opposite transmission directions. A dual multichannel link may comprise two physical links of opposite transmission directions.

Dimension of a distributor: The number of input ports and output ports, excluding ports used exclusively for control purposes, defines a "dimension" of a switch. The input ports and output ports of a switch handle payload data (content data) while a control inlet or a control outlet of a switch handle control data relevant to scheduling and timing.

Collocation: The term refers to spatial proximity of devices which may be interconnected using relatively short links, such as fiber links each carrying a single spectral band.

In some implementations, the lengths of the (short) links may be selected to equalize propagation delays.

Spectral multiplexer: A spectral multiplexer combines spectral bands of separate input channels onto an output wavelength-division-multiplexed link (WDM link).

Spectral demultiplexer: A spectral demultiplexer directs individual spectral bands of an input WDM link to separate output channels.

Time alignment: A process of adjusting transmission time of data at an access node to meet a requisite receiving time at a respective distributor.

Monitoring period: The time domain is organised into monitoring periods, each monitoring period comprising a predefined number of time slots. During each monitoring period, each input port of a distributor has access to a controller of the distributor during a respective reserved time slot for periodic verification of signal temporal alignment.

Scheduling period: A scheduling period comprises an integer multiple of monitoring periods. Allocating a flow rate for a data stream may be based on allocating a number of time slots per scheduling period.

Control segment versus content segment: A data stream is preferably organized into segments including control segments and content segments. Each segment is transferred during a single time slot. A control segment is directed to a controller of a distributor while a content segment is directed to an output port of a distributor. The segments of a data stream are preferably indexed sequentially so that segments of a data stream transferred during a scheduling period of N time slots are indexed as sequentially as 0, 1, . . . , (N−1).

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "access controller", "switch controller", or "global controller" is a hardware entity.

Software instructions: The term refers to processor-executable instructions which may be applied to cause a processor to perform specific functions.

Configuring a controller or a processor: The term refers to an action of installing appropriate software for a specific function.

Spectral router: A spectral router (also called "wavelength router") is a passive device connecting a number of input WDM links to a number of output WDM links where each output WDM link carries a spectral band from each input WDM link.

$\lfloor r \rfloor$: $\lfloor r \rfloor$ denotes the nearest integer lower than or equal to a real number "r"; $\lfloor q \rfloor = q$, if "q" is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

$\lceil r \rceil$: $\lceil r \rceil$ denotes the nearest integer higher than or equal to a real number "r"; $\lceil q \rceil = q$, if "q" is an integer Modulo operation: The operation J modulo K, herein denoted $J_{modulo\ K}$, where J is any integer and K is a positive integer is a remainder determined as:

$$J_{modulo\ K} = J - K \times \lfloor J/K \rfloor, \text{ Thus, } 7_{modulo\ 8} = 7,$$
$$(-7)_{modulo\ 8} = \{-7 - (-1) \times 8\} = 1,\ 8_{modulo\ 8} = 0,$$
$$(-8)_{modulo\ 8} = 0,\ 9_{modulo\ 8} = 1,\ \text{and} (-9)_{modulo\ 8} = 7.$$

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

REFERENCE NUMERALS

A reference numeral may individually or collectively refer to items of a same type. A reference numeral may further be indexed to distinguish individual items of a same type.

- 100: Network overview
- 120: An access node
- 121: Access channels
- 125: Plurality of access nodes
- 140: A connector
- 145: Plurality of connectors
- 175: Dual Wavelength-Division-Multiplexed (WDM) links between access nodes and cross connectors
- 200: Overview of alternate network configurations
- 210: Schematic of a network employing cross-connectors
- 250: Schematic of a network configured to avoid use of cross-connectors
- 280: A plurality of cross-connectors
- 300: Network organization based on grouping access nodes into access groups and connectors into connector sets
- 320: Access group of access nodes
- 360: Connector set
- 400: A single Clos star network (CSN)
- 420: A dual channel connecting an access node to a connector
- 430: A set of dual channels 420
- 500: Organization of access nodes into access groups
- 520: An access node similar to access node 120
- 522: Index of an access node within an access group
- 530: A plurality of access groups
- 532: Maximum number of access nodes within an access group 530
- 534: Indices of access groups within a network
- 600: Organization of the access groups 530 into access bands
- 630: Index of an access group 530 within an access band
- 640: Access bands
- 642: Index of an access band within a global network
- 700: A plurality of connectors of a number of independent CSNs (an example, $\Pi=3$, $\Omega=4$))
- 710: Indices of connector sets
- 720: Indices of connectors within a connector set
- 800: Formation of distributors from the plurality 700 of connectors
- 820: A constellation of $\Omega^2$ distributors
- 840: A distributor combining two connectors
- 900: A plurality of connectors of a number of independent CSNs (an example, $\Pi=6$, $\Omega=5$))
- 1000: Formation of distributors from the plurality 900 of connectors
- 1020: A constellation of $\Omega^2$ distributors
- 1040: A distributor combining two connectors
- 1100: Connectivity of access bands to network constellations (an example)
- 1110: A constellation where each distributor is coupled to dual channels from a single group of a first band and dual channels from each group of a second band
- 1120: A constellation where each distributor is coupled to dual channels from a single group of the second band and dual channels from each group of the first band
- 1160: A plurality of constellations of an entire network
- 1200: Connectivity of access bands to network constellations (another example)
- 1210: A constellation where each distributor is coupled to dual channels from a single group of a first band and dual channels from each group of a second band
- 1220: A constellation where each distributor is coupled to dual channels from a single group of the second band and dual channels from each group of the first band
- 1260: A plurality of constellations of an entire network
- 1300: Illustration of inter-group connectivity and intra-group connectivity within a band
- 1400: A first connectivity pattern of access groups to a plurality of distributors to form a contiguous network based on first-order fusing of Clos star networks
- 1420: A plurality of distributors of a global network where each distributor connects to channels of two access groups of different access bands
- 1440: Dual multichannel links between an access group and respective selected distributors
- 1500: A second connectivity pattern of access groups to a plurality of distributors to form a contiguous network based on second-order fusing of Clos star networks
- 1520: A plurality of distributors of a global network where at least one distributor connects to channels of a single access group of one access band as well as channels of multiple access groups of other access bands
- 1540: Dual multichannel links between an access band 640 and respective selected distributors
- 1600: Organization of a plurality of distributors of a network into first-order inter-band constellations as well as second-order inter-band constellations 1635 and 1640
- 1630: A first-order constellation
- 1635: A type-I second-order constellation
- 1640: A type-II second-order constellation
- 1670: A distributor connecting to dual channels from one access group of an access band P and dual channels of one access group of an access band of index R, $0 \le P < R < \Pi$
- 1675: A distributor connecting to dual channels of multiple access groups of an access band R as well as dual channels of a single access group of an access band of index P, $0 \le P < R < \Pi$
- 1680: A distributor connecting to dual channels of multiple access groups of an access band P as well as dual channels of a single access group of an access band of index R, $0 \le P < P < \Pi$
- 1700: Access-nodes connectivity to distributors
- 1710: Dual channels between an access group of a first access band and a first-order distributor
- 1712: Dual channels between an access group of a second access band and the first-order distributor
- 1720: Dual channels between multiple access groups of the first access band and a type-II second-order distributor
- 1722: Dual channels between an access group of the second access band and the type-II second-order distributor
- 1730: Dual channels between an access group of the first access band and a type-I second-order distributor
- 1732: Dual channels between multiple access groups of the second access band and the type-I second-order distributor
- 1800: Representations of a distributor within a constellation connecting two access bands
- 1801: Distributor representation indicating input ports and output ports connecting to access nodes of a first access band, and input ports and output ports connecting to access nodes of a second access band

1802: Distributor representation indicating dual ports connecting to access nodes of the first access band, and dual ports connecting to access nodes of the second access band

1810: Input ports receiving signals from access nodes of the first access band

1820: Output ports transmitting signals to access nodes of the first access band

1812: Input ports receiving signals from access nodes of the second access band

1822: Output ports transmitting signals to access nodes of the second access band

1830: Dual ports, a dual port 1830 combines an input port 1810 and an output port 1820

1840: Dual ports, a dual port 1840 combines an input port 1812 and an output port 1822

1850: Distributing mechanism

1861: Paths from input ports 1810 to output ports 1820 (intra-first-band paths)

1862: Paths from input ports 1812 to output ports 1822 (intra-second-band paths)

1863: Paths from input ports 1810 to output ports 1822 (inter-band paths)

1864: Paths from input ports 1812 to output ports 1820 (inter-band paths)

1900: A first arrangement of type-1 formations

1910: A transposition of the first arrangement

1920: A type-I set of access nodes comprising a group of index 2 of a band of index P

1970: A type-I set of access nodes comprising a group of index 0

1971: A type-I set of access nodes comprising a group of index 1

1973: A type-I set of access nodes comprising a group of index 3

1974: A type-I set of access nodes comprising a group of index 4

2000: A second arrangement of type-2 formations

2010: A type-II set of access nodes comprising an access node from each group of a band P, orthogonal to each other type-II set of access nodes of band P, likewise, 2011, 2012, 2013, and 2014, 2040, 2041, 2042, 2043, and 2044 are type-II sets of access nodes each being orthogonal to each other type-II set of access nodes of band P

2100: Connectivity of access nodes to distributors of an exemplary first-order constellation of five access groups per access band

2110: A formation of a transposed arrangement of type-1 formations connecting to dual ports of a column of distributors within a first-order constellation

2120: A type-1 formation connecting to dual ports of a column of distributors within the first-order constellation

2200: Connectivity pattern of access nodes to distributors of an exemplary type-I second-order constellation of five access groups per access band

2210: A type-1 formation connecting to dual ports of a column of distributors within a type-I second-order constellation

2220: A type-2 formation connecting to dual ports of a column of distributors within the type-I second-order constellation

2300: Connectivity pattern of access nodes to distributors of an exemplary type-II second-order constellation of five access groups per access band

2310: A type-2 formation connecting to dual ports of a column of distributors within a type-II second-order constellation

2320: A type-1 formation connecting to dual ports of a column of distributors within the type-II second-order constellation

2400: A variation of connectivity pattern 2300 with different pairing of type-1 and type-2 formations

2500: Access nodes to which a selected access node connects through respective single-hop paths;

2510: Specific distributors within a constellation

2520: Set of access nodes belonging to access-band P

2525: Set of access nodes belonging to access-band R

2600: Allocation pattern (generic connectivity table) of access nodes to distributors of an exemplary type-II second-order constellation of five access groups per access band and ten access nodes per access group

2610: A type-2 formation connecting to dual ports of a column of distributors within a type-II second-order constellation

2620: A type-1 formation connecting to dual ports of a column of distributors within the type-II second-order constellation

2700: Continuation of 2600

2800: Connectivity of provisioned access nodes to distributors of a partially populated constellation derived from the allocation pattern of FIG. 26 and FIG. 27

2810: A partially-populated type-2 formation 2610

2820: A partially-populated type-1 formation 2620

2900: Continuation of 2800

3000: A method of realizing gradual growth of a constellation

3010: A process of definition of a target (fully-configured) constellation configuration

3020: A process of generating a generic connectivity table as an allocation pattern to distributors of a target (fully-populated) constellation

3025: Data defining initial constellation connectivity

3030: A process of accessing a memory device storing data defining current (partial) constellation connectivity to access nodes

3040: A process of acquiring requisite new access-group sizes (number of access nodes for each access group of two access bands coupled to the constellation)

3050: A process of determining connections from new access nodes to distributors based on the generic connectivity table (process 3020), the current constellation connectivity (process 3030) and requisite new access-group sizes (process 3040)

3060: Processes of updating the data defining current constellation connectivity according to result of process 3050 and storing updated current connectivity data in said memory device

3100: Overview of a contiguous network based on first-order fusing of a large number, u, of Clos star networks

3110: A dual single-hop path for any pair of access nodes belonging to different access groups;

3120: A set of parallel (μ−1) dual single-hop paths for any pair of access nodes within any access group

3130: A pool of disjoint distributors which are generally geographically distributed

3200: Inter-band and inter-band connectivity within a contiguous network based on second-order fusing of a large number of Clos star networks (CSNs)

3210: A dual single-hop path for any pair of access nodes belonging to different access bands
3220: Multiple dual single-hop paths for any pair of access nodes within an access band;
3300: Intra-band connectivity within a contiguous network based on second-order fusing of a large number of CSNs
3310: Multiple dual single-hop paths for any pair of access nodes belonging to different access groups within an access band
3320: Multiple dual single-hop paths for any pair of access nodes belonging to any access group within an access band
3400: A first configuration of an optical distributor
3410: A set of upstream channels from access nodes belonging to a first access band
3412: A set of upstream channels from access nodes belonging to a second access band
3414: Optical splitter
3420: Optical-electrical converter
3422: A time-alignment unit for detecting origination-time indicator and inserting receipt time according to local time indication
3424: Control-data buffer (short buffer)
3430: Distributing mechanism
3431: Input port of distributing mechanism 3430
3432: Output port of distributing mechanism 3430
3435: Steering mechanism
3440: Distributor controller
3445: Time indicator
3450: Electrical-to-optical converter
3460: Temporal demultiplexer
3470: Optical combiner
3490: A set of downstream channels directed to the access nodes belonging to the first access band
3492: A set of downstream channels directed to the access nodes belonging to the second access band
3510: Input-port index
3520: Monitoring period comprising a plurality of content time slots and at least one control time slot
3530: A control data segment (control segment) communicated during a control time slot of the monitoring period
3540: A content data segment (content segment) communicated during a content time slot of the monitoring period
3700: A second configuration of an optical distributor
3720: Temporal multiplexer
3725: Optical-electrical converter
3740: Distributor controller
3800: A third configuration of an optical distributor
3830: Distributing mechanism
3831: Input port connecting to an input channel
3832: Output port connecting to an output channel
3833: Input port, referenced as a downstream control port, connecting to output of distributor controller 3840
3834: Output port, referenced as an upstream control port, connecting to input of distributor controller 3840
3840: Distributor controller
3850: Optical-electrical converter
3852: Electrical-optical converter
3900: Temporal-misalignment of upstream signals
3910: Designated organization of monitoring period 3520 for upstream signals originating from a specific access node connecting to input port of index 2 of distributing mechanism 3430 or 3830
3920: Organization of signal stream received from a specific access node
3930: Designated control time slot for the input port of index 2
3932: Misaligned control time slot
3940: Detected start time of a control time slot within a monitoring period
3960: Detected segment index during designated control time slot 3930
4000: A first configuration of an electronic distributor
4010: An optical-to-electrical converter
4011: A set of upstream channels from access nodes belonging to a first access band
4012: A set of upstream channels from access nodes belonging to a second access band
4014: 1:2 fanout unit
4020: Input buffer, preceding an input port 4031, for holding content data
4022: Unit for detecting upstream data segments from access nodes and inserting receipt times according to local time indication
4025: Control-data buffer (short buffer)
4030: Electronic distributing mechanism
4031: Input port of distributing mechanism 4030
4032: Output port of distributing mechanism 4030
4035: Electronic steering controller
4040: Distributor controller
4045: Local time indicator
4060: Electronic temporal demultiplexer
4070: 2:1 electronic temporal multiplexer
4090: Electrical-to-optical converter
4091: A set of downstream channels directed to the access nodes belonging to the first access band
4092: A set of downstream channels directed to the access nodes belonging to the second access band
4100: Data received from access nodes during designated cyclic monitoring period and corresponding data transferred through electronic distributing mechanism 4030
4120: Designated start time of cyclic monitoring period 3520 (FIG. 35)
4130: Designated start time of data transfer from input buffers 4020 to output ports 4032 through the electronic distributing mechanism 4030
4140: Cyclic time of data-segment reading from a respective input buffer 4020
4150: Cyclic time of data-segment writing in a respective input buffer 4020
4200: A second configuration of an electronic distributor
4220: Optical-to-electrical converter
4224: 1:2 fan-out unit
4226: Electronic temporal multiplexer
4228: Input buffers
4231: Input ports
4232: Output ports
4235: Steering controller
4240: Distributor controller
4270: Electronic temporal demultiplexer
4280: 2:1 temporal multiplexer
4285: Electrical-to-optical converter
4300: A third configuration of a distributor
4331: Input port
4332: Output port
4333: Input port, referenced as a downstream control port, connecting to output of distributor controller 4340
4334: Output port, referenced as an upstream control port, connecting to input of distributor controller 4340
4335: Steering controller 4340: Distributor controller
4400: Connectivity of access bands to network constellations of a network similar to network 1100 where Π=5
4460: Constellations of the network
4500: Division of dual ports of an access node belonging to the band of index 1 into inner dual ports connecting to respective constellations and outer dual ports connecting to data sources and sinks
4540: Dual ports connecting to constellations
4545: (Π−1) dual links of 2 channels each
4550: Dual ports connecting to external data sources and sinks
4555: Dual channels from the access node to the external data sources and sinks
4560: Ω dual channels to constellation C (0,1) of the network of FIG. 44
4561: Ω dual channels to constellation C (1,2) of the network of FIG. 44
4562: Ω dual channels to constellation C (1,3) of the network of FIG. 44
4563: Ω dual channels to constellation C (1,4) of the network of FIG. 44
4600: Single-hop connectivity of a selected access node of the band of index 1 to other access nodes through two constellations $C_1(1,2)$ and $C_1(1,4)$
4610: Access nodes connecting to constellation $C_1(1,2)$.
4620: Access nodes, including the selected access node, connecting to a distributor of $C_1(1,2)$
4630: Access nodes connecting to constellation $C_1(1,4)$.
4640: Access nodes, including the selected access node, connecting to a distributor of $C_1(1,4)$
4650: Access nodes, belonging to the band of index 1, connecting to $C_1(1,2)$ and $C_1(1,4)$
4680: Access nodes of the band of index 2 connecting to $C_1(1,2)$
4690: Access nodes of the band of index 4 connecting to $C_1(1,4)$
4700: Single-hop connectivity of the selected access node of the band of index 1 to other access nodes through two constellations $C_1(0,1)$ and $C_2(1,3)$
4710: Access nodes connecting to constellation $C_1(0,1)$.
4720: Access nodes, including the selected access node, connecting to a distributor of $C_1(0,1)$
4730: Access nodes connecting to constellation $C_2(1,3)$.
4740: Access nodes, including the selected access node, connecting to a distributor of $C_2(1,3)$
4750: Access nodes, belonging to the band of index 1, connecting to $C_1(0,1)$
4755: Access nodes, belonging to the band of index 1, connecting to $C_2(1,3)$
4780: Access nodes of the band of index 3 connecting to $C_2(1,3)$
4790: Access nodes of the band of index 4 connecting to $C_1(0,1)$
4800: Access nodes, of the band of index 1, accessible through single-hop paths of individual ports of the selected access node
4900: Access nodes, of bands of indices 0, 2, 3, and 4, accessible through single-hop paths of individual ports of the selected access node

DETAILED DESCRIPTION

FIG. 1 illustrates a network 200 comprising a plurality 125 of access nodes 120 exchanging signals through a plurality 145 of connectors 140 through direct WDM links 275. Channels from each of the access nodes are routed to respective connectors 140 of the plurality 145 of connectors. A connector 140 may be configured as a switch, a rotator, or a core router.

An access node 120 may connect to respective data sources and data sinks through at least one dual access channel 121. However, an access node may not support external data sources or sink and may be used only for enabling internal paths through network 100. Optionally, an access node may support a global network controller (not illustrated in FIG. 1).

Figure 2:
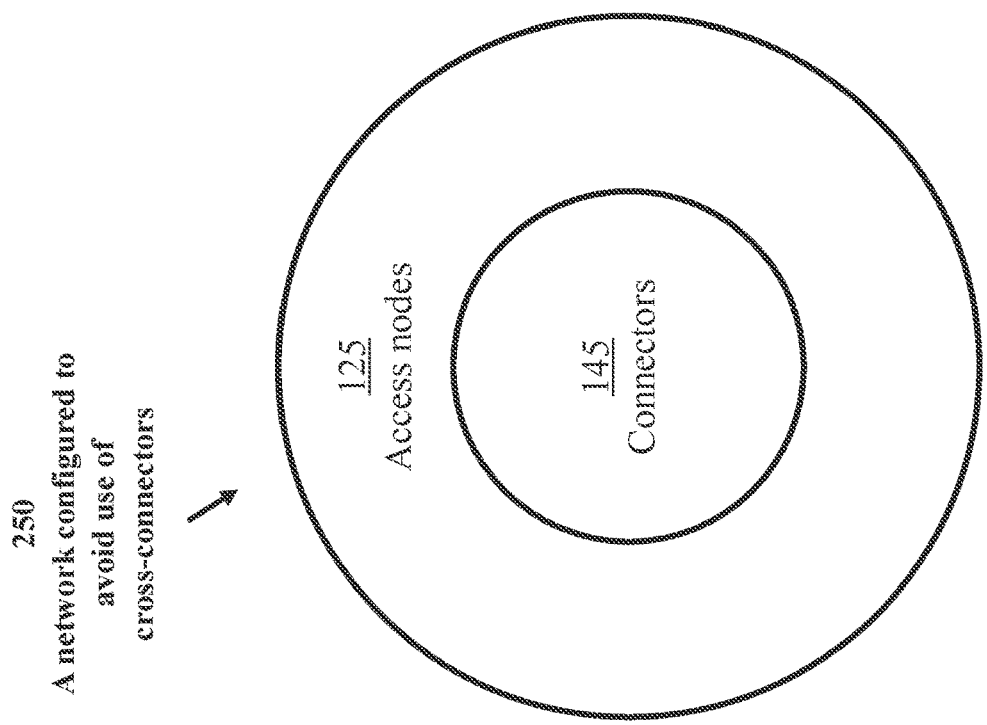
FIG. 2 is a schematic of a first network configuration where signals from a plurality of access nodes are transferred to a plurality of connectors through a layer of cross-connectors, and a second network configuration where signals are transferred from the plurality of access nodes to the plurality of connectors without use of intermediate cross-connectors.
Figure 2:
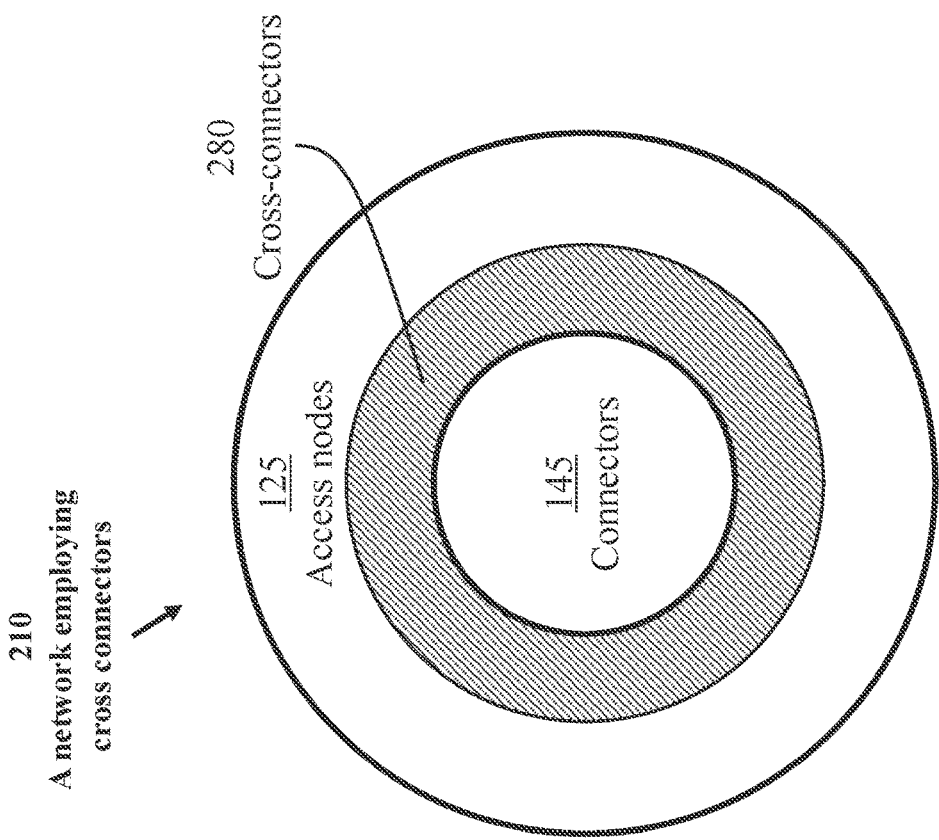

FIG. 2 is a schematic 200 of alternate network configurations. A first network configuration 210 employs a plurality 280 of cross-connectors. Signals between the plurality 125 of access nodes and the plurality 145 of connectors are transferred through the cross-connectors. A second network configuration 250 avoids use of any intermediate channel-switching stage (cross-connector stage) so that channels between the plurality of access nodes and the plurality of connectors are transferred without undergoing intermediate switching. FIGS. 18 to 29 illustrate a network organization, according to the present invention, which eliminates the need for cross-connectors.

Figure 3:
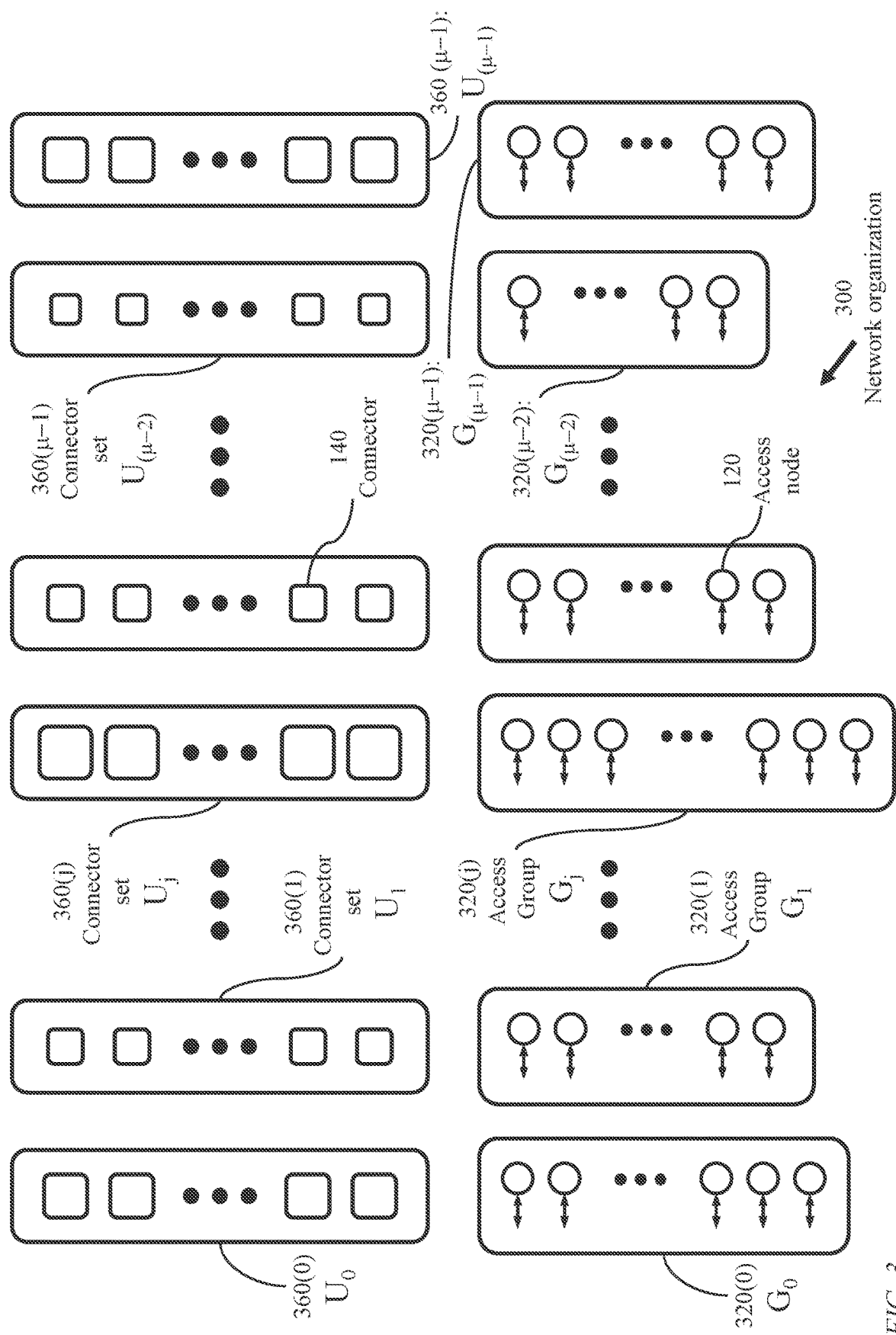
FIG. 3 illustrates a discipline of organizing the plurality of access nodes into a number u access groups and organizing the plurality of connectors into u connector sets, each connector set comprising u connectors, μ≥9, to facilitate formation of a global network of high capacity and low latency, in accordance with an embodiment of the present invention.

FIG. 3 illustrates an arrangement 300 of the plurality 125 of access nodes into a number, u, of access groups 320 and the plurality 145 of connectors into u connector sets 360, μ>1. The access groups 320 are individually labeled as $G_0$, $G_1$, ..., $G_{\mu-1}$. A connector set 360 comprises (μ−1) connectors 140. The u connector sets 360 are individually labeled as $U_0, U_1, \ldots, U_{\mu-1}$. Each access group 320 connects to a respective connector set 360, with an access group labeled $G_j$ corresponding to a connector set $U_j$, 0≤j≤μ. The dimension (number of ports) of a connector 140 of a connector set at least equals the number of access nodes of a corresponding access group. The access nodes of the plurality 125 of access nodes are generally geographically distributed. Arranging the access nodes 120 into access groups is done solely for facilitating routing and control. The access nodes of any access group are generally geographically distributed.

Figure 4:
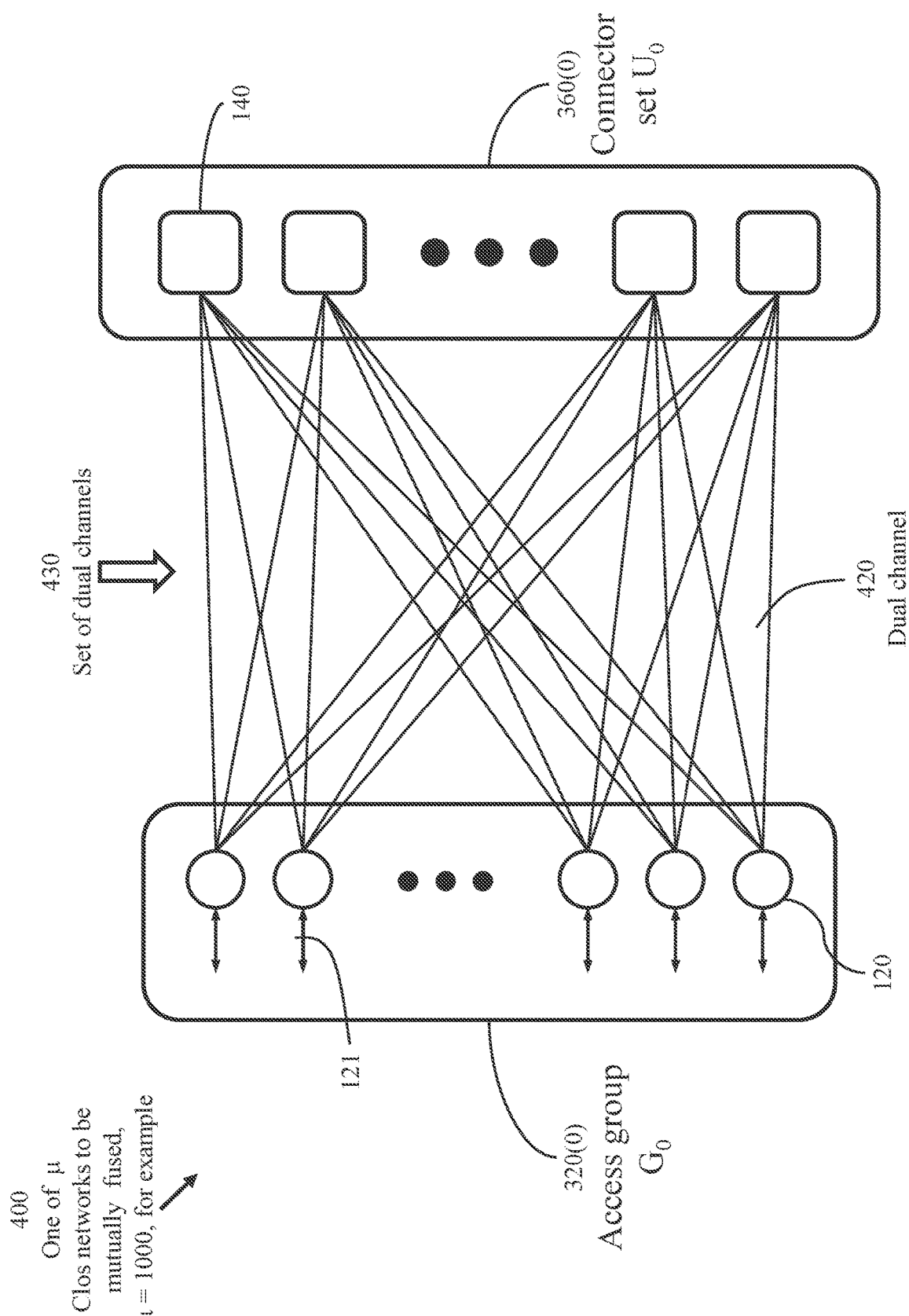
FIG. 4 illustrates a single Clos star network (CSN) comprising one access group and one connector set for use in an embodiment of the present invention.

FIG. 4 illustrates a single Clos star network (CSN) comprising one access group and one connector set. Each of the u access groups 320 is coupled to a respective connector set 360 to form a conventional Clos Star Network (CSN). FIG. 4 illustrates a single Clos star network (CSN) where a set 420 of dual channels connect access group $G_0$ to connector set $U_0$. Each access node has a dual channel 420 to each connector 140 of the CSN. The dimension of each connector 140, i.e., the number of dual ports receiving and transmitting content data, equals the number of access nodes of access group $G_0$. A realizable dimension of a connector 140 determines the maximum number of access nodes of the CSN.

Figure 5:
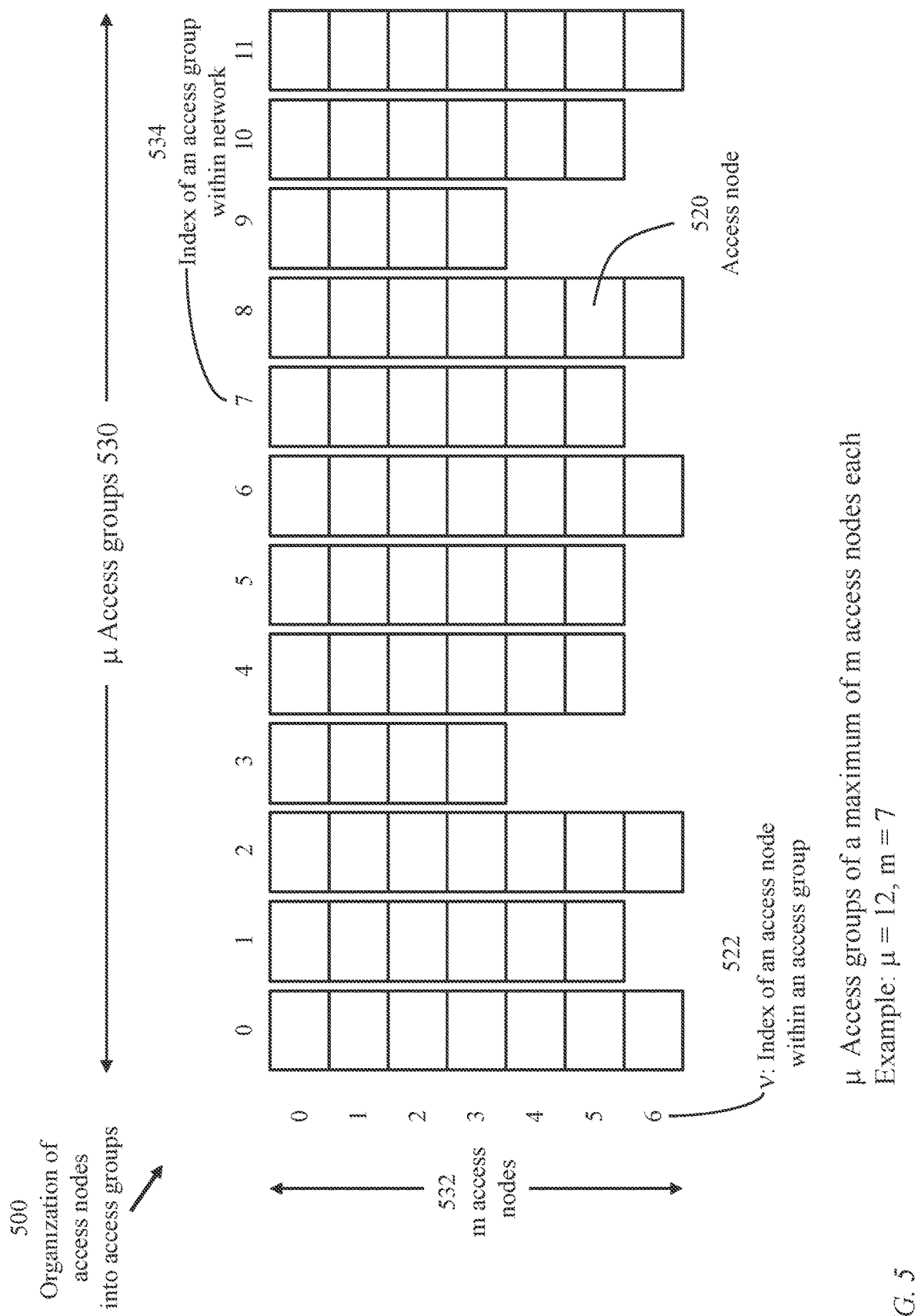
FIG. 5 illustrates organization of access nodes into access groups.

FIG. 5 illustrates organization 500 of access nodes of a network into a number, u, of access groups 530, μ>8, with each access group comprising a number of access nodes 520 not exceeding a predefined maximum number m, referenced as 532. In the illustrated example, μ=12 and m=7. An access node 520 is structurally similar to access node 120. The main difference is that access node 120 connects to connectors 140 which interconnect access nodes of a single access group while access node 520 connects to distributors which interconnect access nodes belonging to two or more access groups. An access node 520 is identified according to an index v, 0≤v<m, referenced as 522, within a respective access group. An access group may be identified according to an index, referenced as 534, within a network.

Figure 6:
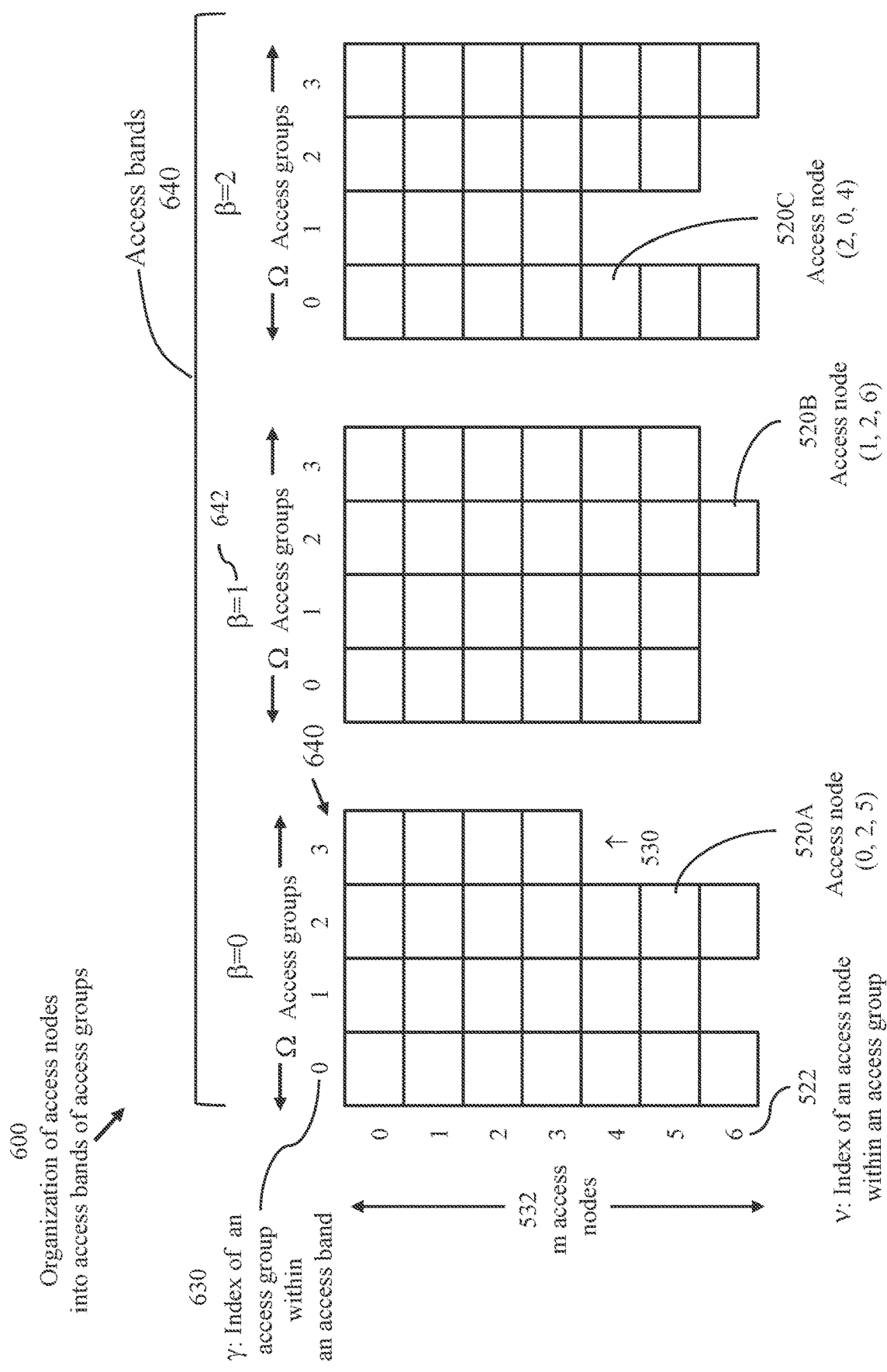
FIG. 6 illustrates further organization of the access groups of FIG. 5 into a number Π of access bands, each access band comprising a number Ω access groups, Π>2, Ω>2.

FIG. 6 illustrates further organization 600 of the access groups 530 into a number Π, Π>2, of access bands 640. Each access band 640 comprises a predefined number Ω, Ω>2, of access groups 530. The access bands are individually indexed (reference 642) as 0 to (Π−1), and the access groups within an access band are individually indexed (reference 630) as 0 to (Ω−1). An access group of index γ, within an access band of index β is identified as {β, γ}, 0≤β<Π, 0≤γ>Ω. The access groups of the access band of index 2, for example, are identified as {2,0}, {2,1}, {2,2}, and {2,3}. An access node of index ν within an access group containing M(β, γ) access nodes, 1<M(β,γ)≤m, is identified as (β, γ, ν). As indicated, access nodes 520A, 520B, and 520C are identified as (0,2,5), (1,2,6), and (2,0,4), respectively.

Figure 7:
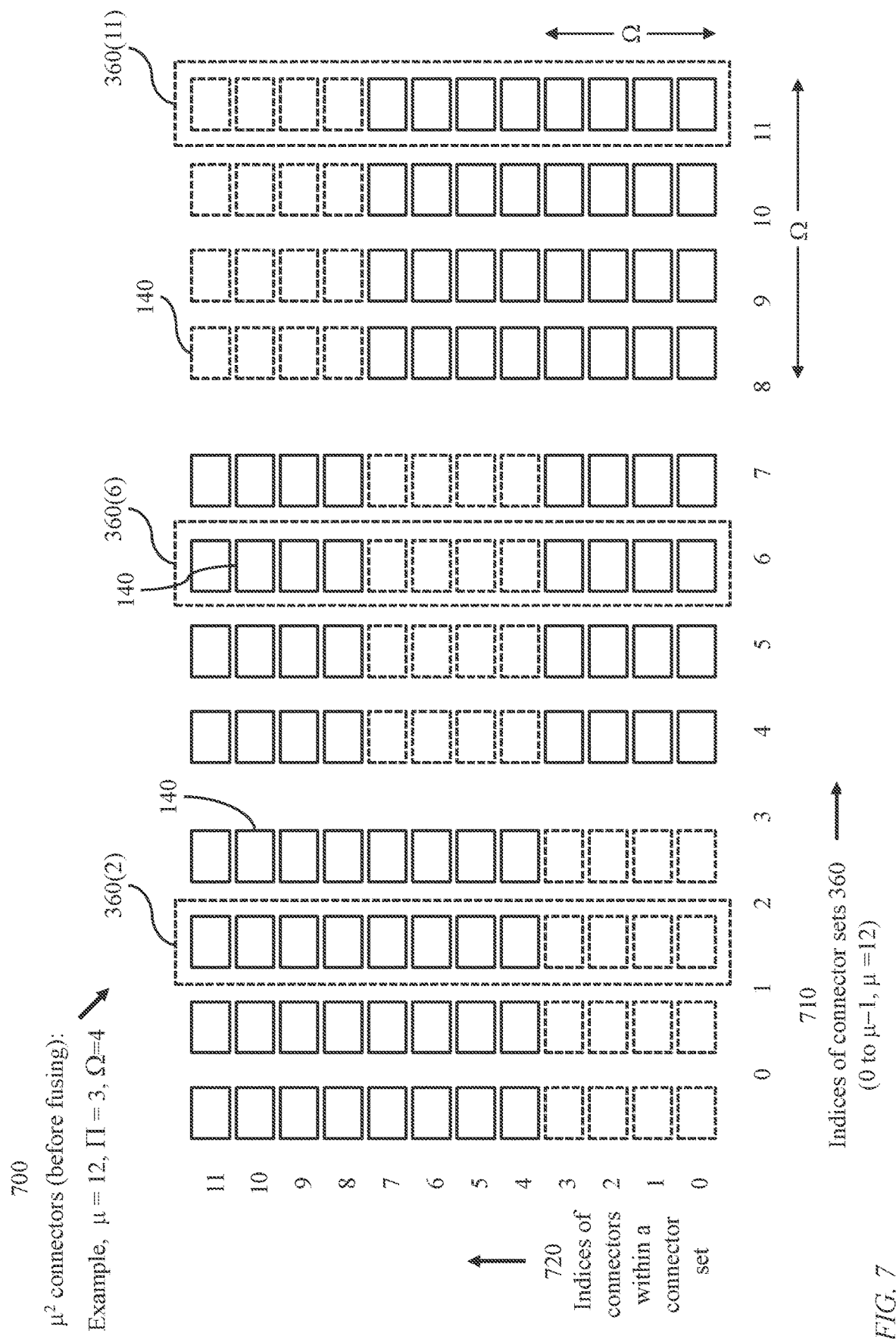
FIG. 7 illustrates a number $\mu^2$ of connectors of μ independent CSNs, μ=12, each CSN comprising a respective access group of the 12 access groups of FIG. 3 and a respective connector set of the 12 connector sets of FIG. 3.

FIG. 7 illustrates a plurality 700 of connectors of a number μ, μ=12, of independent CSNs, each CSN comprising a respective access group of the μ access groups of FIG. 3 and a respective connector set of the μ connector sets of FIG. 3. The connectors are illustrated to be of equal dimension, however, the number of populated ports of a connector is determined according to the number of access nodes of a respective access group which may vary from one access group to another. The connectors forming a connector set 360 are of equal dimension. The connector sets 360(0) to 360(μ−1) are aggregated into Π sections, Π=3 in the example of FIG. 7, each section corresponding to a respective access band. The connector sets are indexed (reference 710) as 0 to (μ−1) and connectors within a connector set are indexed (reference 720) as 0 to (μ−1).

Figure 8:
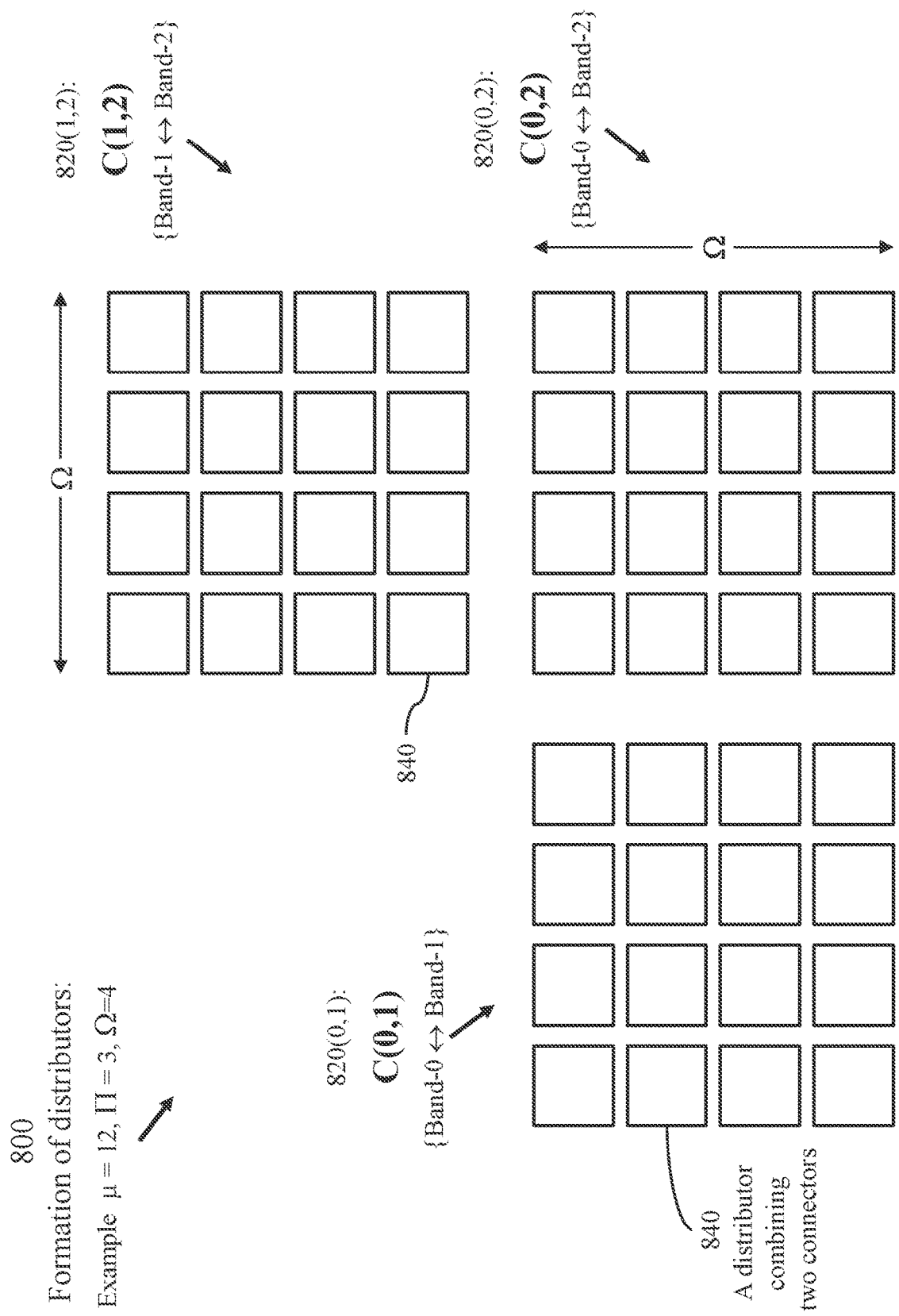
FIG. 8 illustrates integrating selected connector pairs of the $\mu^2$ connectors of FIG. 7, to form distributors arranged into a number $(\Pi^2-\Pi)/2$ of constellations of $\Omega^2$ distributors each; in accordance with an embodiment of the present invention.

FIG. 8 illustrates formation of a plurality 800 of distributors from the plurality 700 of connectors. Selected connector pairs of the $\mu^2$ connectors 140 of FIG. 7 are integrated to form distributors 840 arranged into a number $(\Pi^2-\Pi)/2$ constellations of $\Omega^2$ distributors each. A distributor 840 integrates two connectors 140 of different sections. A distributor comprises a number of content dual ports in addition to optional control ports. The number of content dual ports of a distributor is the sum of the numbers of content ports of constituent connectors. The Π sections are indexed sequentially as 0 to (Π−1). The integrated connectors of each pair of sections of indices j, k, 0≤j<k<Π form a respective constellation 820 of distributors denoted C (j,k). The distributors of a constellation are preferably collocated to simplify connectivity to access nodes of constituent bands within the constellation. The formed constellations may be geographically spread over a wide area.

Figure 9:
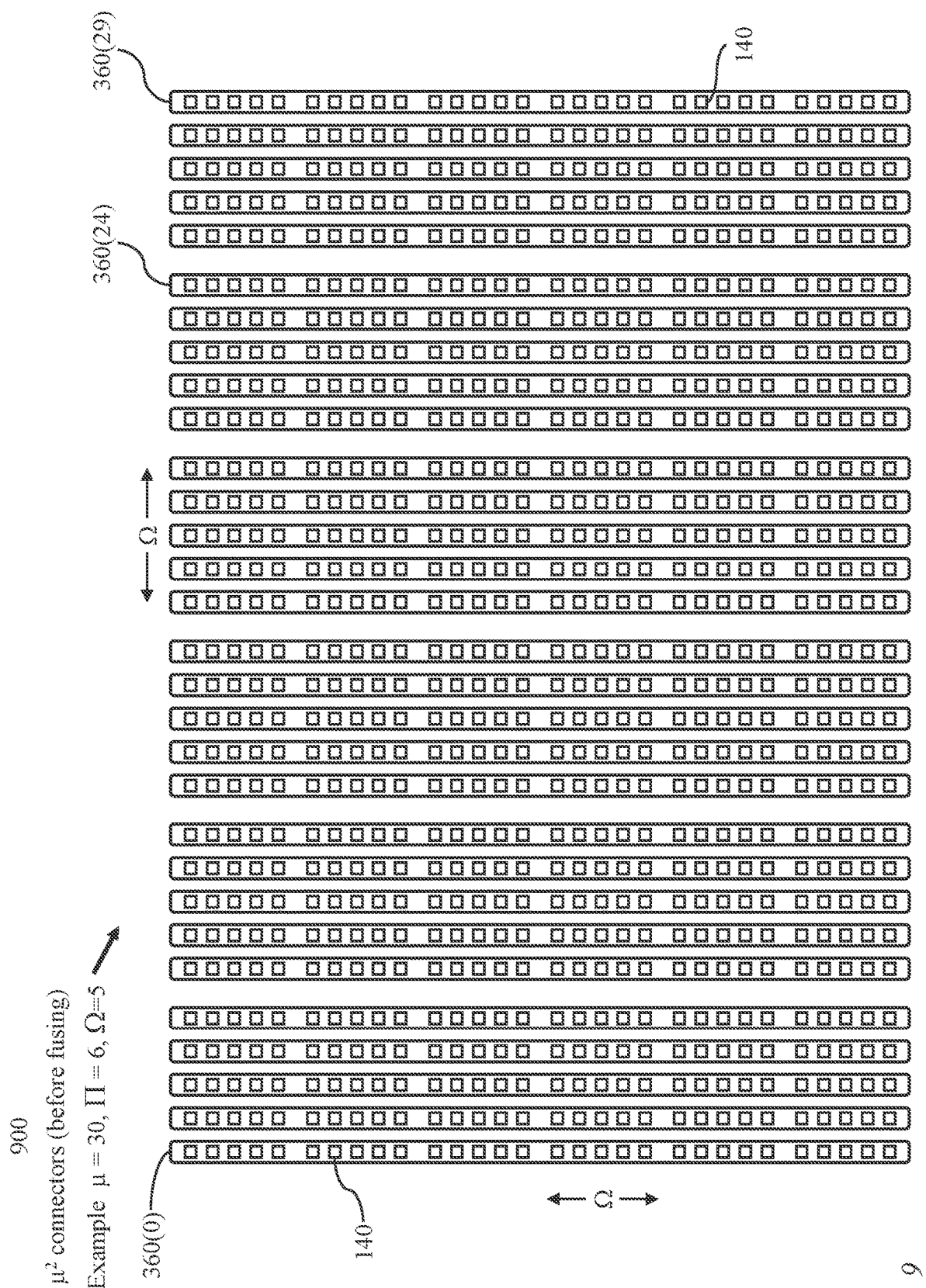
FIG. 9 illustrates a number $\mu^2$ of connectors of independent CSNs, μ=30, each CSN comprising a respective access group of μ access groups and a respective connector set of μ connector sets, each connector set comprising μ connectors, the μ access groups being arranged into Π access bands, each access band comprising Ω access groups, Π=6, Ω=5.

FIG. 9 illustrates a plurality 900 of connectors of a number μ of independent CSNs, μ=30. The plurality of connectors is organized into μ connector sets, each connector set comprising μ connectors. Each CSN comprises an access group 320 and a corresponding connector set 360 (FIG. 3). The access groups are organized into a number Π of access bands, each access band comprising a number Ω access groups as illustrated in the example of FIG. 6. In the example of FIG. 9, Π=6, Ω=5. The connector sets 360(0) to 360(29) are aggregated into Π sections, each section corresponding to a respective access band.

Figure 10:
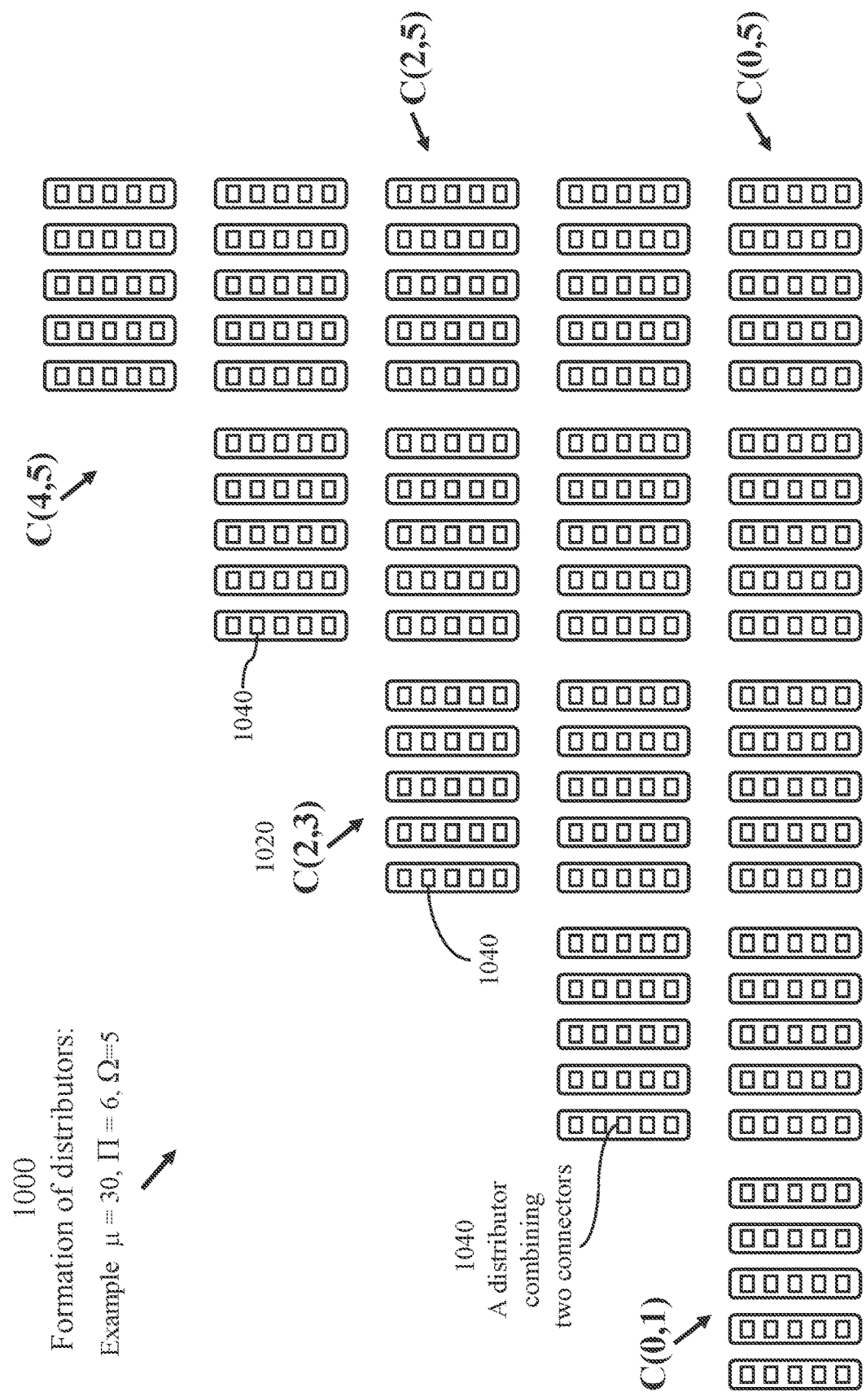
FIG. 10 illustrates integrating selected connector pairs of the $\mu^2$ connectors of FIG. 9, to form distributors arranged into a number $(\Pi^2-\Pi)/2$ constellations (15 constellations) of $\Omega^2$ distributors each, in accordance with an embodiment of the present invention.

FIG. 10 illustrates formation of a plurality 1000 of distributors from the plurality 900 of connectors. Selected connector pairs of the $\mu^2$ connectors 140 of FIG. 9 are integrated to form distributors arranged into a number $(\Pi^2-\Pi)/2$ constellations (15 constellations for Π=6) of $\Omega^2$ distributors each (25 distributors for Ω=5). A distributor 1040 integrates two connectors 140 of different sections. The Π sections are indexed sequentially as 0 to (Π−1). The integrated connectors of each pair of sections of indices j, k, 0≤j<k<Π form a respective constellation of distributors denoted C (j,k).

Figure 11:
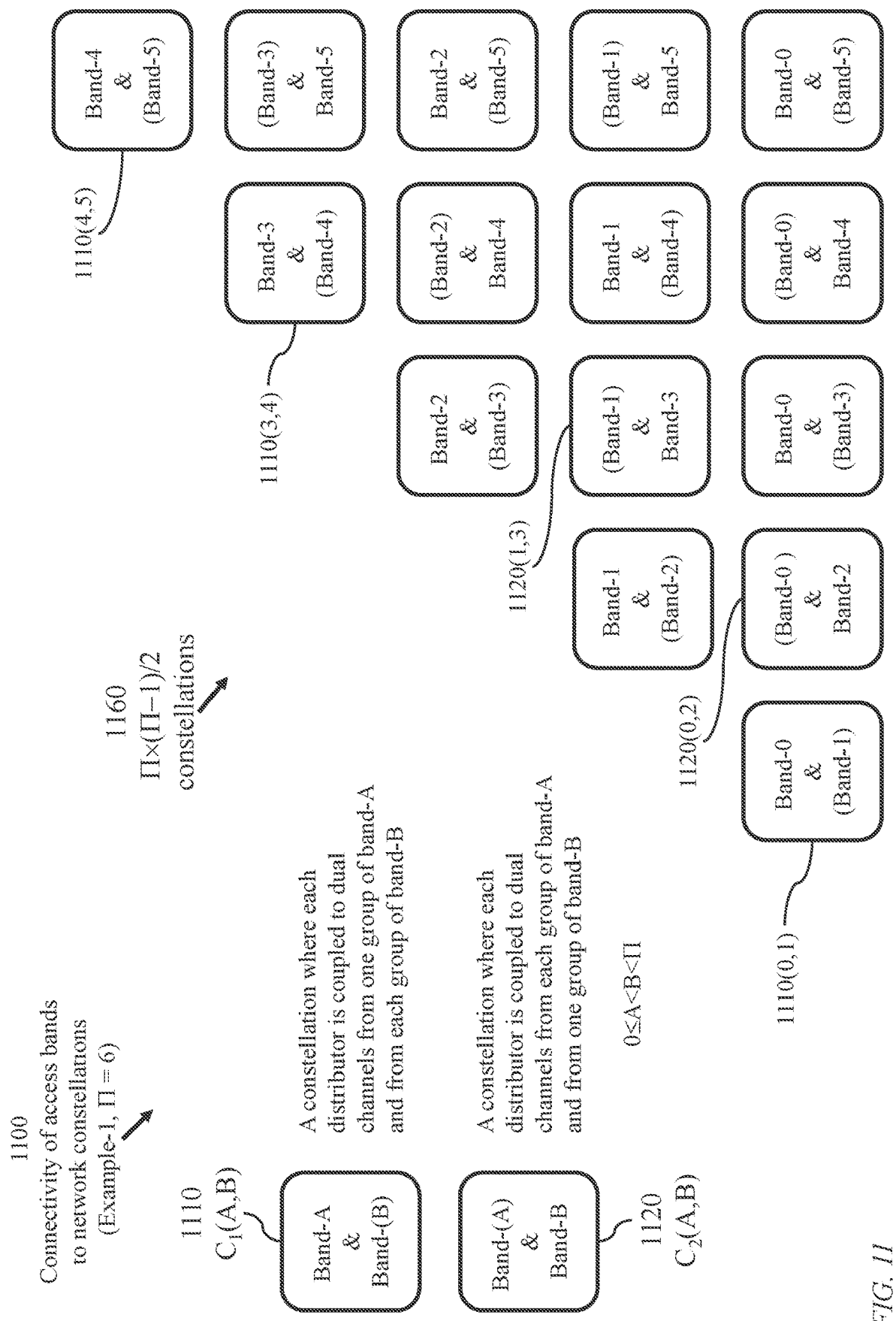
FIG. 11 illustrates connectivity of access bands to constellations of distributes to realize both intra-group multi-channel connectivity and inter-group multi-channel connectivity within each band in addition to inter-band single-channel connectivity for a case of a plurality of access groups arranged into 6 access bands (Π=6), in accordance with an embodiment of the present invention.

FIG. 11 illustrates connectivity 1100 of access bands to constellations of distributes to realize both intra-group multi-channel connectivity and inter-group multi-channel connectivity within each band in addition to inter-band single-channel connectivity for a case of a plurality of access groups arranged into 6 access bands (Π=6). Several connectivity patterns may be formed to fulfil this requirement. In accordance with one embodiment, a pair of bands connects to a respective constellation so that:

a first band connects in a first mode where each distributor of the respective constellation connects to all access nodes of a respective group of the first band;

a second band connects in a second mode where each pair of access nodes of different groups has a dual single-hop path through a respective distributor of the respective constellation; and each access node of said first band has a single-hop path to each access node of said second band.

Each band, of the Π bands, connects to at least one constellation in said first mode and connects to at least one other constellation in said second mode. Thus, the number Π of bands is selected to exceed two. As illustrated, an access band "A", denoted band-A, and an access-band "B", denoted band-B, 0≤A<B<Π, may connect to:

a constellation $C_1(A,B)$, referenced as 1110(A,B), where each distributor of the constellation connects to dual channels from one group of band-A and dual channels from each group of band-B, i.e., band-A connects in the first mode while band-B connects in the second mode; or a constellation $C_2(A,B)$, referenced as 1120(A,B), where each distributor of the constellation connects to dual channels from one group of band-B and dual channels from each group of band-A, i.e., band-A connects in the second mode while band-B connects in the first mode.

A band connecting in the second mode is identified with parentheses. For example, band-0 and band-1 connect to constellation $C_1(0,1)$, referenced as 1110(0,1), in the first mode and second mode, respectively, while band-1 and band-3 connect to constellation $C_2(1,3)$, referenced as 1120 (1,3) in the second mode and first mode, respectively.

Each access band, of the Π access bands, connects to (Π−1) constellations. To equalize the number of constellations to which an access band connects in the first mode and the number of constellations to which the access band connects in the second mode, the number of access bands is preferably selected as an odd number. In a large-scale network, Π>>1 and Ω>>1.

Figure 12:
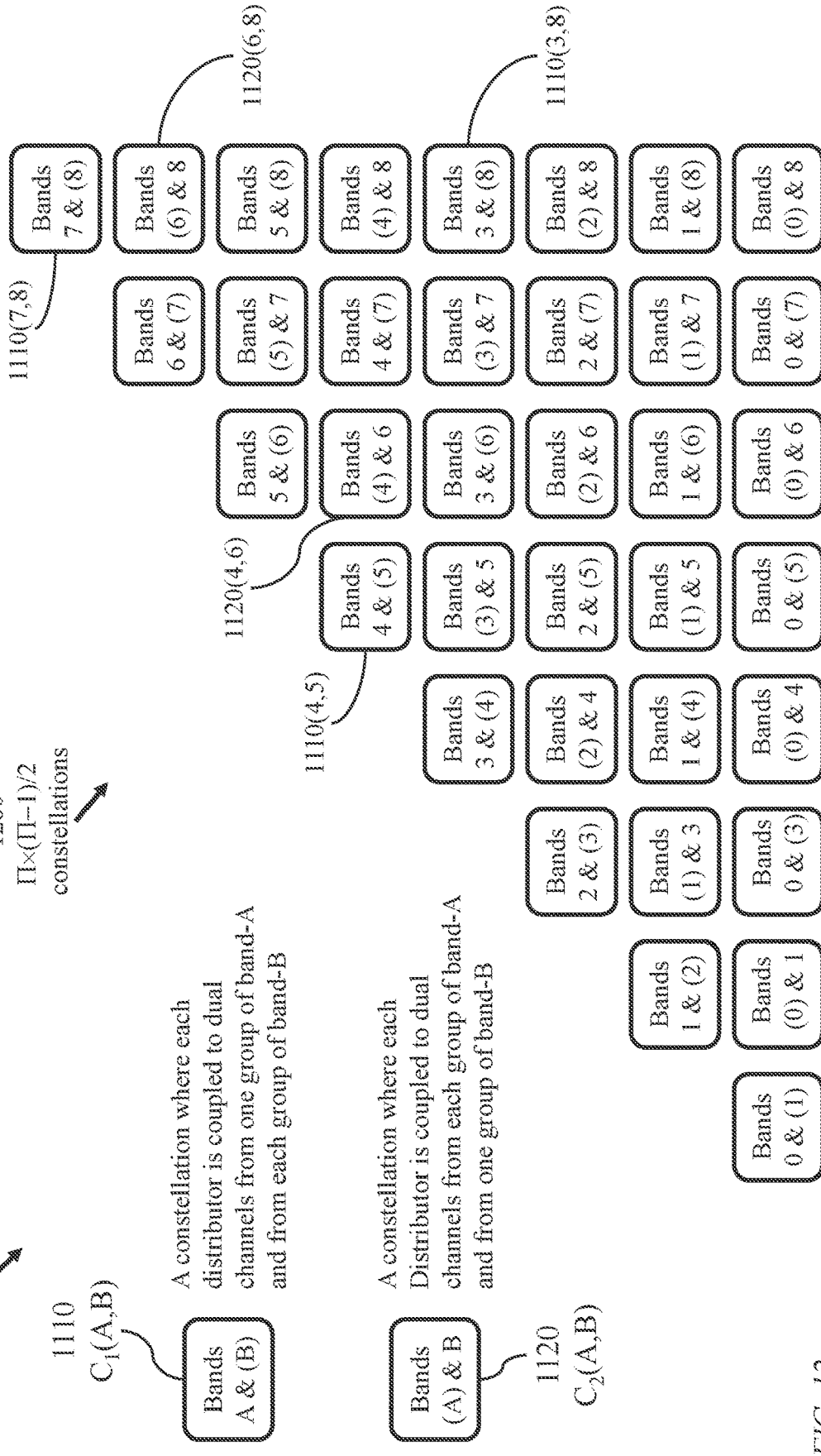
FIG. 12 illustrates connectivity of access bands to constellations of distributors for a case of a plurality of access groups arranged into 9 access bands (Π–9)

FIG. 12 illustrates connectivity of access bands to constellations of distributors for a case of a plurality of access groups arranged into 9 access bands (Π=9). As illustrated, band-4 and band-5 connect to constellation $C_1(4,5)$, referenced as 1110(4,5), in the first mode and second mode, respectively, while band-4 and band-6 connect to constellation $C_2(4,6)$, referenced as 1120(4,6) in the second mode and first mode, respectively.

Figure 13:
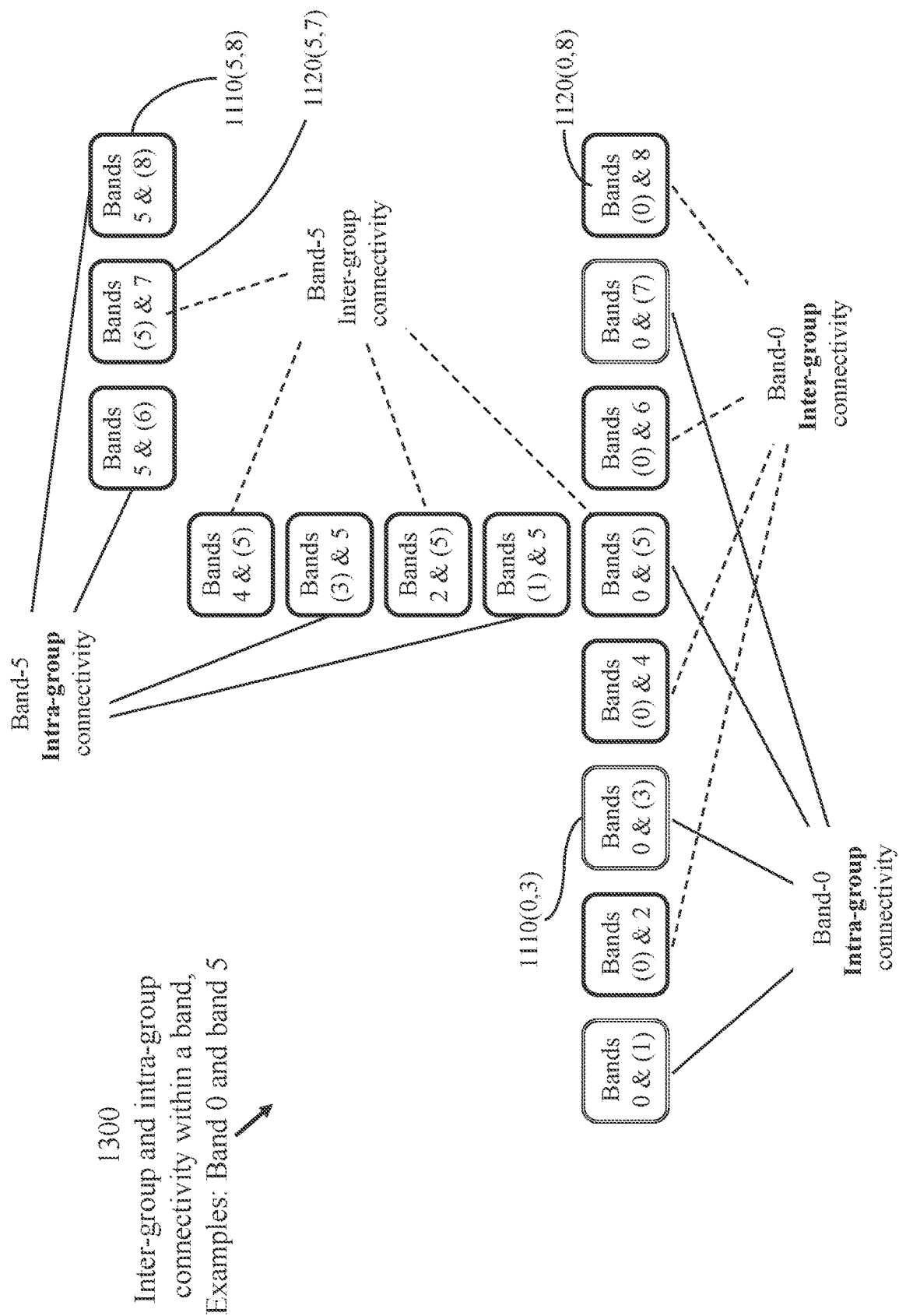
FIG. 13 illustrates constellations providing inter-group connectivity and constellations providing intra-group connectivity for selected access bands.

FIG. 13 illustrates constellations 1300 of FIG. 12 providing inter-group connectivity and constellations providing intra-group connectivity for selected access bands. As illustrated, the constellations of bands: {0, (1)}, {0, (3)}, {0, (5)}, {0, (7)} provide single-hop intra-group connectivity for access nodes of band-0 while constellations of bands: {(0), 2}, {(0), 4}, {(0), 6}, {(0), 8}, provide inter-group single-hop connectivity for access nodes of band-0.

Constellations of bands: {(1), 5}, {(3),5}, {5, (6)}, {5, (8)} provide single-hop intra-group connectivity for access nodes of band-5 while constellations of bands: {0, (5)}, {2, (5)}, {4, (5)}, {(5), 7}, provide inter-group single-hop connectivity for access nodes of band-5.

Figure 14:
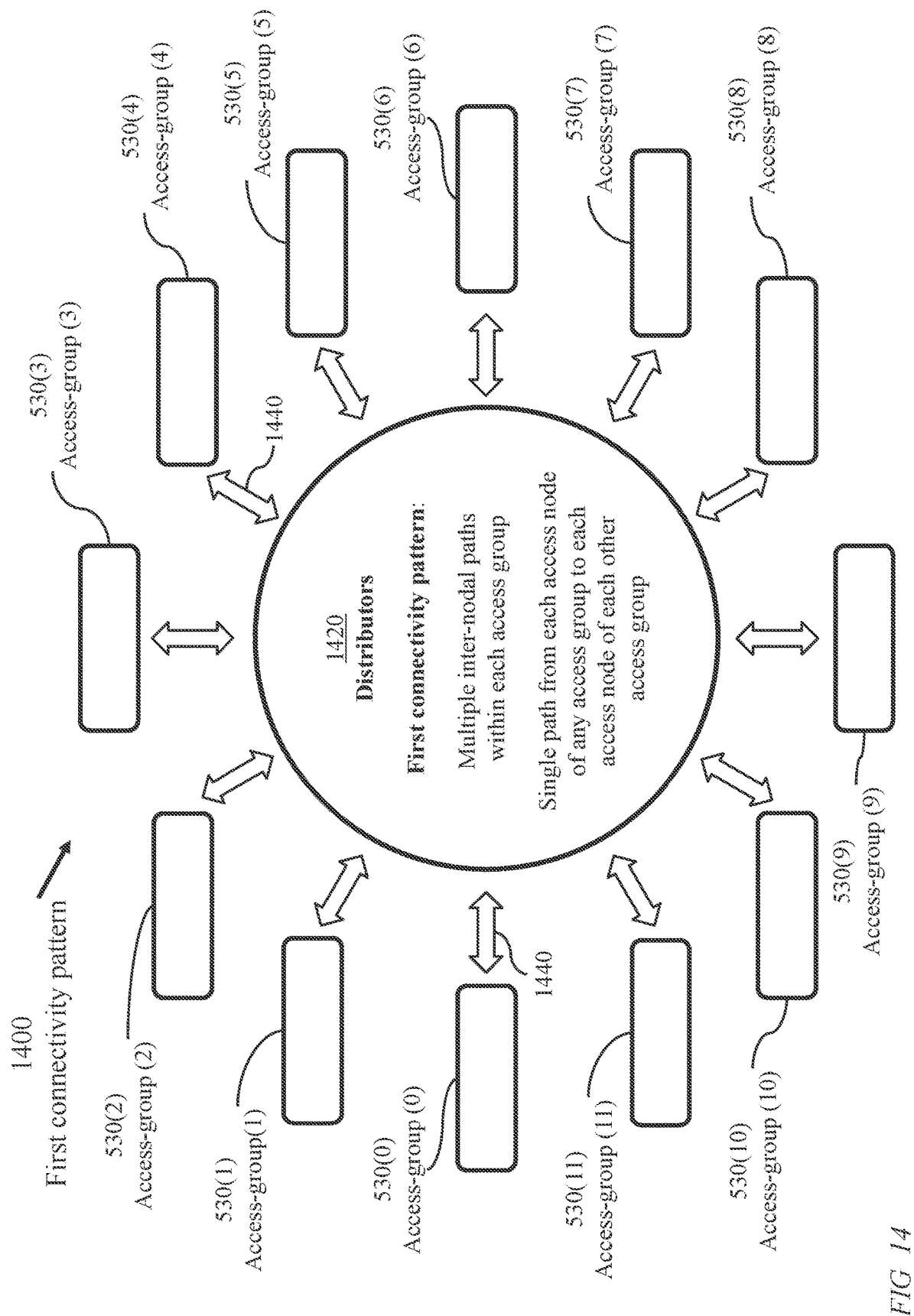
FIG. 14 illustrates a first connectivity pattern of access groups to a plurality of distributors to form a contiguous network based on first-order fusing of Clos star networks (CSNs), in accordance with an embodiment of the present invention.

FIG. 14 illustrates a first connectivity pattern 1400 of the access groups 530 to a plurality 1420 of first-order distributors to form a contiguous network based on first-order fusing of Clos star networks (three-stage networks). Each access group 530 connects to selected distributors of the plurality 1420 of distributors through respective dual multichannel links 1440. Each first-order distributor connects to dual channels of two access groups 530. The two access groups may belong to a same access band within an intra-band constellation, or to different access bands within an inter-band constellation. The connectivity-pattern example of FIG. 14 corresponds to the access-node organization of FIG. 6.

Figure 15:
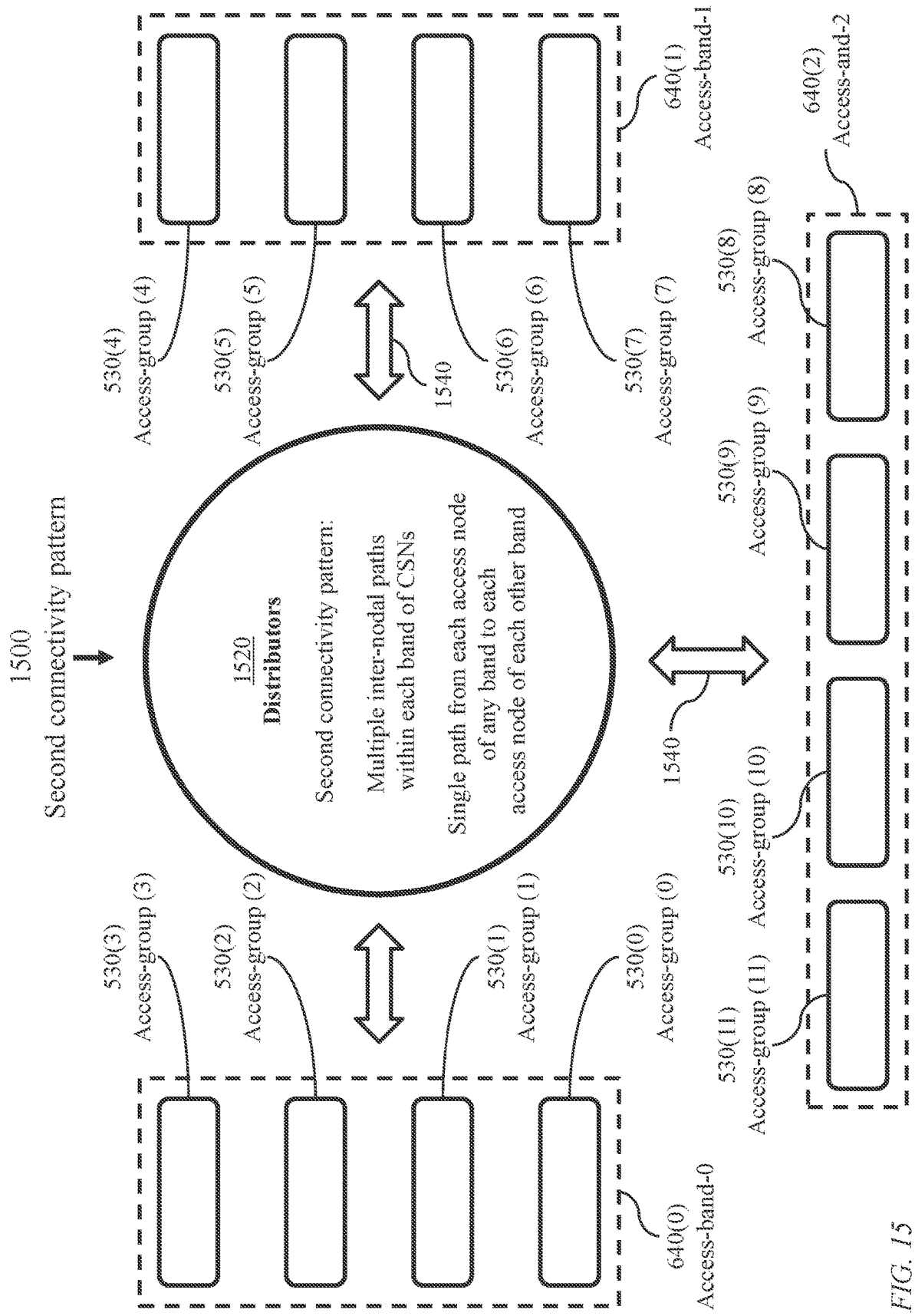
FIG. 15 illustrates a second connectivity pattern of access groups to a plurality of distributors to form a contiguous network based on second-order fusing of CSNs, in accordance with an embodiment of the present invention.

FIG. 15 illustrates a second connectivity pattern 1500 of the access groups 530 to a plurality 1520 of second-order distributors to form a contiguous network based on second-order fusing of Clos star networks. A second-order distributor connects to dual channels of an access group of any access band and dual channels of multiple access groups of any other access band. Each access band 640 connects to respective selected distributors of the plurality 1520 of distributors through respective dual multichannel links 1540. The only difference between a second-order distributor and a first-order distributor is the respective connectivity patterns to access nodes. The use of second-order distributors eliminates the need for intra-band constellations and, more importantly, enables establishing multiple single-hop paths for each pair of access nodes of different access groups within an access band.

Figure 16:
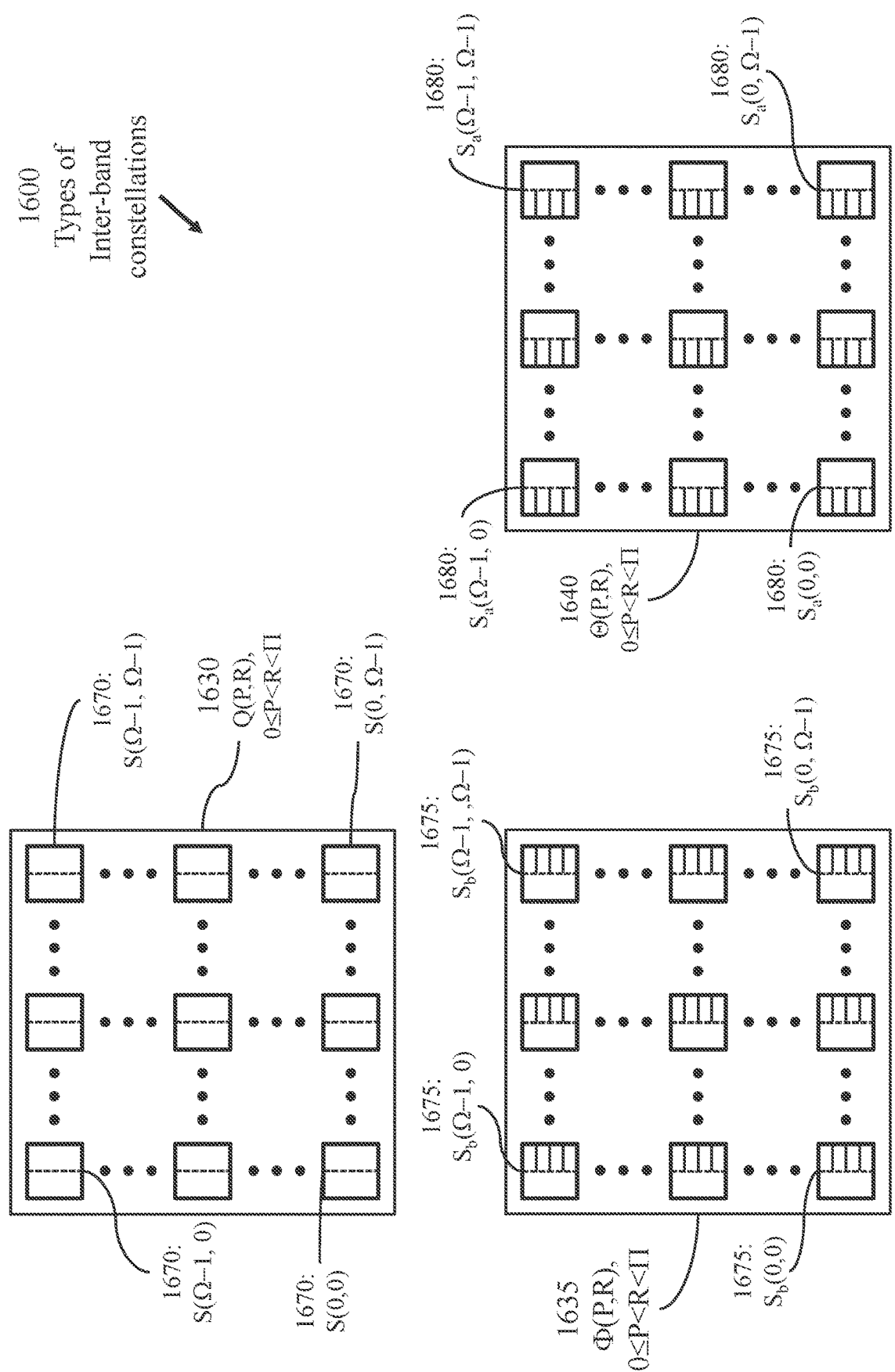
FIG. 16 illustrates forms of constellations of distributors.

FIG. 16 illustrates forms 1600 of constellations of distributors including a first-order inter-band constellation 1630, a type-I second-order inter-band constellation 1635, and a type-II second-order inter-band constellation 1640. Each constellation 1630, 1635, or 1640 comprises $\Omega^2$ distributors.

A distributor 1670 connects to dual channels from one access group of an access band P and dual channels of one access group of an access band of index R, $0 \leq P < R < \Pi$. A distributor 1670 of a constellation 1630 grows to $2 \times m$ dual ports connecting to m dual channels emanating from access nodes of an access group 530 of a first access band 640 and m dual channels emanating from access nodes of an access group of a second access band 640. A distributor 1670 provides intra-group dual single-hop paths as well as inter-band dual single-hop paths.

A distributor 1680 connects to dual channels from 22 access groups of an access band P and dual channels of a single access group of an access band of index R, $0 \leq P < R < \Pi$. A distributor 1680 of a constellation 1640 grows to $2 \times m$ dual ports connecting to m dual channels emanating from selected access nodes of $\Omega$ access groups 530 of a first access band 640 and m dual channels emanating from access nodes of one access group of a second access band 640. A distributor 1680 provides intra-band, inter-group dual single-hop paths as well as inter-band dual single-hop paths.

A distributor 1675 connects to dual channels from 2 access groups of an access band R and dual channels of a single access group of an access band of index P, $0 \leq P < R < \Pi$. A constellation 1635 uses distributors 1675 and provides similar dual single-hop paths.

Figure 17:
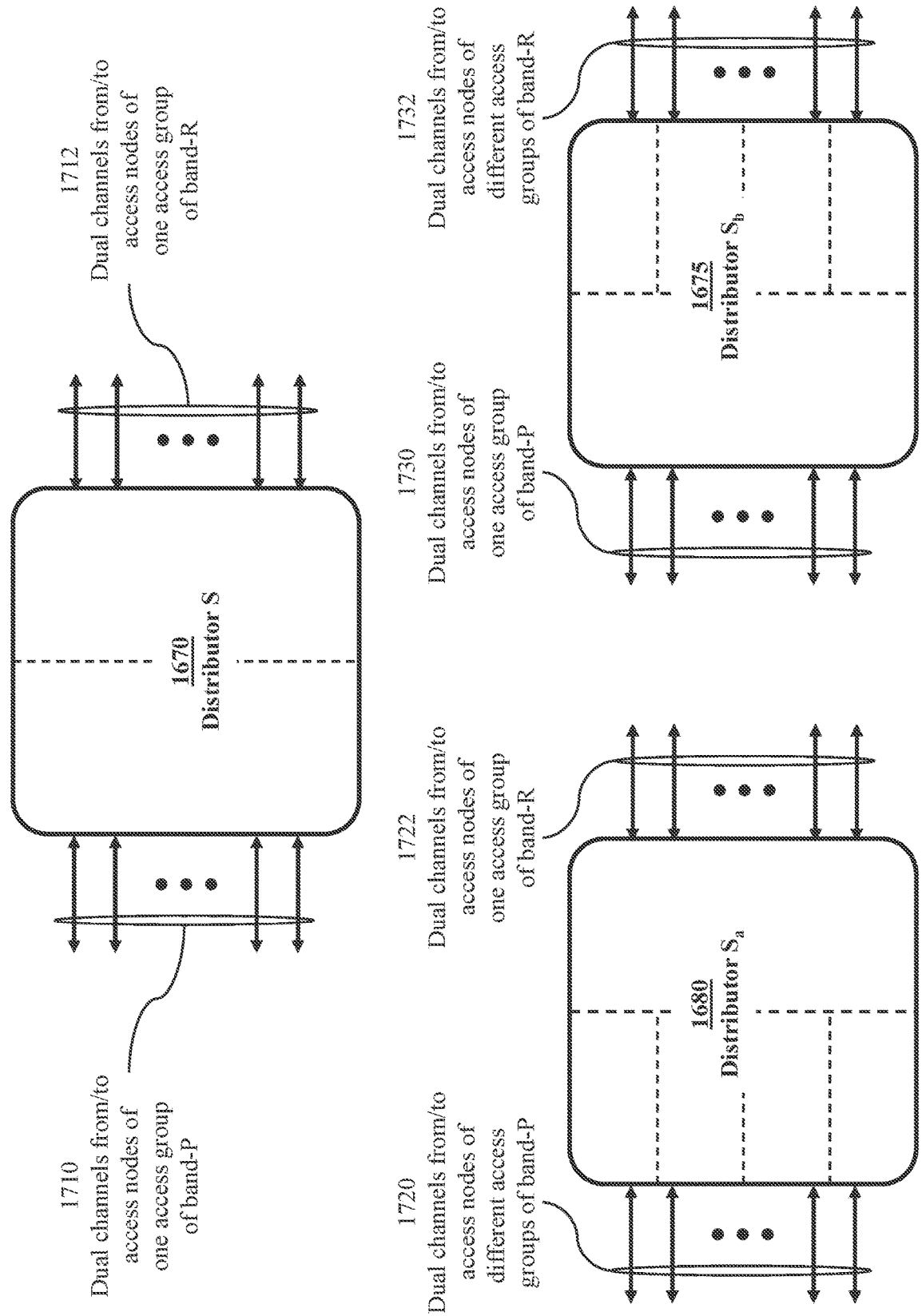
FIG. 17 illustrates a first-order and two second-order inter-band constellations.

FIG. 17 illustrates access-nodes connectivity 1700 to distributors of a first-order constellation 1630, a type-I second-order constellations 1635, and a type-II second-order constellation 1640. For an ordered access-band pair {P, R}, $0 \leq P < R < \Pi$, a distributor 1670 of a constellation 1630 connects to dual channels 1710 emanating from an access group of access band P and dual channels 1712 emanating from an access group of access band R. A distributor 1675 of a constellation 1635 connects to dual channels 1730 emanating from an access group of access band P and dual channels 1732 emanating from multiple access groups of access band R. A distributor 1680 of a constellation 1640 connects to dual channels 1720 emanating from multiple access groups of access band P and dual channels 1722 emanating from one access group of access band R.

Selecting a number $J \times \Pi$, $0 \leq J \leq \lfloor (\Pi-1)/2 \rfloor$, of second-order inter-band constellations, the remaining number, L, of constellations may be configured as first-order inter-band constellations. L is determined as: $L = (\Pi \times (\Pi-1)/2) - J \times \Pi$.

Hereinafter, each second-order constellation is configured as an inter-band constellation. The division of the second-order constellations into type-I second-order constellations 1635 and type-II second-order constellations 1640 is selected to provide for each access band intra-group single-hop paths so that each access node of an access band has at least one single-hop path to each other access node of the same access band. Several arrangements may be devised to realize this objective. A preferred arrangement is outlined below.

for $1 \leq k \leq \lfloor (\Pi-1)/2 \rfloor$, select
- $(\Pi-k)$ type-II second-order constellations 1640, denoted $\Theta(p, p+k)$, $0 \leq p < (\Pi-k)$, where each distributor connects to selected dual channels from different access groups of access-band p and dual channels of a single access group of access-band (p+k); and
- k type-I second order constellations 1635 denoted $\Phi(r, \Pi+r-k)$, $0 \leq r < k$, where each distributor connects to dual channels of a single access group of access-band r and selected dual channels from different access groups of access-band $(\Pi+r-k)$.

Figure 18:
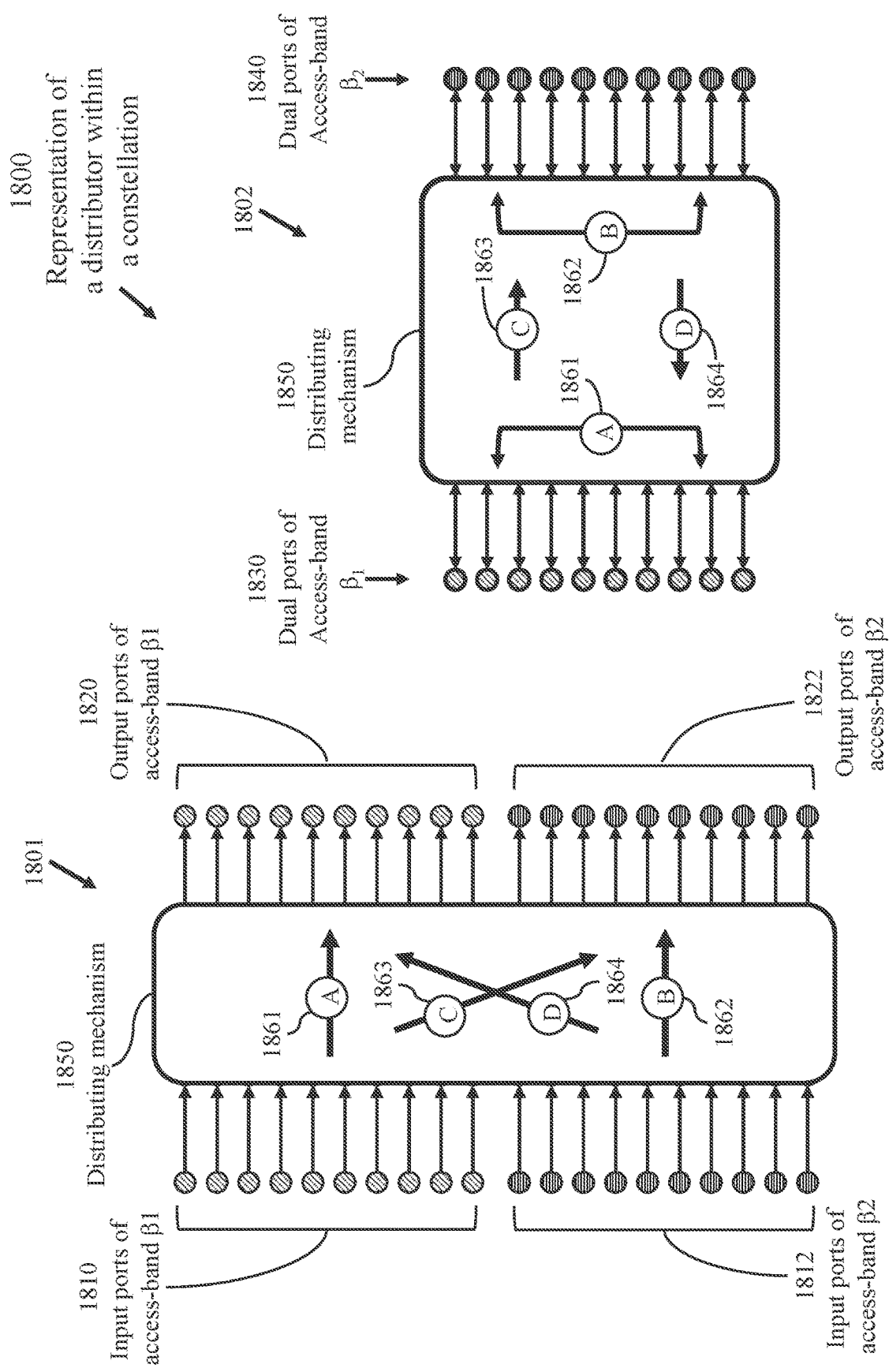
FIG. 18 illustrates a representation of a distributor within a constellation.

FIG. 18 illustrates representations 1800 of a distributor within a constellation connecting access bands $\beta_1$ and $\beta_2$, $0 \leq \beta_1 < \beta_2 < \Pi$. A distributor (switch/router) within a constellation 1630, 1635, or 1640, comprises a distributing mechanism configured to have up to $2 \times m$ dual ports communicatively coupled to access nodes of two access bands, in addition to at least one dual port coupled to a distributor controller, m being a design parameter. A dual port comprises an input port and an output port which are preferably integrated.

A first representation, 1801, of a distributor depicts connectivity of the distributing mechanism 1850 to input ports 1810 connecting to selected access nodes of access-band $\beta_1$, input ports 1812 connecting to selected access nodes of access-band $\beta_2$, output ports 1820 connecting to access nodes of the selected access nodes of access-band $\beta_1$, and output ports 1822 connecting to the selected access nodes of access-band $\beta_2$.

A second representation, 1802, of a distributor depicts connectivity of the distributing mechanism 1850 to dual ports 1830, connecting to the selected access nodes of access-band $\beta_1$, and dual ports 1840, connecting to the selected access nodes of access-band $\beta_2$. A dual port 1830 comprises an input port 1810 and an output port 1820. A dual port 1840 comprises an input port 1812 and an output port 1822. The second representation is used in subsequent illustrations of constellation connectivity to access nodes.

Internal paths through the distributing mechanism, indicated in representations 1801 and 1802, include:

paths 1861 from input ports 1810 to output ports 1820 (intra-first-band paths); paths 1862 from input ports 1812 to output ports 1822 (intra-second-band paths); paths 1863 from input ports 1810 to output ports 1822 (inter-band paths); and paths 1864 from input ports 1812 to output ports 1820 (inter-band paths).

For a first-order inter-band constellation 1630, $m_1$ dual ports, $1 < m_1 \leq m$, connect to access nodes of a selected access group, $\gamma_1$, of access-band $\beta_1$ and $m_2$ dual ports, $1 < m_2 \leq m$, connect to access nodes of a selected access group, $\gamma_2$, of access-band $\beta_2$, $m_1$ and $m_2$ being a number of access nodes of access groups $\gamma_1$ and $\gamma_2$, respectively.

For a type-I inter-band constellation 1635, $m_1$ dual ports, $1 < m_1 \leq m$, connect to access nodes of a selected access group, $\gamma_1$, of access-band $\beta_1$ and up to m dual ports, connect to access nodes belonging to multiple access groups of access band $\beta_2$.

For a type-II second-order inter-band constellation 1640, up to m dual ports, connect to access nodes belonging to multiple access groups of access-band $\beta_1$ and $m_2$ dual ports, $1 < m_2 \leq m$, connect to access nodes of a selected access group, $\gamma_2$, of access band $\beta_2$.

Each constellation connects directly to each access node of a respective pair of access bands through a respective dual multichannel link each dual channel of which connecting to a respective distributor of the constellation. This eliminates the need for cross connectors between the plurality of access nodes and the plurality of distributors (280, FIG. 2).

A dual multichannel link connecting an access node to a constellation is coupled to: a first spectral multiplexer and a first spectral demultiplexer at the access node; and a second spectral demultiplexer and a second spectral multiplexer at the constellation. The first spectral multiplexer, at the access node, combines Ω upstream channels emanating from electrical-to-optical converters coupled to Ω output ports of the access node into an upstream multichannel link directly routed to the constellation.

The second spectral demultiplexer, at the constellation, separates the Ω upstream channels, with each channel directed to a respective distributor of the constellation. The second spectral multiplexer, at the constellation, combines Ω downstream channels emanating from Ω distributors of the constellation into a downstream multichannel link directly routed to the access node.

The first spectral demultiplexer, at the access node, separates the Ω downstream channels, with each downstream channel coupled to a respective optical-to-electrical converter preceding an input port of the access node.

Each distributor of the plurality of distributors comprises a respective distributing mechanism and a respective distributor controller configured to schedule paths through the respective distributing mechanism. Optionally, a distributor controller may establish a path from an upstream channel originating from an access node coupled to the distributor to a downstream channel directed to the same access node; thus, enabling the access node to test a round-trip path through the distributor.

Figure 19:
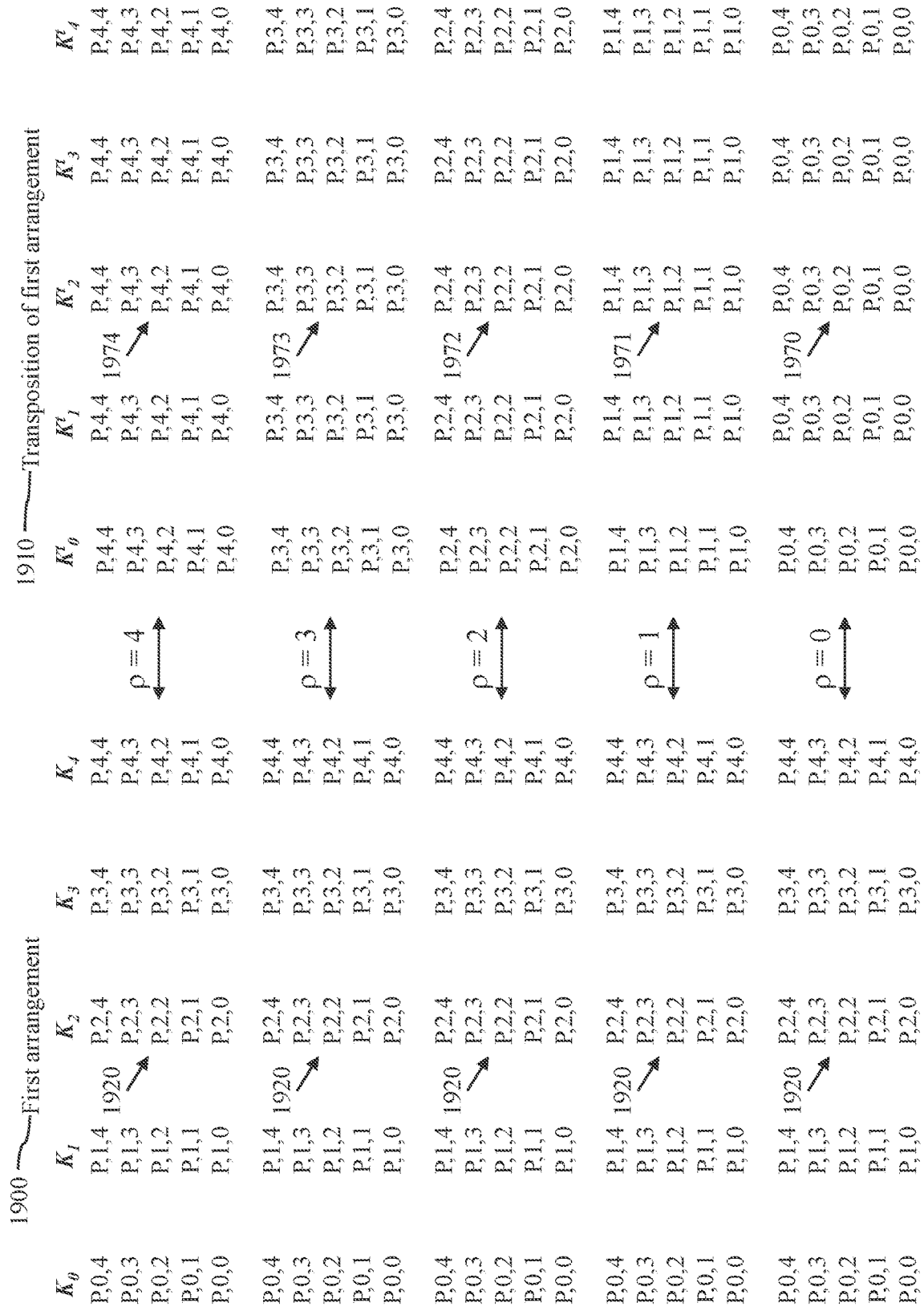
FIG. 19 illustrates a first arrangement of access nodes of an access band into a number Ω of type-1 formations of access nodes, each type-1 formation having a number Ω of type-1 sets of access nodes, each type-1 set of access nodes having a respective number of access nodes not exceeding a predetermined upper bound, the figure also illustrates a transposition of the Ω type-1 formations, in accordance with an embodiment of the present invention.

FIG. 19 illustrates a first arrangement 1900, and a transposition 1910 of the first arrangement 1900, of access nodes of an access band into Ω type-1 formations $\kappa_j$, $0 \leq j < \Omega$, of access nodes, $\Omega=5$, each formation comprising Ω identical type-1 sets of access nodes of a respective group. Each set of access nodes comprises a respective number of access nodes not exceeding a predetermined upper bound m, m>1. In the illustrated example, each type-1 set comprises five access nodes. An access node belonging to a group $\gamma$, $0 \leq \gamma < \Omega$, of a band $\beta$, $0 \leq \beta < \Pi$, is identified as $(\beta, \gamma, \nu)$, where $\nu$ is an index of the access node within the group, $0 \leq \nu < M(\beta,\gamma)$, $M(\beta,\gamma)$ being the number of access node.

In the illustrated example, $\Omega=5$, and the five type-1 formations of the first arrangement are denoted as $\{\kappa_0, \kappa_1, \kappa_2, \kappa_3, \kappa_4\}$. Each type-1 formation comprises Ω type-1 sets of access nodes. For example, type-1 formation $\kappa_2$ comprises five type-1 sets 1920, with each of the five type-1 sets comprises access nodes {(P,2,0), (P,2,1), (P,2,2), (P,2,3), (P,2,4)}.

Thus, an access node of index $\nu$ within a group of index $\gamma$ of a band of index $\beta$ is allocated to Ω type-1 sets of indices $\rho$, $0 \leq \rho < \Omega$, of a type-1 formation of index $\gamma$. The Π bands are indexed sequentially between 0 and (Π−1), groups within any band are indexed sequentially between 0 and (Ω−1), and access nodes within a group are indexed sequentially in steps of 1.

Equivalently, a type-1 set of index $\rho$ of a type-1 formation of index $\chi$, of a band of index $\beta$, $0 \leq \rho < \Omega$, $0 \leq \chi < \Omega$, $0 \leq \beta < \Pi$, comprises a number $M(\beta,\gamma)$ of access nodes of indices $(\beta,\gamma,\nu)$ where $\gamma=\chi$, and $0 \leq \nu < M(\beta,\gamma)$, wherein said Π bands are indexed sequentially between 0 and (Π−1), groups within any band are indexed sequentially between 0 and (Ω−1), and access nodes within a group are indexed sequentially in steps of 1.

The transposed arrangement is formed from the first arrangement and contains the same type-1 sets but in a different order. The type-1 sets of each of formations $\{\kappa_0, \kappa_1, \kappa_2, \kappa_3, \kappa_4\}$ are rearranged to form formations denoted as $\{\kappa^t_0, \kappa^t_1, \kappa^t_2, \kappa^t_3, \kappa^t_4\}$ so that formation $\kappa^t_j$ contains type-1 sets of indices k, $0 \leq k < \Omega$, of type-1 formations of indices k, $0 \leq j < \Omega$. Thus, each formation of the transposed arrangement comprises type-1 sets of a row of type-1 sets of the first formation. The five type-1 sets 1920 comprise access nodes of the group of index 2 of formation $\kappa_2$. Each of sets {1970, 1971, 1972, 1973, 1974} comprises access nodes of a respective group. Each formation $\kappa^t_j$, $0 \leq j < \Omega$, contains the access nodes of the access band under consideration.

Figure 20:
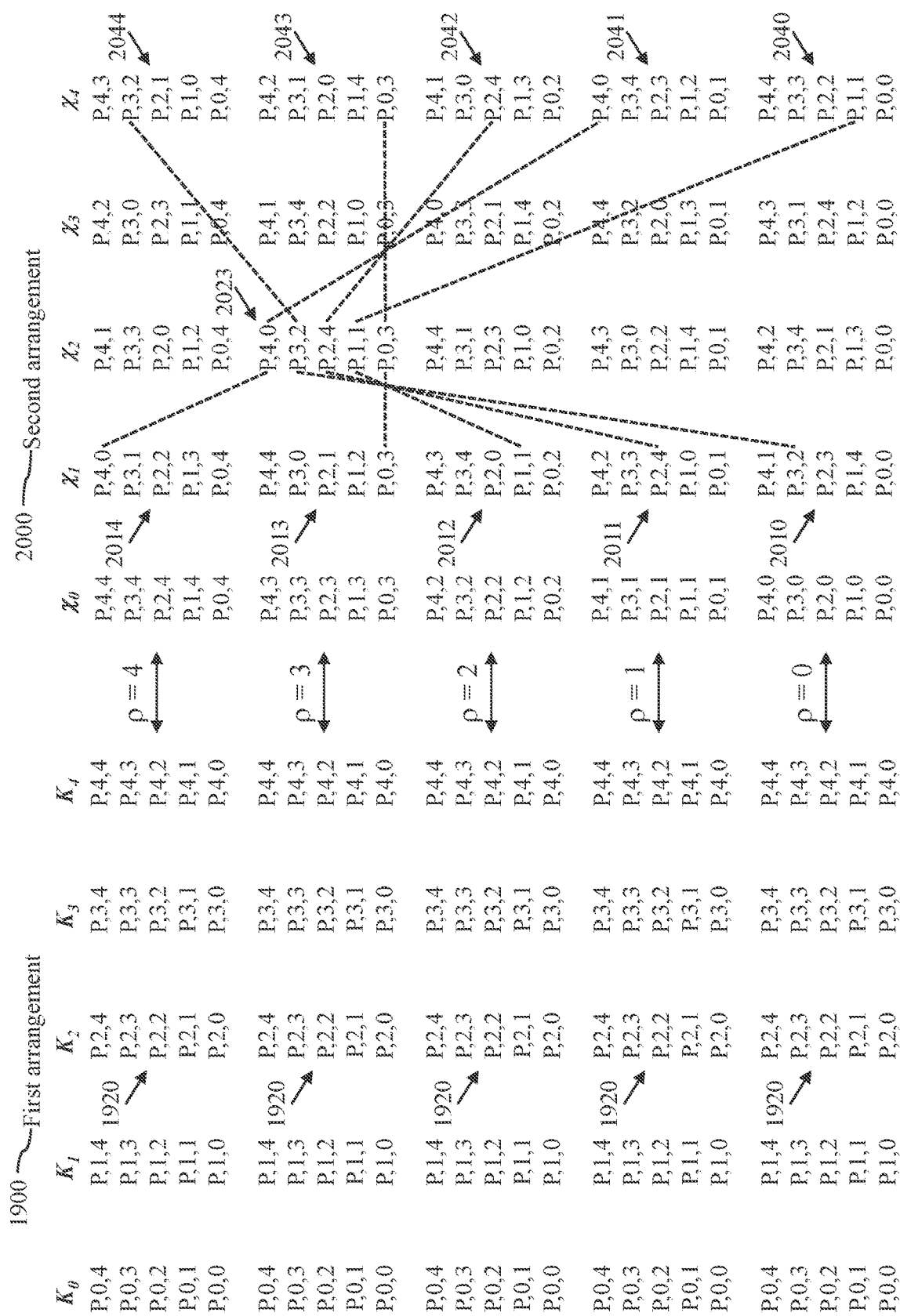
FIG. 20 illustrates the first arrangement of FIG. 19 and a second arrangement of access nodes of an access band into a number Ω of type-2 formations of access nodes, each type-2 formation having a number Ω of type-2 sets of access nodes, in accordance with an embodiment of the present invention.

FIG. 20 illustrates both the first arrangement 1900 of FIG. 19 and a second arrangement 2000 of access nodes of an access band into Ω type-2 formations of access nodes, $\Omega=5$, each formation comprising Ω type-2 sets of access nodes, each type-2 set comprising at least one access node of each group of the access band selected so that:
 the sets of each type-2 formation are disjoint; and
 each type-2 set of any type-2 formation is orthogonal to each type-2 set of each other type-2 formation, having at most a predefined number of common access node.

The predefined number is a rounded-up ratio of an upper bound of said respective number of access nodes and said number, Ω, of groups per band.

Each type-2 formation $\chi_j$, $0 \leq j < \Omega$, comprises the access nodes of the access band under consideration. Thus, the Ω type-2 set of each type-2 formation are mutually disjoint. However, each type-2 set of any type-2 formation is orthogonal to each type-2 set of other type-2 formations. For example, comparing set 2032 of type-2 formation $\chi_2$, which comprises access nodes {P,0,3, P,1,1, P,2,4, P,3,2, P,4,0}, with type-2 sets 2010, 2011, 2012, 2013, and 2014, it is seen that access node P,0,3 is present in type-2 set 2013, access node P,1,1 is present in type-2 set 2012, access node P,2,4 is present in type-2 set 2011, access node P,3,2 is present in type-2 set 2010, and access node P,4,0 is present in type-2 set 2014. Likewise, access nodes {P,0,3, P,1,1, P,2,4, P,3,2, P,4,0}, are present in type-2 sets 2043, 2040, 2042, 2044, and 2041, respectively.

Thus, an access node of index $\nu$ within a group of index $\gamma$ of a band of index $\beta$, is allocated to Ω type-2 sets of indices $(v+\gamma\times\chi)_{modulo\ \Omega}$, $\chi$ being an index of a type-2 formation, $0 \leq \chi < \Omega$, where $0 \leq v < M(\beta,\gamma)$, $0 \leq \gamma < \Omega$, $0 < \beta < \Pi$, $M(\beta,\gamma)$ denoting a predetermined number of access nodes within a group of index $\gamma$ of a band of index $\beta$. The $\Pi$ bands are indexed sequentially between 0 and ($\Pi-1$), groups within any band are indexed sequentially between 0 and ($\Omega-1$), and access nodes within a group are indexed sequentially in steps of 1.

Equivalently, a type-2 set of index $\rho$ of a type-2 formation of index $\chi$, of a band of index $\beta$, $0 \leq \rho < \Omega$, $0 \leq \chi < \Omega$, $0 \leq \beta < \Pi$, comprises a number $M(\beta,\gamma)$ of access nodes of indices $(\beta,\gamma,v)$ where for each value of $\gamma$, $0 \leq \gamma < \Omega$, there are $(J+1)$ values of $v$ determined as:

$$((\rho-\gamma\times\chi)_{modulo\Omega}+J\times\Omega),\ 0 \leq J < \lceil M(\beta,\gamma)/\Omega \rceil.$$

Allocating Access Nodes to First-Order Constellations:
First Connectivity Pattern (FIG. 14)

An access node $(P,\gamma,v)$, $0 \leq P < \Pi$, $0 \leq \gamma < \Omega$, $0 \leq v < M(P,\gamma)$ connects to constellation $Q(P,R)$, $0 \leq P < R < \Pi$ through (dual channels, one to each of $\Omega$ distributors $S(\gamma,\chi)$, $0 \leq \chi < \Omega$.

An access node $(R,\gamma,v)$, $0 \leq \gamma < \Omega$, $0 \leq v < M(R,\gamma)$ connects to constellation $Q(P,R)$ through $\Omega$ dual channels, one to each of $\Omega$ distributors $S(\rho,\gamma)$, $0 \leq \rho < \Omega$.

Conversely, a distributor $S(\rho,\chi)$, $0 \leq \rho < \Omega$, $0 \leq \chi < \Omega$, connects to a dual channel from each of access nodes:

(P, $\rho$, v), $0 \leq \chi < \Omega$, $0 \leq v < M(P,\rho)$ and (R, $\chi$, v), $0 \leq \rho < \Omega$, $0 \leq v < M(R,\chi)$.

Allocating Access Nodes to Second-Order Constellations:
Second Connectivity Pattern (FIG. 15)

As described above, the network comprises a plurality of access nodes of identifiers $(\beta,\gamma,v)$, $0 \leq \beta < \Pi$, $0 \leq \gamma < \Omega$, $0 \leq v < M(\beta,\gamma)$. The network comprises a maximum of $(\Pi \times (\Pi-1)/2$ inter-band constellations which may comprise a mix of first-order constellations, type-I second-order constellations, and type-II second-order constellations. As mentioned above, the use of second-order constellations eliminates the need for intra-band constellations.

With second-order fusing, each pair of access bands connects to a respective constellation, with one band, denoted "joined band", connecting in a first mode and one band, denoted "fusing band", connecting in a second mode.

According to the first mode, each distributor of a constellation connects, through dual channels, to each access node of one access group of the joined band.

According to the second mode, each distributor of the constellation connects, through dual channels, to at least one access node of each access group of the fusing band. The selection of the at least one access node ensures that each access node of the fusing band has a single-hop path (through one distributor) to: each access node of the joined band; and each access node of each other group of the fusing band.

Several connectivity patterns may be devised to realize this condition. A simple connectivity pattern, applicable when the number, $\Omega$, of access groups per band is a prime number is described below.

In a type-I second-order constellation, an access node $(P,\gamma,v)$, $0 < P < R < \Pi$, $0 \leq \gamma < \Omega$, $0 \leq v < M(P,\gamma)$ connects to constellation $\Phi(P,R)$ through $\Omega$ dual channels, one to each of $\Omega$ distributors $S(\rho,\gamma)$, $0 \leq \rho < \Omega$.

An access node $(R,\gamma,v)$, $0 \leq \gamma < \Omega$, $0 \leq v < M(R,\gamma)$ connects to constellation $\Phi(P,R)$ through $\Omega$ dual channels, one to each of $\Omega$ distributors:

$S(\rho,\chi)$, $\rho=(v+\gamma\times\chi)_{modulo\ \Omega}$, $0 \leq \chi < \Omega$.

Conversely, distributor $S(\rho,\chi)$, $0 \leq \rho < \Omega$, $0 \leq \chi < \Omega$, connects to a dual channel from each of access nodes:

$(P,\chi,v)$, $0 \leq v < M(P,\chi)$, and $(R,\gamma,v)$, $v=((\rho-\gamma\times\chi)_{modulo\Omega}+J\times Q) < M(R,\gamma)$, $0 \leq \gamma < \Omega$, $0 \leq J < \lceil M(R,\gamma)/\Omega \rceil$.

In a type-II second-order constellation, an access node $(P,\gamma,v)$, $0 \leq \gamma < \Omega$, $0 \leq v < M(P,\gamma)$ connects to constellation $\Theta(P,R)$, $0 \leq P < R < \Pi$ through $\Omega$ dual channels, one to each of $\Omega$ distributors:

$S(\rho,x)$, $\rho=(v+\gamma\times\chi)_{modulo\ \Omega}$, $0 \leq \chi < \Omega$.

An access node $(R,\gamma,v)$, $0 \leq \gamma < \Omega$, $0 \leq v < M(R,\gamma)$ connects to constellation $\Theta(P,R)$ through $\Omega$ dual channels, one to each of $\Omega$ distributors $S(\rho,\gamma)$, $0 \leq \rho < \Omega$.

Conversely, distributor $S(\rho,\chi)$, $0 \leq \rho < \Omega$, $0 \leq \chi < \Omega$, connects to a dual channel from each of access nodes:

$(P,\gamma,v)$, $v=((\rho-\gamma\times\chi)_{modulo\Omega}+J\times\Omega)<M(P,\gamma)$, $0 \leq \gamma < \Omega, 0 \leq J < \lceil M(P,\gamma)/\Omega \rceil$;

and $(R,\chi,v), 0 \leq \rho < \Omega$, $0 \leq v < M(R,\chi)$.

Figure 21:
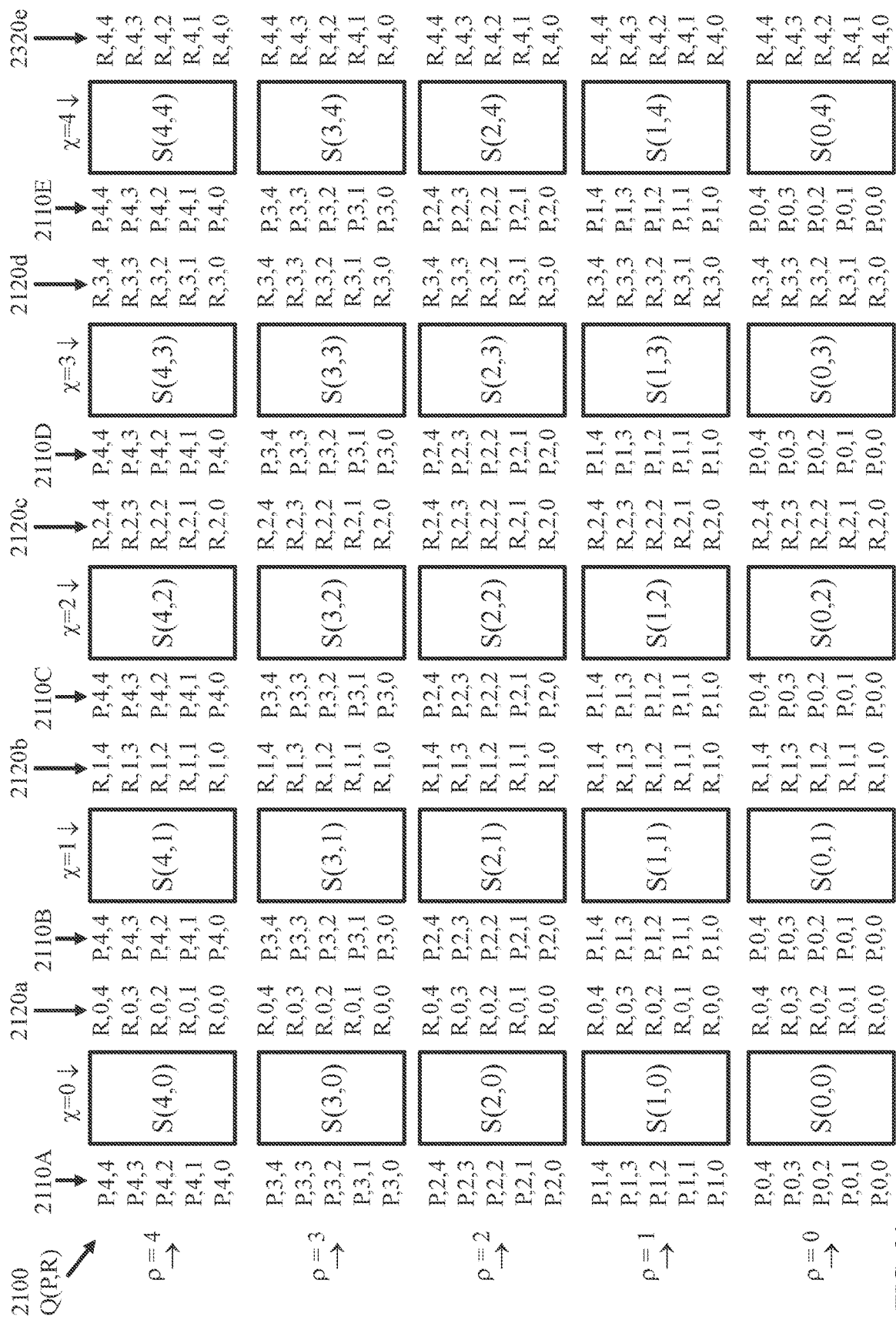
FIG. 21 illustrates connectivity of distributors of an exemplary first-order constellation of distributors connecting to access nodes of two access bands with each access band comprising five access groups and the access groups having equal numbers of access nodes, where one access band is arranged into type-1 formations and the other access band is arranged into a transposition of the type-1 formations, in accordance with an embodiment of the present application.

FIG. 21 illustrates a connectivity pattern 2100 of distributors of an exemplary inter-band first-order constellation $Q(P,R)$, $0 \leq P < R < \Pi$. The constellation connects to access nodes of two access bands with each access band comprising five access groups ($\Omega=5$) and the access groups having equal numbers of access nodes, where one access band is arranged into $\Omega$ type-1 formations and the other access band is arranged into a transposition of the type-1 formations.

The constellation comprises $\Omega^2$ distributors, denoted $S(\rho,\chi)$, $0 \leq \rho < \Omega$, $0 \leq \chi < \Omega$, logically arranged into a matrix of $\Omega$ rows and $\Omega$ columns. The number of access nodes per access group may vary between 2 and m. However, in the constellation of FIGS. 21, 22, and 23, the number is selected to be five for each access group to simplify the presentation. A distributor $S(\rho,\chi)$ connects to access nodes of an access group of index $\rho$ of access band P and access nodes of an access group of index $\chi$ of access band R. Each access node of access band P connects to the constellation through $\Omega$ dual channels. Likewise, each access node of access band R connects to the constellation through $\Omega$ dual channels. With each access group of access-band P or access-band R connecting to respective $\Omega$ distributors, each access node of any access group has $\Omega$ single-hop paths to any access node of the same access group.

As described above, an access node $(P,\gamma,v)$, $0 < P < \Pi$, $0 \leq \gamma < \Omega$, $0 \leq v < M(P,\gamma)$ connects to constellation $Q(P,R)$ through $\Omega$ dual channels, one to each of $\Omega$ distributors $S(\gamma,\chi)$, $0 \leq \chi < \Omega$. An access node $(R,\gamma,v)$, $0 \leq P < R < \Pi$, $0 \leq \gamma < \Omega$, $0 \leq v < M(R,\gamma)$ connects to constellation $Q(P,R)$ through $\Omega$ dual channels, one to each of $\Omega$ distributors $S(\rho,\gamma)$, $0 \leq \rho < 22$. For example, access node (P,2,3) connects to distributors S(2,0), S(2,1), S(2,2), S(2,3), and S(2,4) while access node R (2,3) connects to distributors S(0,2), S(1,2), S(2,2), S(3,2), and S(4,2). Thus, each access node of access band P has a single-hop path to each access node of access band R through a respective distributor.

The distributors are labeled, according to their positions in the matrix, as $S(\rho,\chi)$, $0 \leq \rho < \Omega$, $0 \leq \chi < \Omega$. Each distributor of a row $\rho$ connects to each access node of an access group of a relative index $\rho$ within access-band P. Each distributor of a column $\chi$ connects to each access node of an access group of a relative index χ within access band R. Thus, each access node of each access group of access band P or access-band R has Ω parallel dual single-hop paths to each other access node of a same access group through respective Ω distributors. For example, access node (P,2,3), of access-group 2 of access-band P, has Ω dual single-hop paths (Ω=5) to access node (P,2,0), one through each of distributors S(2,0), S(2,1), S(2,2), S(2,3), and S(2,4). Access node (R,2,3) has Ω dual single-hop paths to access node (R,2,0), one through each of distributors S(0,2), S(1,2), S(2,2), S(3,2), and S(4,2).

Each access node of access band P has one dual single-hop path to each access node of access-band R. Equivalently, each access node of access band R has one dual single-hop path to each access node of access-band P. For example, access node (P,2,3) may connect to:
- any of access nodes (R,0,0), (R,0,1), (R,0,2), (R,0,3), (R,0,4) through distributor S(2,0);
- any of access nodes (R,1,0), (R,1,1), (R,1,2), (R,1,3), (R,1,4) through distributor S(2,1);
- any of access nodes (R,2,0), (R,2,1), (R,2,2), (R,2,3), (R,2,4) through distributor S(2,2);
- any of access nodes (R,3,0), (R,3,1), (R,3,2), (R,3,3), (R,3,4) through distributor S(2,3); and
- any of access nodes (R,4,0), (R,4,1), (R,4,2), (R,4,3), (R,4,4) through distributor S(2,4).

As described above, each access node connects directly to a constellation through a WDM link of Ω channels. Thus, each access node may connect simultaneously, through Ω different distributors, to Ω other access nodes of a same access group of a same access band or different access groups of another band.

The distributors of each column of the matrix of distributors collectively connect to: each access node of access-band P through a respective dual channel; and each access node of a respective access group of access-band R through a respective set of Ω dual channels. Access nodes of formation 2110 of a transposed arrangement of Ω type-1 formations connect to dual ports of a respective column of distributors within a first-order constellation. Access nodes of formation 2120 of a type-1 formation connect to dual ports of a respective column of distributors within the first-order constellation. With each band arranged into of Ω type-1 formations or Ω type-2 formations, for Ω=5, the formations indicated in FIG. 21 are individually identified as {2110A, 2110B, 2110C, 2110D, 2110E} and {2120a, 2120b, 2120c, 2120d, 2120e}.

Figure 22:
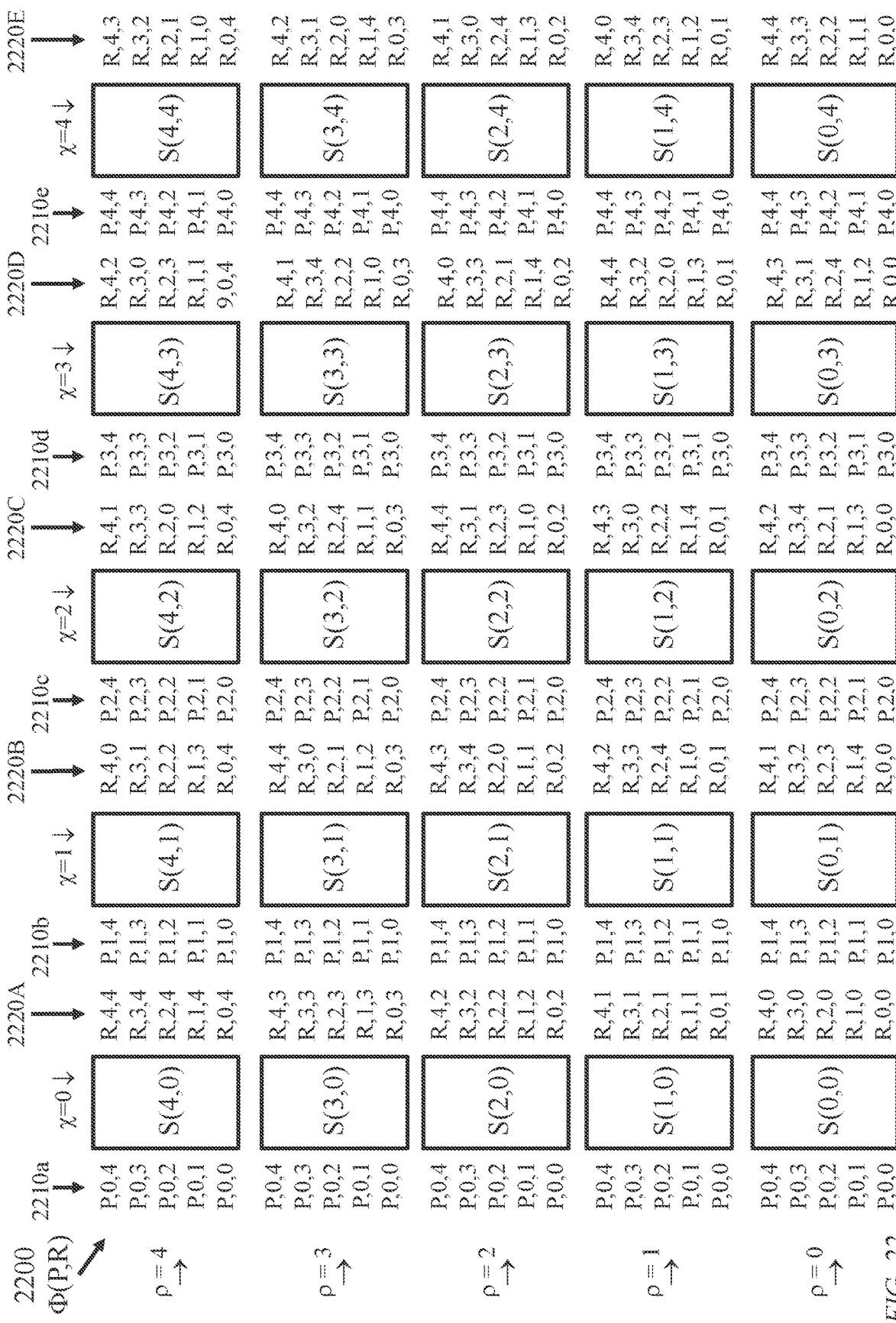
FIG. 22 illustrates connectivity pattern of distributors of an exemplary type-I second-order constellation connecting to a pair of access bands where each access band comprises five access groups with the access groups having equal numbers of access nodes, where, for an ordered pair, the first access band is arranged into Ω type-1 formations and the second access band is arranged into Ω type-2 formations, in accordance with an embodiment of the present application.

FIG. 22 illustrates a connectivity pattern 2200 of distributors of an exemplary type-I second-order constellation Φ(P,R), 0≤P<R<Π, connecting to a pair of access bands, where, for an ordered pair, the first access band is arranged into Ω type-1 formations and the second access band is arranged into Ω type-2 formations. Each access band comprises five access groups with the access groups having equal numbers of access nodes.

The constellation comprises $\Omega^2$ distributors, denoted S(ρ, χ), 0≤ρ<Ω, 0≤χ<Ω, logically arranged into a matrix of Ω rows and Ω columns. A distributor S(ρ,χ) connects to access nodes of one access group of index χ of access band P and access nodes of Ω access groups of access band R. Each access node of any access group of access band P has Ω single-hop paths to any access node of the same access group.

The allocation of the access nodes of access-band R is selected so that each access node (R,γ,ν), 0≤R<Π, 0≤γ<Ω, 0≤ν<M(R,γ) connects to constellation Φ(P,R) through Ω dual channels, one to each of Ω distributors. Several allocation patterns may be devised. For example, selecting the number Ω of access groups per access band to be a prime number, the allocation may be determined as:

$$S(\rho,\chi),\ 0\le\chi<\Omega,\ \rho=(\nu+\gamma\times\chi)_{modulo\ \Omega}.$$

An access node (P,γ,ν), 0≤P<R<Π, 0≤γ<Ω, 0≤ǁ<M(P,γ) connects to constellation Φ(P,R) through Ω dual channels, one to each of Ω distributors S(ρ,γ), 0≤ρ<Ω. For example, access node P(2,3) connects to distributors S(0,2), S(1,2), S(2,2), S(3,2), and S(4,2) while access node (R,2,3) connects to distributors S(3,0), S(0,1), S(2,2), S(4,3), and S(1,4).

A type-1 formation 2210 connects to dual ports of a column of distributors within a type-I second-order constellation. A type-2 formation 2220 connects to dual ports of a column of distributors within the type-I second-order constellation. The distributors of each column of the matrix of distributors collectively connect to: each access node of a respective access group of band P through a respective set of Ω dual channels; and each access node of band R through a respective dual channel, with each distributor connecting to access nodes of different access groups of band R, thus providing inter-group connectivity. With each band arranged into of Ω type-1 formations or Ω type-2 formations, for Ω=5, the formations indicated in FIG. 22 are individually identified as {2210a, 2210b, 2210c, 2210d, 2210E} and {2220A, 2220B, 2220C, 2220D, 2220E}.

Figure 23:
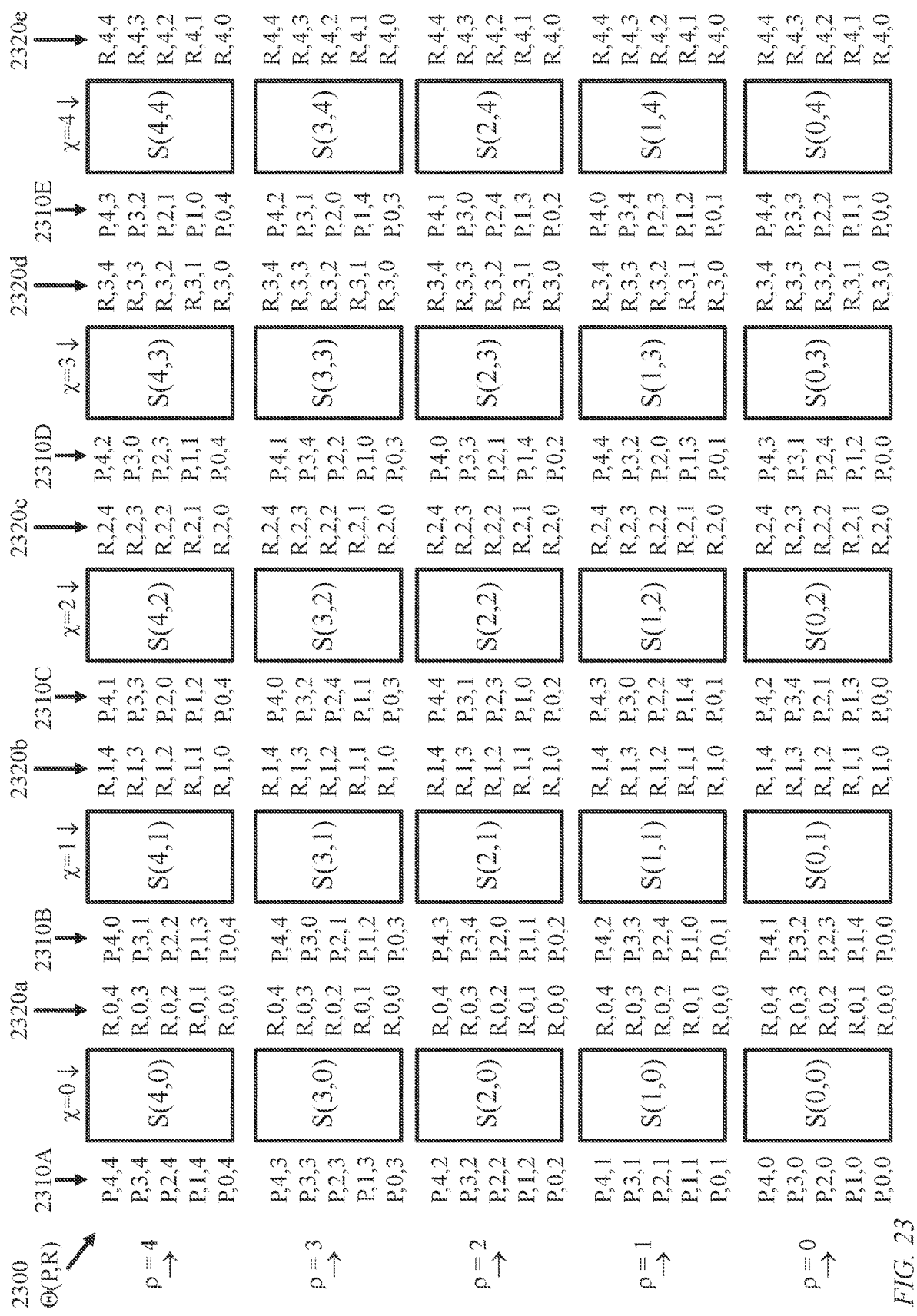
FIG. 23 illustrates connectivity pattern of distributors of an exemplary type-II second-order constellation which resembles the type-I second-order constellation, the only difference being, for an ordered pair, the first access band is arranged into Ω type-2 formations and the first access band is arranged into Ω type-2 formations.

FIG. 23 illustrates a connectivity pattern 2300 of distributors of an exemplary type-II second-order constellation Θ(P,R), 0≤P<R<Π, connecting to a pair of access bands, where, for an ordered pair, the first access band is arranged into Ω type-2 formations and the second access band is arranged into Ω type-1 formations. Each access band comprises five access groups with the access groups having equal numbers of access nodes.

The constellation comprises $\Omega^2$ distributors, denoted S(ρ, χ), 0≤ρ<Ω, 0≤χ<Ω, logically arranged into a matrix of Ω rows and Ω columns. A distributor S(ρ,χ) connects to access nodes of access groups of access band P and access nodes of one access group of index χ of access band R. Each access node of any access group of access band R has Ω single-hop paths to any access node of the same access group.

The allocation of the access nodes of access-band P is selected so that each access node (P,γ,ν), 0≤P<R<Π, 0≤γ<Ω, 0≤ν<M(P,γ) connects to constellation Θ(P,R) through Ω dual channels, one to each of Ω distributors. Several allocation patterns may be devised. For example, selecting the number Ω of access groups per access band to be a prime number, the allocation may be determined as:

$$S(\rho,\chi),\ 0\le\chi<\Omega,\ \rho=(\nu+\gamma\times\chi)_{modulo\ \Omega}.$$

An access node (R,γ,ν), 0≤γ<Ω, 0≤ν<M(R,γ) connects to constellation Θ(P,R) through Ω dual channels, one to each of Ω distributors S(ρ,γ), 0≤ρ<Ω. For example, access node (P,2,3) connects to distributors S(3,0), S(0,1), S(2,2), S(4,3), and S(1,4) while access node R (2,3) connects to distributors S(0,2), S(1,2), S(2,2), S(3,2), and S(4,2).

Each access node of each access group of access band P has one dual single-hop path to each other access node of the same access band. For example, access node (P,2,3) may connect to:
- any of access nodes (P,0,3), (P,1,3), (P,3,3), (P,4,3) through distributor S(3,0);
- any of access nodes (P,0,0), (P,1,4), (P,3,2), (P,4,1) through distributor S(0,1);
- any of access nodes (P,0,2), (P,1,0), (P,3,1), (P,4,4) through distributor S(2,2);

any of access nodes (P,0,4), (P,1,1), (P,3,0), (P,4,2) through distributor S(4,3); and any of access nodes (P,0,1), (P,1,2), (P,3,4), (P,4,0) through distributor S(1,4).

Likewise, each access node of any access group within access band P has a single-hop dual path to each access node of each other access group within access band P.

As in a first-order constellation Q(P,R), each access node of each access group of access band P has one dual single-hop path to each access node of each access group of access-band R. For example, access node (P,2,3) may connect to:

any of access nodes (R,0,0), (R,0,1), (R,0,2), (R,0,3), (R,0,4) through distributor S(3,0);

any of access nodes (R,1,0), (R,1,1), (R,1,2), (R,1,3), (R,1,4) through distributor S(0,1);

any of access nodes (R,2,0), (R,2,1), (R,2,2), (R,2,3), (R,2,4) through distributor S(2,2);

any of access nodes (R,3,0), (R,3,1), (R,3,2), (R,3,3), (R,3,4) through distributor S(4,3); and any of access nodes (R,4,0), (R,4,1), (R,4,2), (R,4,3), (R,4,4) through distributor S(1,4).

Equivalently, each access node of access band R has one dual single-hop path to each access node of access-band P.

A type-2 formation 2310 connects to dual ports of a column of distributors within a type-II second-order constellation. A type-1 formation 2320 connects to dual ports of a column of distributors within the type-II second-order constellation. The distributors of each column of the matrix of distributors collectively connect to: each access node of access-band P through a respective dual channel; and each access node of a respective access group of access-band R through a respective set of $\Omega$ dual channels. The dual ports of a column of distributors connects to all access nodes of a single access group of access band R and connects to all access nodes of access-band P with each distributor connecting to access nodes of different access groups, thus providing inter-group connectivity. With each band arranged into of $\Omega$ type-1 formations or $\Omega$ type-2 formations, for $\Omega=5$, the formations indicated in FIG. 23 are individually identified as {2310A, 2310B, 2310C, 2310D, 2310E} and {2320a, 2320b, 2320c, 2320d, 2320e}.

A specific access node (P,3,2) connects to distributors S(2,0), S(0,1), S(3,2), S(1,3), and S(4,4) which provide single-hop paths from access node (P,3,2) to each access node of access band R, and to each access node of access band P excluding access nodes of access-group {P,3} to which access node (P,3,2) belongs. Thus, access node (P,3,2) connects to each of access nodes (R,γ,ν), 0≤γ<$\Omega$, 0≤ν<M(R,γ) and to each of access nodes (P,γ,ν), 0≤γ<$\Omega$, γ≠3, 0≤ν<M(P,γ).

Figure 24:
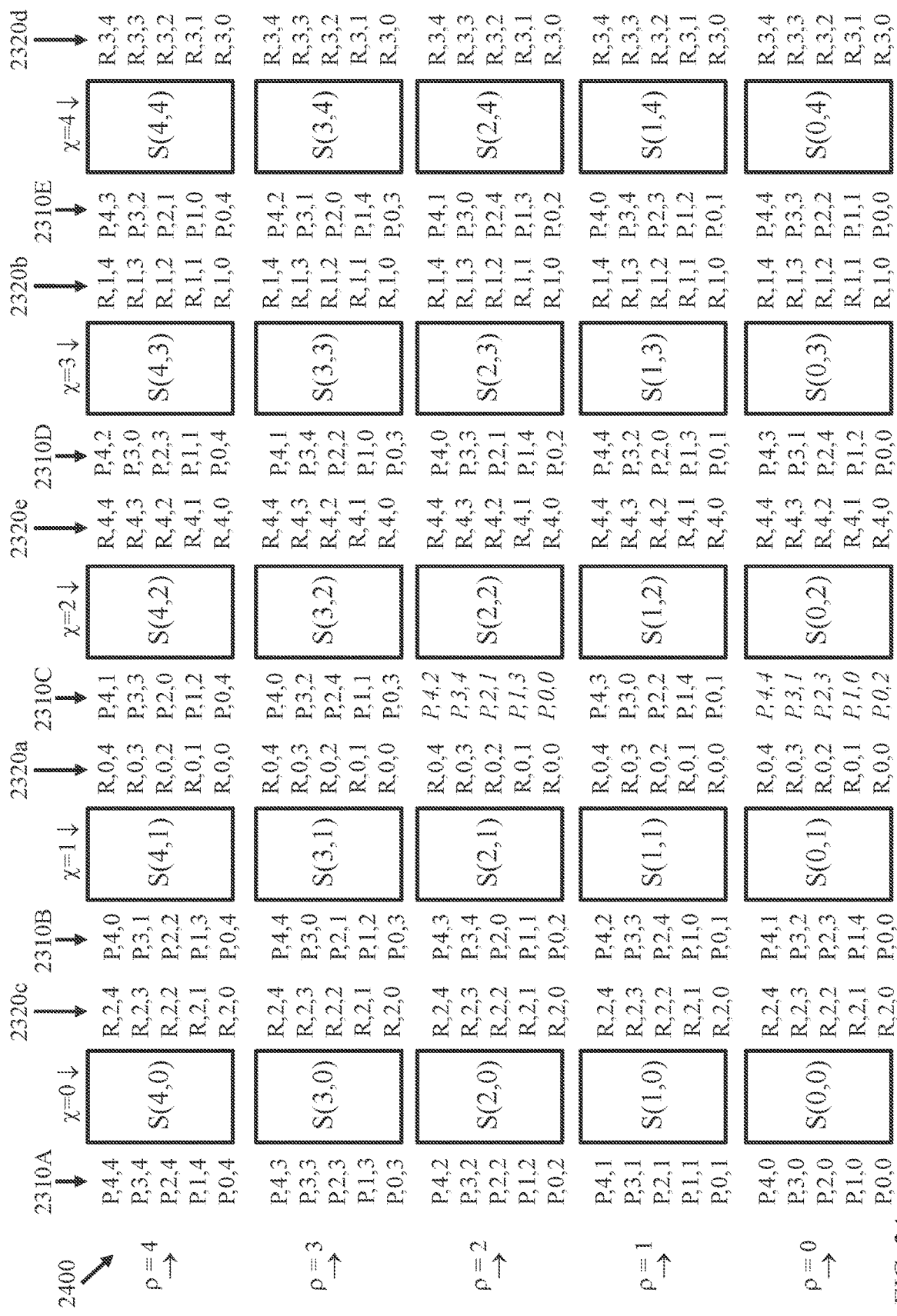
FIG. 24 illustrates a variant of the connectivity pattern of FIG. 23 with arbitrary order of formations or arbitrary order of sets of type-1 formation.

FIG. 24 illustrates a variant 2400 of the connectivity pattern of the constellation of FIG. 23. In the constellation of FIG. 23, access nodes of a band P and a band R, 0≤P<R<Π, interconnect through an $\Omega\times\Omega$ matrix of distributors. The access nodes of band P are arranged into $\Omega$ type-2 formations {2310A, 2310B, 2310C, 2310D, 2310E}. The access nodes of band R are arranged into $\Omega$ type-1 formations {2320a, 2320b, 2320c, 2320d, 2320e}.

Each of the $\Omega$ type-2 formations 2310 comprises $\Omega$ type-2 sets of access nodes, where each type-2 set of access nodes comprises one access node of each group of band P selected so that: (1) the type-2 sets of each type-2 formation are disjoint; and (2) each type-2 set of each type-2 formation is orthogonal to each type-2 set of each other type-2 formation, i.e., having at most a predefined number of common access nodes.

Each of the $\Omega$ type-1 formations 2320 comprises $\Omega$ identical type-1 sets of access nodes of a respective group.

A type-1 formation may be paired with any type-2 formation to connect to a respective column of distributors. The type-1 sets of access nodes of the type-1 formation are identical. The type-2 sets of access nodes of the paired type-2 formation are disjoint. A distributor of the respective column of distributors may connect to any type-1 set of the type-1 formation and any type-2 set of the paired type-2 formation.

Any type-1 set of access nodes of any type-1 formation (2320a, 2320b, 2320c, 2320d, or 2320e) of band R and any type-2 set of access nodes of a paired type-2 formation (2310A, 2310B, 2310C, 2310D, or 2310E) may connect to a same distributor.

In the constellation of FIG. 23, the pairs of formations {2310A, 2320a}, {2310B, 2320b}, {2310C, 2320c}, {2310D, 2320d}, and {2310E, 2320e} connect to respective columns of distributors of the $\Omega\times\Omega$ matrix of distributors.

In the constellation of FIG. 24, the pairs of formations {2310A, 2320c}, {2310B, 2320a}, {2310C, 2320e}, {2310D, 2320b}, and {2310E, 2320d} connect to respective columns of distributors of the $\Omega\times\Omega$ matrix of distributors.

In the constellation of FIG. 23:

distributor S(0,2) connects to one dual channel from each of access nodes of access set {P,0,0, P,1,3, P,2, 1, P,3,4, P,4,2} of band P and access nodes of access set {R,2,0, R,2,1, R,2,2, R,2,3, R,2,4} of band R; and distributor S(2,2) connects to one dual channel from each of access nodes of access set {P,0,2, P,1,0, P,2,3, P,3, 1, P,4,4} of band P and access nodes of access set {R,2,0, R,2,1, R (2,2, R,2,3, R,2,4} of band R.

In the constellation of FIG. 24:

distributor S(0,2) connects to one dual channel from each of access nodes of access set {P,0,2, P,1,0, P,2,3, P,3, 1, P,4,4} of band P and access nodes of access set {R,4,0, R,4,1, R,4,2, R,4,3, R,4,4} of band R; and distributor S(2,2) connects to one dual channel from each of access nodes of access set {P,0,0, P,1,3, P,2, 1, P,3,4, P,4,2} of band P and access nodes of access set {R,4,0, R,4,1, R,4,2, R,4,3, R,4,4} of band R.

FIG. 25 indicates, in a tabular form 2500, access nodes to which a specific access node (P,3,2) connects through respective single-hop paths within the constellation $\Theta$(P,R) of FIG. 23. Set 2520 of access nodes belongs to access-band P and set 2525 of access nodes belongs to access-band R. Access node (P,3,2) connects to the constellation through a WDM link comprising 22 individual dual channels (of 40 Gb/s capacity each, for example). The $\Omega$ dual channels ($\Omega=5$ in the example of FIG. 23) are individually connected to dual ports of a set of distributors 2510: S(2,0), S(0,1), S(3,2), S(1,3), and S(4,4).

Distributor S(2,0) connects access node (P,3,2) to access nodes (P,0,2), (P,1,2), (P,2,2), and (P,4,2) of access-band P, and to access nodes (R,0,0), (R,0,1), (R,0,2), (R,0,3), and R (0,4) of access-band R. Distributor S(3,2) connects access node (P,3,2) to access nodes (P,0,3), (P,1,1), (P,2,4), and (P,4,0) of access-band P, and to access nodes (R,2,0), (R,2, 1), (R,2,2), (R,2,3), and R (2,4) of access-band R. As indicated in FIG. 25 access node (P,3,2) of access-group 3 of access-band P has a dual single-hop path to each access node of each other access group of access band P, and a dual single-hop path to each access node of access-band R, through type-II second-order constellation $\Theta$(P,R).

Figure 26:
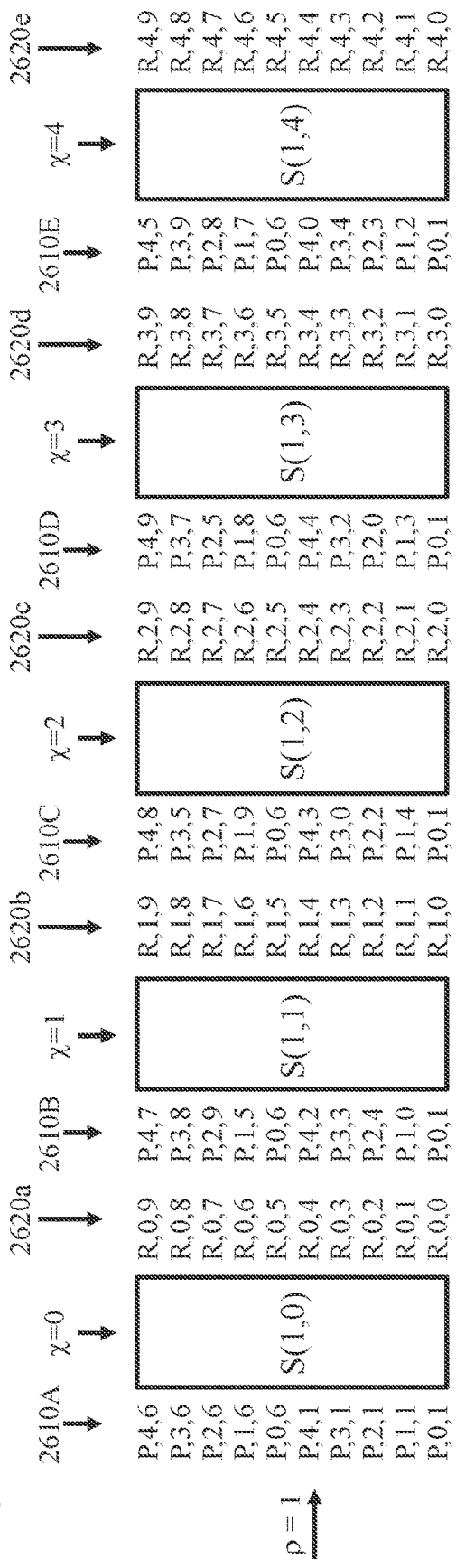
FIG. 26 illustrates connectivity pattern of distributors of an exemplary fully populated type-II second-order constellation where each access band comprises five access groups with each access group having ten access nodes.
Figure 26:
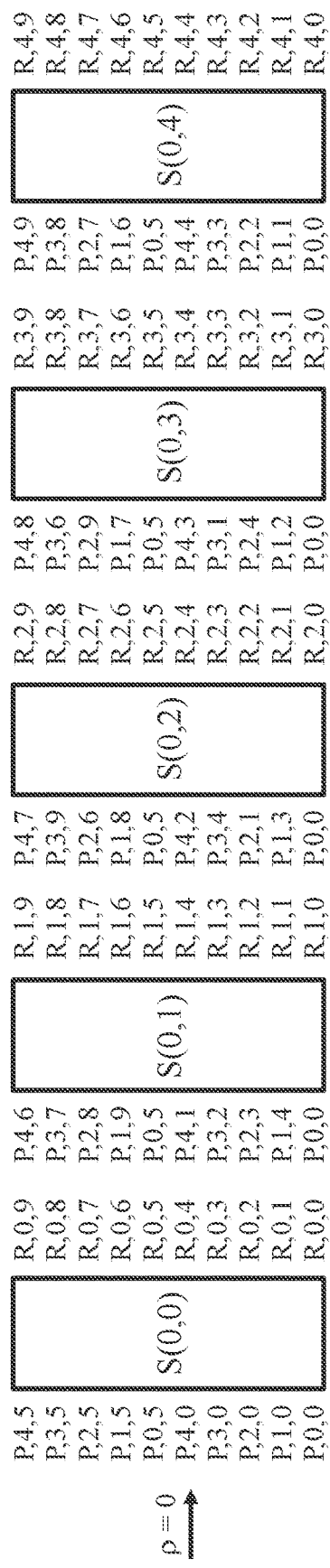

FIG. 26 illustrates connectivity pattern 2600 of distributors of an exemplary fully populated type-II second-order constellation where each access band comprises five access groups with each access group having ten access nodes. Connectivity pattern 2600 may be used as a generic allocation table for a growing network.

A type-2 formation 2610 connects to dual ports of a column of distributors within a type-II second-order constellation. A type-1 formation 2620 connects to dual ports of a column of distributors within the type-II second-order constellation. Formations 2610 and 2620 are similar to formations 2310 and 2320, respectively, with formations 2610 and 2620 having a larger number of access nodes. The formations indicated in FIG. 26 are individually identified as {2610A, 2610B, 2610C, 2610D, 2610E} and {2620a, 2620b, 2620c, 2620d, 2620e}.

Figure 27:
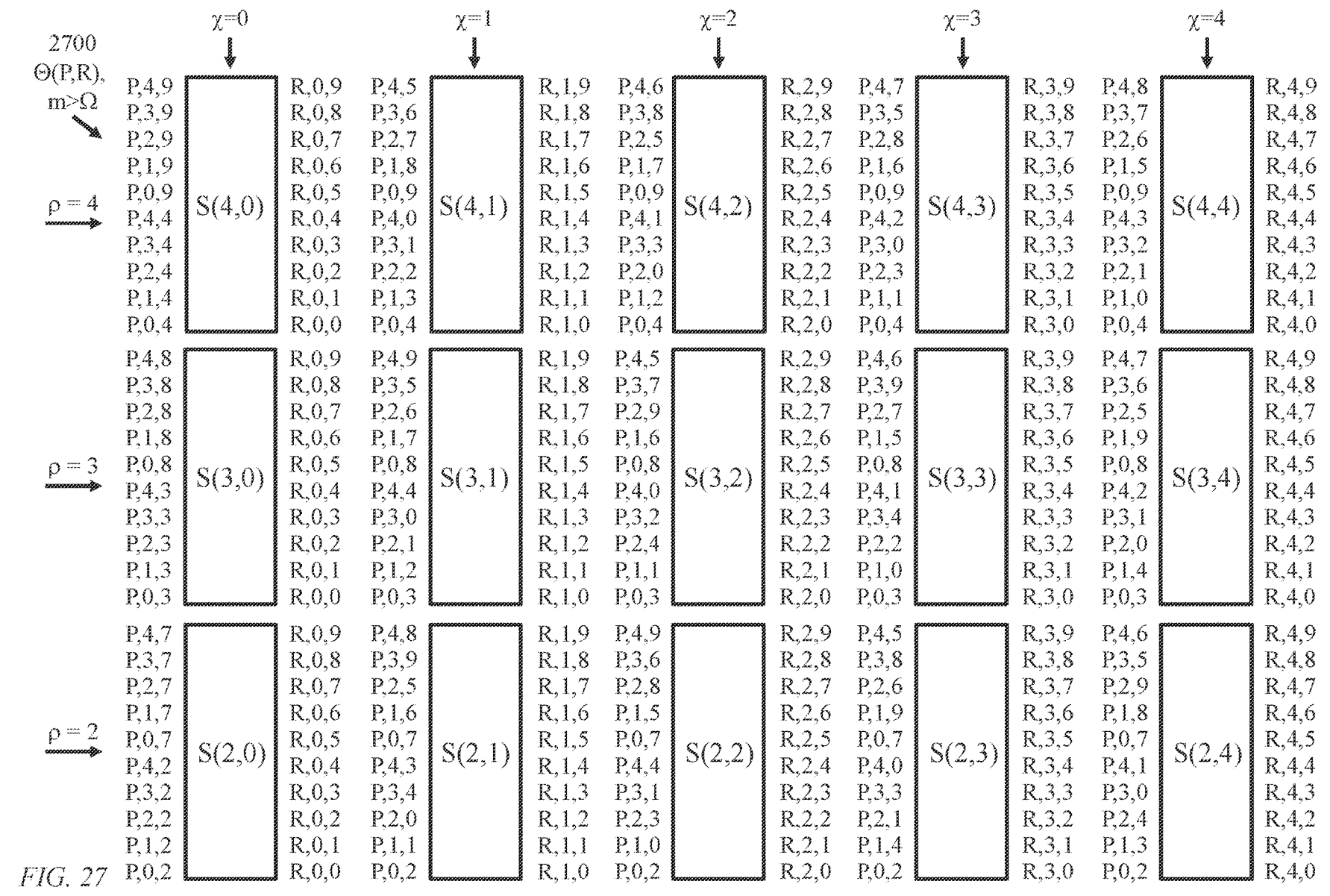

FIG. 27 is a continuation of FIG. 26.

An access node, of index ν within an access-group γ belonging to an access band β, $0≤β<(Π-1)$, with the access band connecting, in the second mode, as a fusing band to a constellation, is allocated to Ω distributors $S(ρ,χ)$:

$$ρ=(ν+γ×χ)_{modulo\ Ω}, 0≤χ<Ω, 0≤∥<m, 0≤γ<Ω.$$

An access node, of index ν within an access-group γ belonging to an access band β, $0<β<Π$, with the access band connecting, in the first mode, as a joined band to a constellation, is allocated to Ω distributors $S(ρ,χ)$: $0≤ρ<Ω$, $0≤ν<m$.

For example, for Ω=5 and m=10, access node (P, 3, 9), γ=3, ν=9, of a band P connecting to a constellation Θ(P,R) as a fusing band, has Ω dual channels to the constellation, one to each of distributors S(4,0), (2,1), (0,2), (3,3), and (1,4). Access node (P, 2, 7), γ=2, ν=7, of band P connects to distributors S(2,0), (4,1), (1,2), (3,3), and (0,4) of the constellation as indicated in Table-1 below.

TABLE 1

| Access node ↓ | χ → | 0 | 1 | 2 | 3 | 4 |
|---|---|---|---|---|---|---|
| P(3,9) | $ρ = (9 + 3 × χ)_{modulo\ Ω}$ → | 4 | 2 | 0 | 3 | 1 |
| P(2,7) | $ρ = (7 + 2 × χ)_{modulo\ Ω}$ → | 2 | 4 | 1 | 3 | 0 |

For Ω=5, m=10, access nodes (P, 3, ν), γ=3, 0≤ν<m, of a band R connecting to a constellation Θ(P,R) as a joined band, has Ω dual channels to the constellation, one to each of distributors S(0,3), (1,3), (2,3), (3,3), and (4,3). Access nodes (P, 2, ν), γ=2, 0≤ν<m, of band R connect to distributors S(0,2), (1,2), (2,2), (3,2), and (4,2) of the constellation.

Conversely, access nodes connecting to distributor $S(ρ,χ)$, $0≤ρ<Ω$, $0≤χ<Ω$, coupled to bands P and R are determined as:

$$(P,γ,ν):ν=(ρ-γ×χ)_{modulo\ Ω}+J×Ω)<m, 0≤J<⌈m/Ω⌉, 0≤γ<Ω;\ and$$

$$(R,γ,ν):0≤ν<m, γ=χ.$$

With five access groups per band and a maximum of ten access nodes per access group (Ω=5, m=10, 0≤J<2), a distributor $S(ρ,χ)$, ρ=3, χ=2, is allocated to access nodes (P,γ, ν):

(P,0,3), (P,0,8), (P,1,1), (P,1,6), (P,2,4), (P,2,9), (P,3,2), (P,3,7), (P,4,0), (P,4,5).

For band R, each distributor of column 2, i.e., $S(ρ,2)$, $0≤ρ<Ω$, connects to access nodes (R,2,ν), 0≤ν<m.

Figure 28:
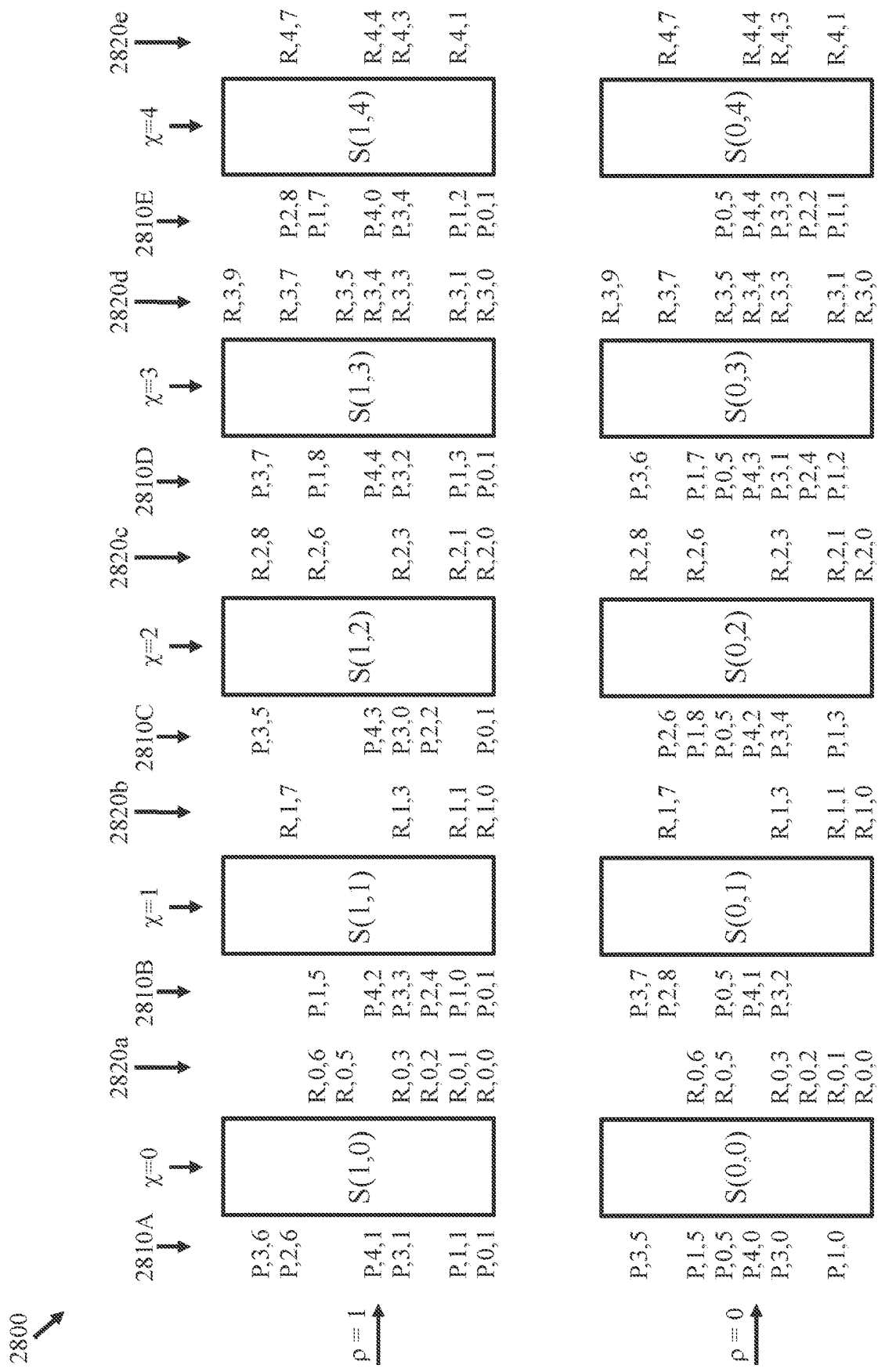
FIG. 28 illustrates connectivity of a partially populated type-II second-order constellation derived from the connectivity pattern of FIG. 26.

FIG. 28 illustrates connectivity 2800 of a partially populated type-II second-order constellation Θ(P,R) derived from allocation table for the case of FIG. 26 and FIG. 27. The partially populated formations indicated in FIG. 28 are individually identified as {2810A, 2810B, 2810C, 2810D, 2810E} and {2820a, 2820b, 2820c, 2820d, 2820e}.

Figure 29:
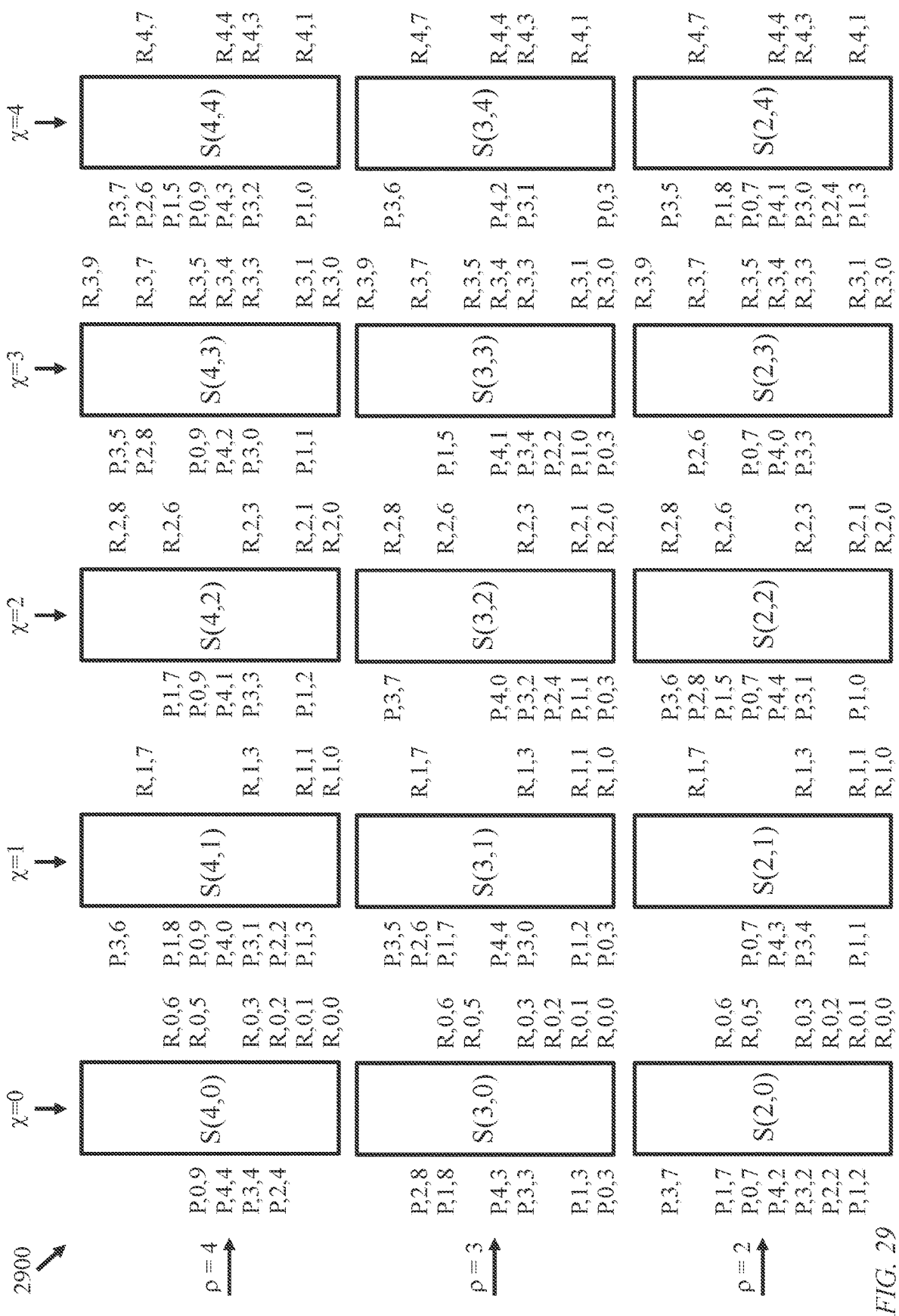
FIG. 29 is a continuation of FIG. 28.

FIG. 29 is a continuation 2900 of FIG. 28.

The number of access nodes of an access group may vary between 2 and the predefined upper bound, m. Without loss of generality, the number m may be selected as an integer multiple of the number, Ω, of groups per band. In the course of network growth, the number, $M(β,γ)$, of access nodes of a band β, group γ, 0≤β<Π, 0≤γ<Ω, may vary between 2 and the upper bound m.

Each type-2 set of each type-2 formation is orthogonal to each type-2 set of each other type-2 formation, having at most a predefined number of common access nodes. The predefined number is a rounded-up ratio of the upper bound, m, of the number of access nodes per access group, and the number, Ω, of groups per band.

For example, in FIG. 26 and FIG. 27, the m=10 and Ω=5. The number of common access nodes of any two type-2 sets of access nodes of different type-2 formations is (m/Ω)=2. If m is selected to be 9, for example, then the limit of common access nodes becomes ⌈9/5⌉=2.

In FIG. 22, Ω=5, m=5, access band β=P is arranged into 5 type-1 formations, each type-1 formation comprising 5 identical type-1 sets of access nodes of a respective group while access band β=R is arranged into 5 type-2 formations, each type-2 formation comprising 5 disjoint type-2 sets of access nodes; each pair of type-2 sets of different type-2 formations have one common access node ((m/Ω)=1).

In FIG. 23, Ω=5, m=5, access band β=P is arranged into 5 type-2 formations while access band β=R is arranged into 5 type-1 formations.

In FIG. 26 and FIG. 27, Ω=5, m=10, access band β=P is arranged into 5 type-2 formations while access band β=R is arranged into 5 type-1 formations. Each pair of type-2 sets of different type-2 formations have two common access nodes ((m/Ω)=2).

FIG. 28 and FIG. 29, are derived from FIG. 26 and FIG. 27, where access groups are partially provisioned. A pair of type-2 sets of different type-2 formations may have at most two common access nodes (⌈M(β,γ)/Ω⌉=2, β=P, 0≤γ<Ω). In a preferred implementation, a fully provisioned constellation connecting to fully provisioned access groups is determined as a target constellation. The fully provisioned constellation is then trimmed to generate a partially provisioned constellation connecting to access groups of different numbers of access nodes, as illustrated in FIG. 28 and FIG. 29.

Constellation Θ(P,R) connects to access bands P and R, each comprising five access groups (Ω=5), with each access group having a respective number of access nodes not exceeding the predetermined upper bound m as indicated in Table-2 below. Table-3 lists currently connected access nodes and Table-4 lists identifiers of "placeholder" access nodes for subsequent network growth.

TABLE 2

| Band | Access group index γ | 0 | 1 | 2 | 3 | 4 |
|---|---|---|---|---|---|---|
| P | Group size M(P,γ) | 5 | 7 | 4 | 8 | 5 |
| R | Group size M(R,γ) | 6 | 4 | 5 | 7 | 4 |

TABLE 3

Connected access nodes selected from the allocation table of FIG. 26 and FIG. 27:

| Access group of access-band P | | | | | Access group of access-band R | | | | |
| --- | --- | --- | --- | --- | --- | --- | --- | --- | --- |
| 0 | 1 | 2 | 3 | 4 | 0 | 1 | 2 | 3 | 4 |
| P,0,1 | P,1,0 | P,2,2 | P,3,0 | P,4,0 | R,0,0 | R,1,0 | R,2,0 | R,3,0 | R,4,1 |
| P,0,3 | P,1,1 | P,2,4, | P,3,1 | P,4,1 | R,0,1 | R,1,1 | R,2,1 | R,3,1 | R,4,3 |
| P,0,5 | P,1,2 | P,2,6 | P,3,2 | P,4,2 | R,0,2 | R,1,3 | R,2,3 | R,3,3 | R,4,4 |
| P,0,7 | P,1,3 | P,2,8 | P,3,3 | P,4,3 | R,0,3 | R,1,7 | R,2,6 | R,3,4 | R,4,7 |
| P,0,9 | P,1,5 |  | P,3,4 | P,4,4 | R,0,5 |  | R,2,8 | R,3,5 |  |
|  | P,1,7 |  | P,3,5 |  | R,0,6 |  |  | R,3,7 |  |
|  | P,1,8 |  | P,3,6 |  |  |  |  | R,3,9 |  |
|  |  |  | P,3,7 |  |  |  |  |  |  |

TABLE 4

Remaining allocable access nodes

| Access group of access-band P | | | | | Access group of access-band R | | | | |
| --- | --- | --- | --- | --- | --- | --- | --- | --- | --- |
| 0 | 1 | 2 | 3 | 4 | 0 | 1 | 2 | 3 | 4 |
| P,0,0 | P,1,4 | P,2,0 | P,3,8 | P,4,5 | R,0,4 | R,1,2 | R,2,2 | R,3,2 | R,4,0 |
| P,0,2 | P,1,6 | P,2,1 | P,3,9 | P,4,6 | R,0,7 | R,1,4 | R,2,4 | R,3,6 | R,4,2 |
| P,0,4 | P,1,9 | P,2,3 |  | P,4,7 | R,0,8 | R,1,5 | R,2,5 | R,3,8 | R,4,5 |
| P,0,6 |  | P,2,5 |  | P,4,8 | R,0,9 | R,1,6 | R,2,7 |  | R,4,6 |
| P,0,8 |  | P,2,7 |  | P,4,9 |  | R,1,8 | R,2,9 |  | R,4,8 |
|  |  | P,2,9 |  |  |  | R,1,9 |  |  | R.4.9 |

Combined Distributed and Global Central Control

One access group may be selected to host a global controller, which may connect to distributors as one of the access nodes of the access group, thus having at least one single-hop path to each access node of the entire network. This significantly facilitates both distributed control and global central control where a control signal from any access node to any other access node traverses only one distributor and a control signal from the global controller to any access node, and vice versa, traverses only one distributor. The network may employ two or more geographically distributed global controllers, which may operate cooperatively, for increased reliability and expeditious global control. The global controller may also be coupled to a selected access node of the plurality of access nodes.

The global controller may employ multiple hardware processors, multiple memory devices storing processor-executable instructions causing the hardware processors to perform exchange of control data with access processors of the plurality of access nodes of the entire network, and multiple memory devices storing data relevant to overall network connectivity and states of network components.

Placeholder Network-Growth Approach

Figure 30:
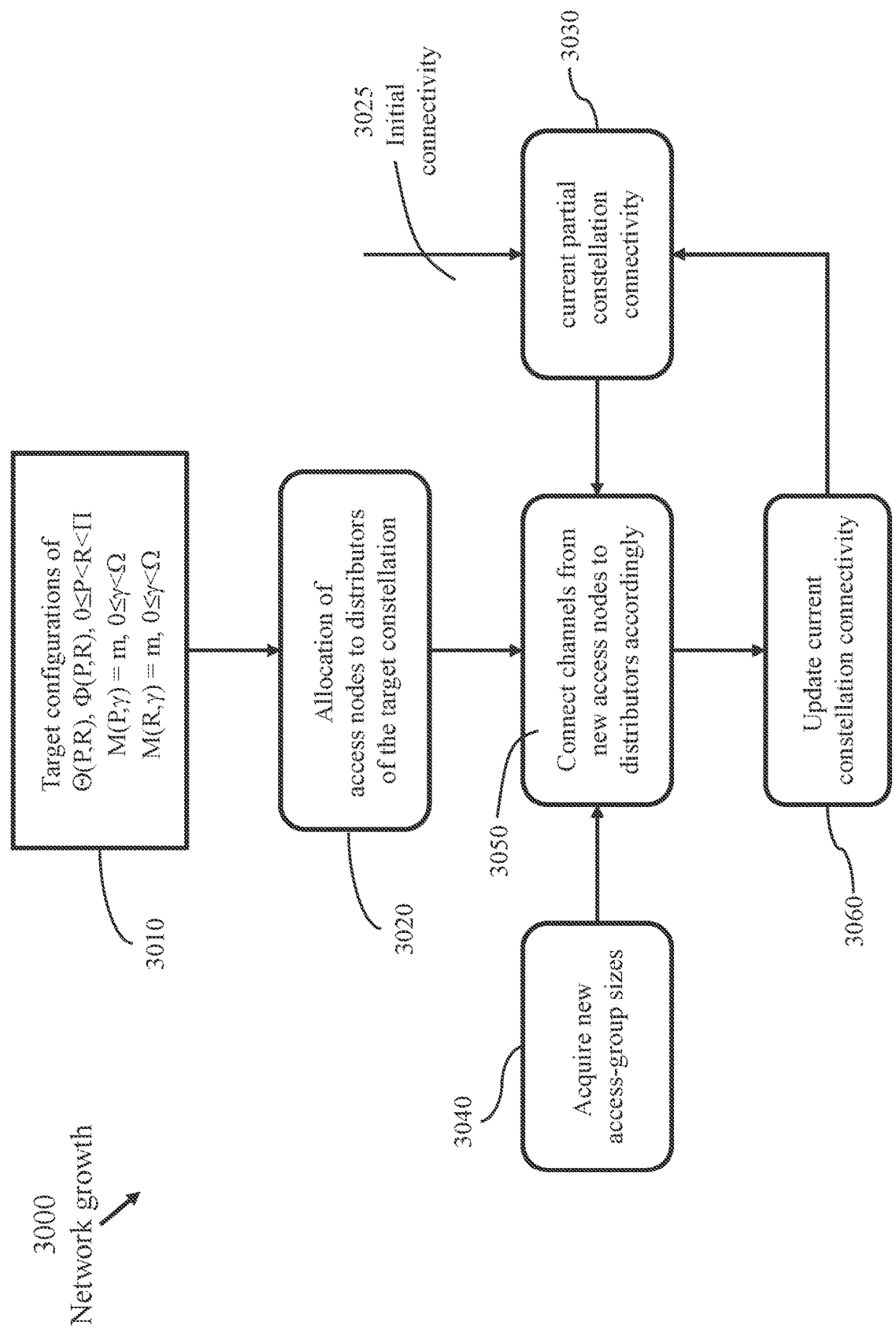
FIG. 30 illustrates a method of realizing gradual connectivity extension of a constellation, in accordance with an embodiment of the present invention.
Figure 34:
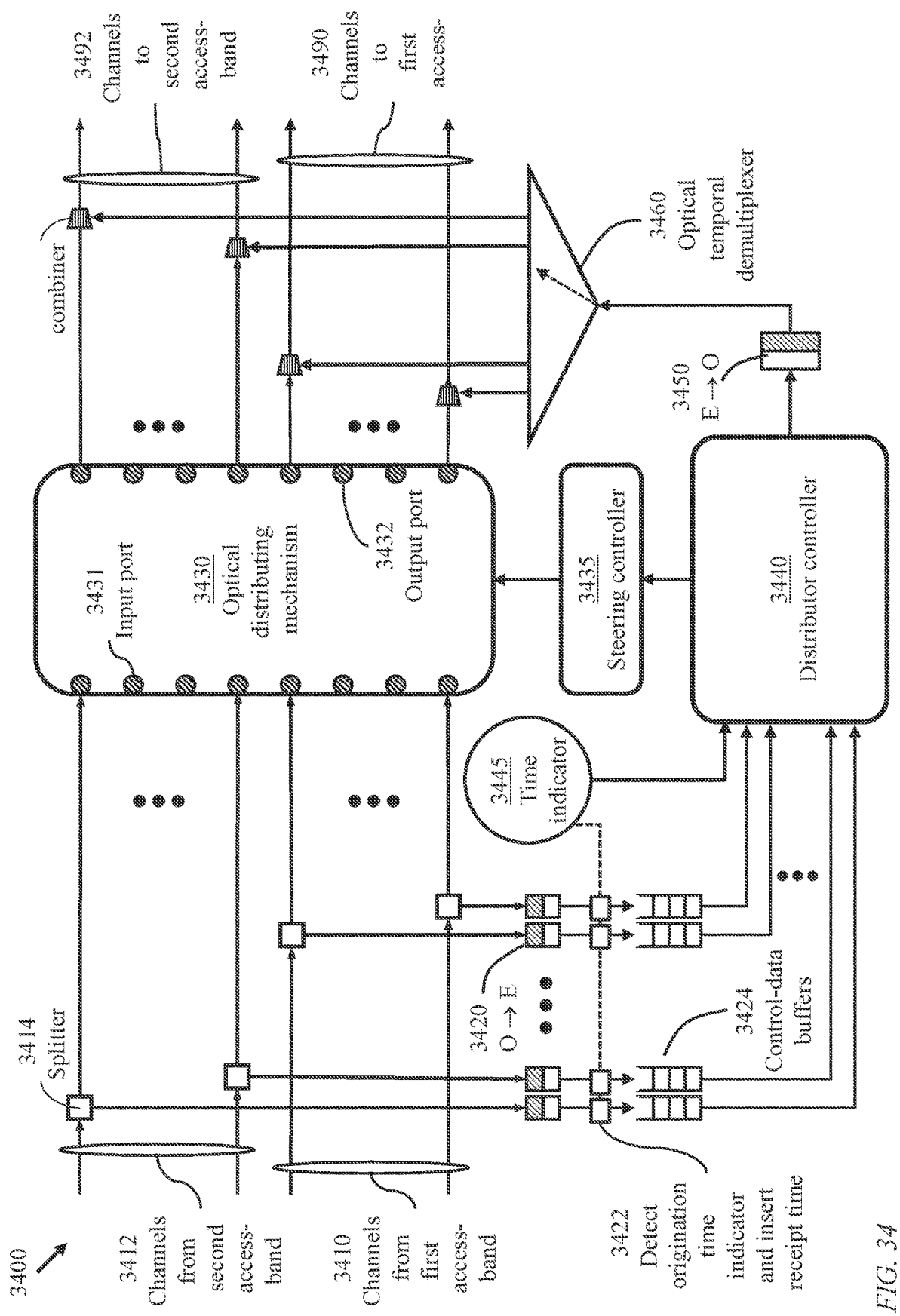
FIG. 34 illustrates a first configuration of an optical distributor, in accordance with an embodiment of the present invention.
Figure 37:
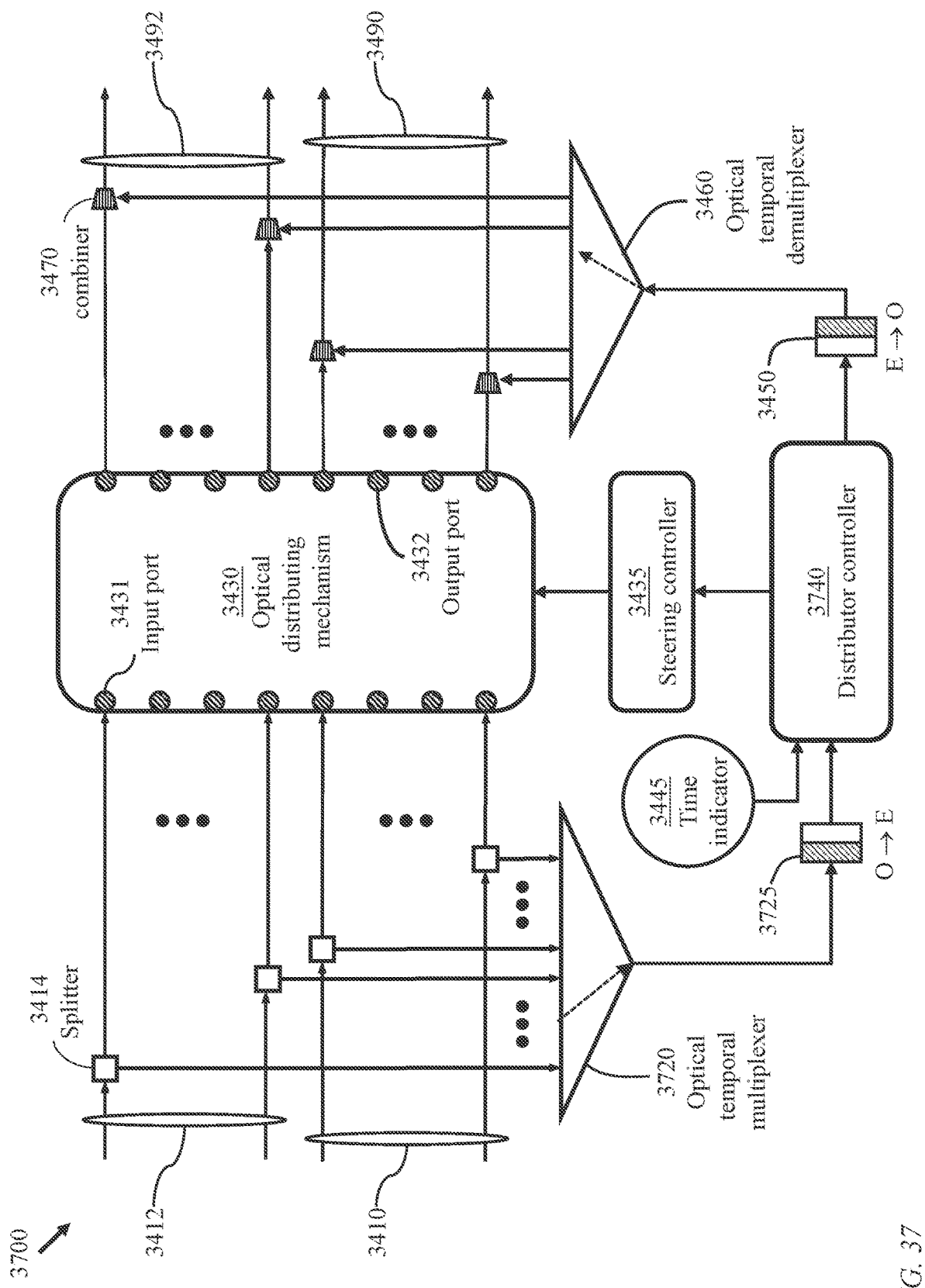
FIG. 37 illustrates a second configuration of an optical distributor, in accordance with an embodiment of the present invention.
Figure 38:
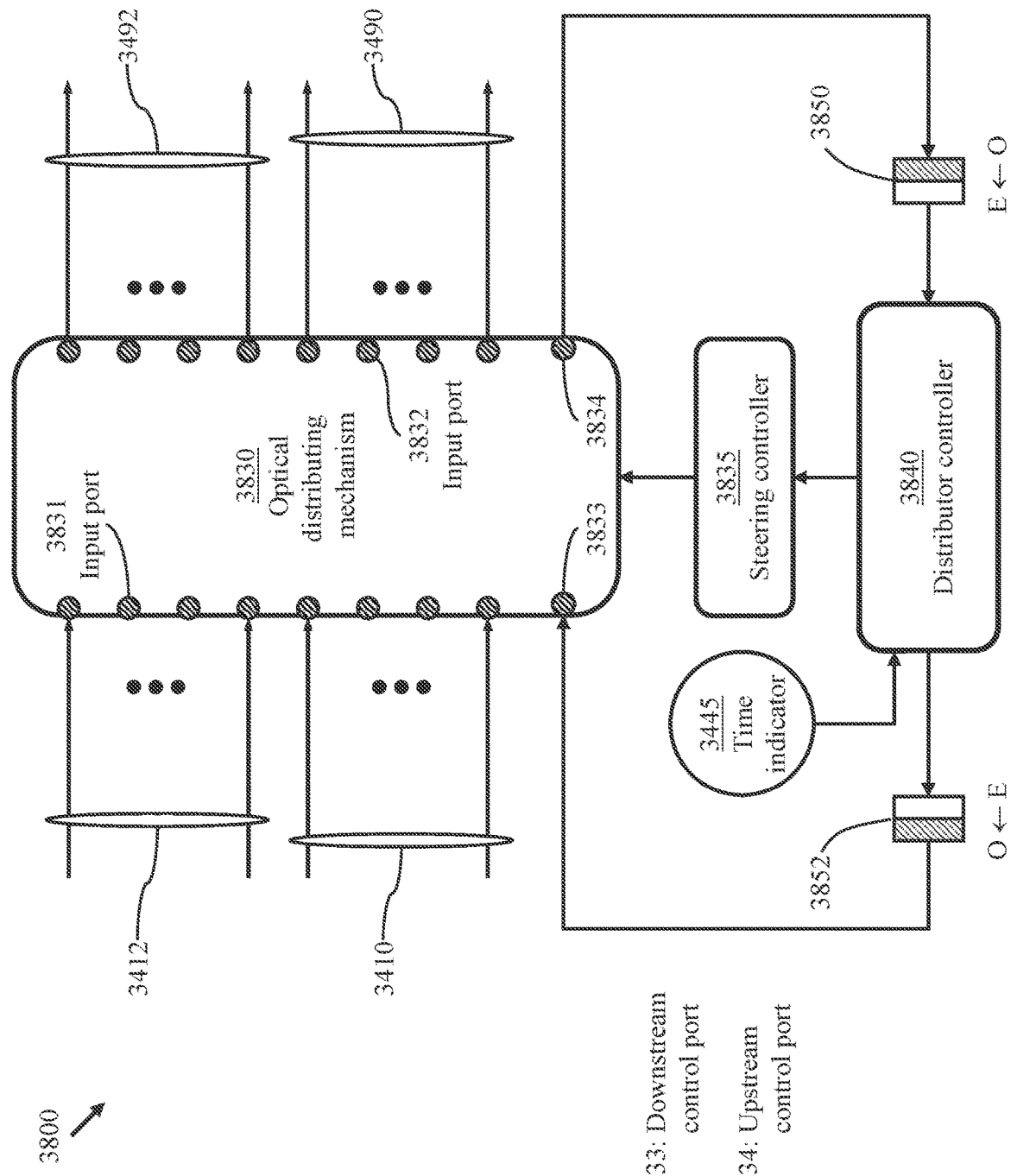
FIG. 38 illustrates a third configuration of an optical distributor, in accordance with an embodiment of the present invention.
Figure 40:
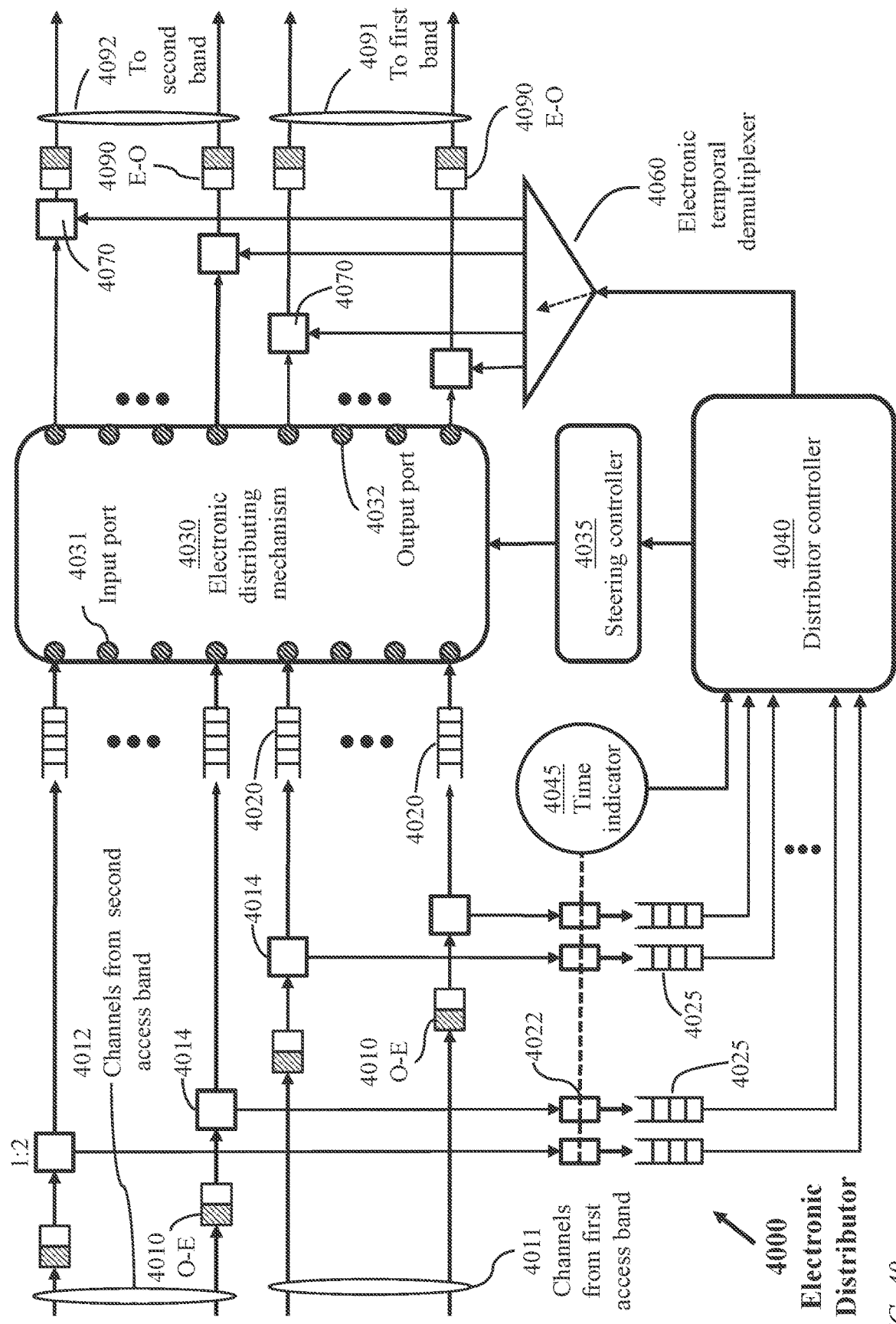
FIG. 40 illustrates a first configuration of an electronic distributor, in accordance with an embodiment of the present invention.
Figure 42:
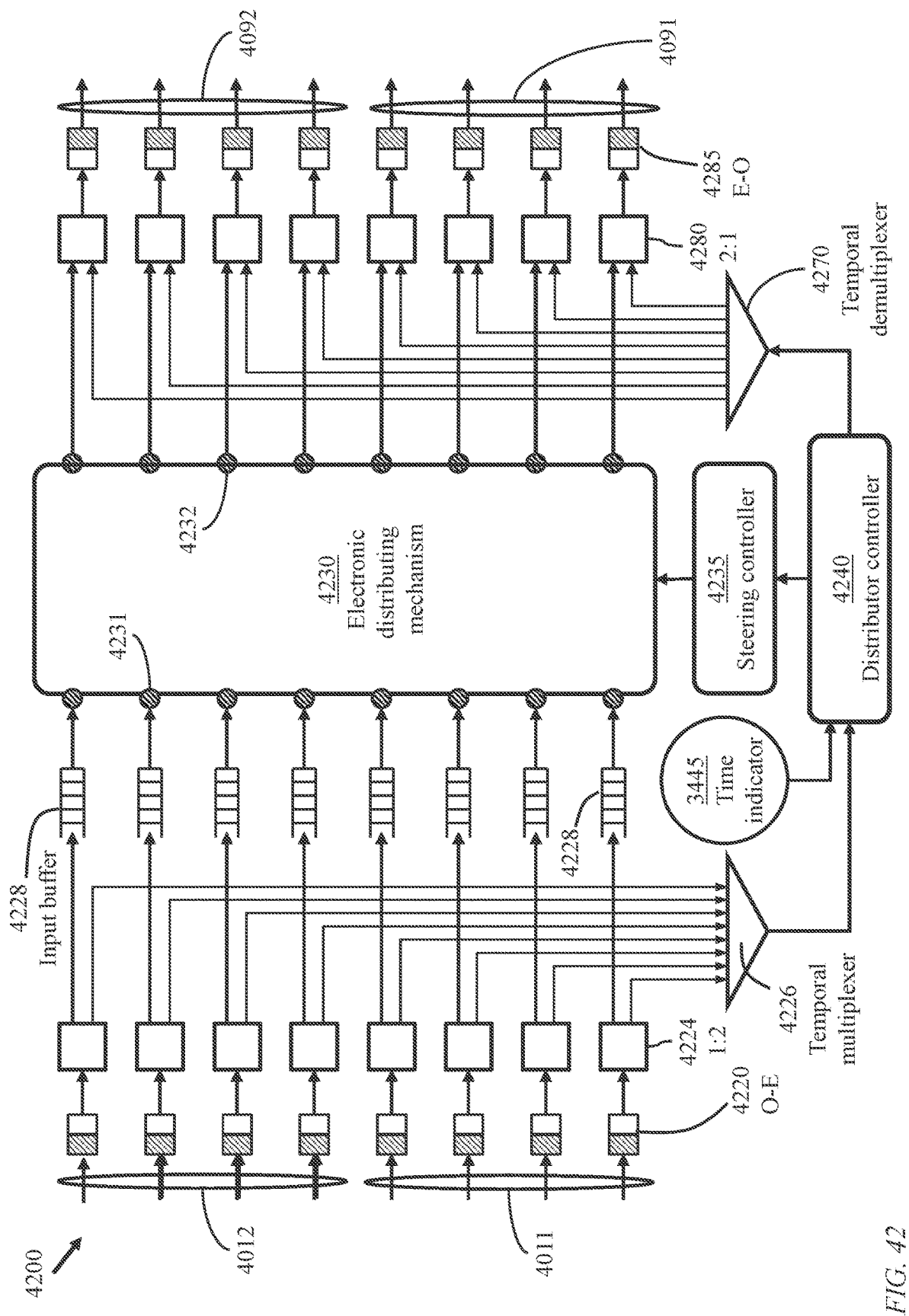
FIG. 42 illustrates a second configuration of an electronic distributor.
Figure 43:
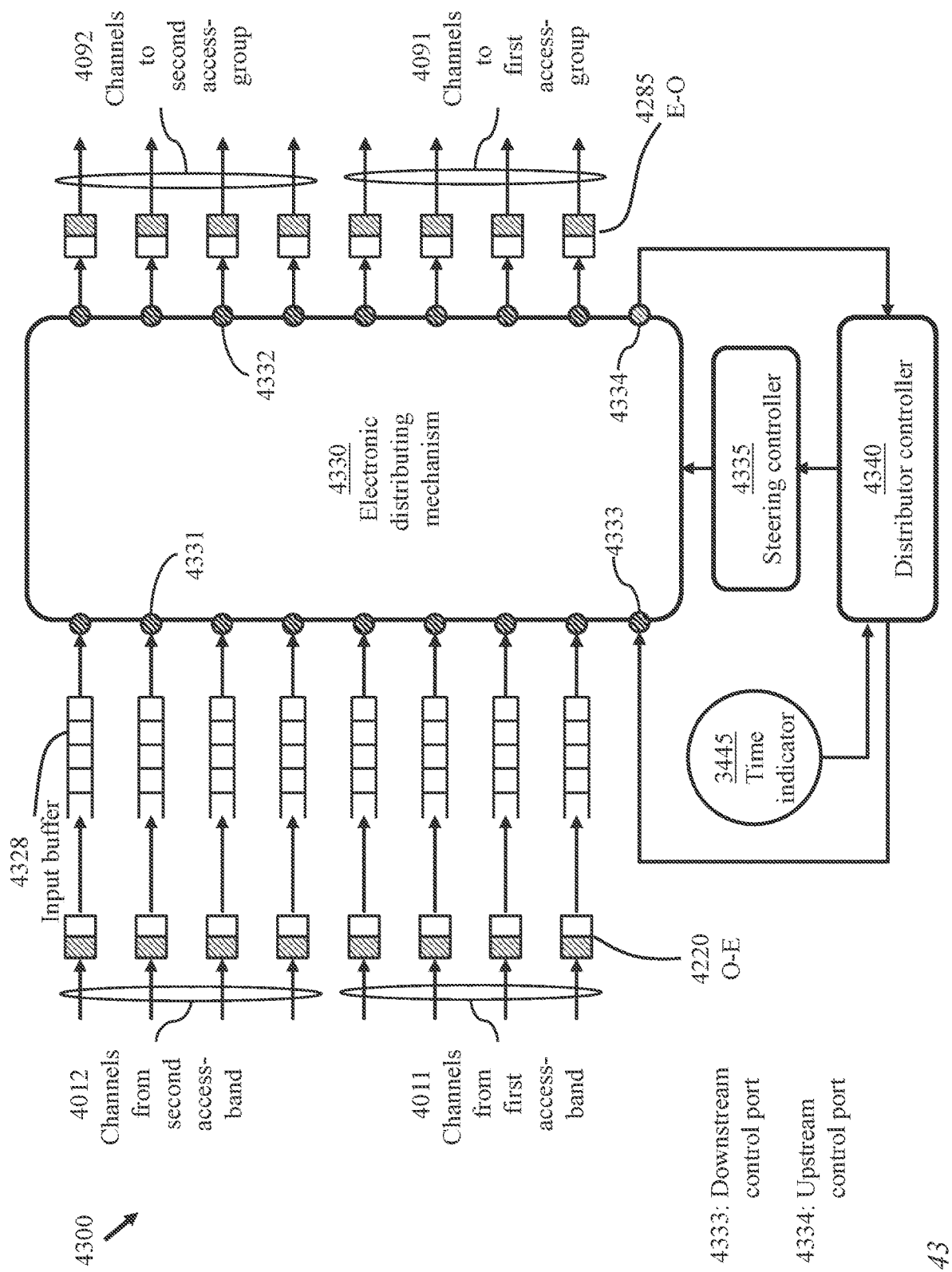
FIG. 43 illustrates a third configuration of an electronic distributor.

FIG. 30 illustrates a method 3000 of realizing gradual connectivity extension of a constellation. The method is preferably implemented at a global controller. To start, a target network size is set in a network-planning phase, in terms of a total number, μ, of access groups, and a maximum number, m, of access nodes per access group. The number μ is determined according to the dimension of an access node. The access nodes employ electronic switching/routing mechanisms which can, with the present state of the art, expand gracefully from a low value of 64, for example, to several thousands. The number, m, is determined according to the dimension upper bound of a distributor. Each distributor of a constellation is coupled to a dual channel from each of at most m access nodes of a fusing band (an access band connected to the constellation according to the second mode) and a dual channel from each of at most m access nodes of a joined band (an access band connected to the constellation according to the first mode). With the present state of the art, the target value of m would be of the order of 64 for optical distributors (FIGS. 34, 37, and 38). Employing electronic distributors (FIGS. 40, 42, and 43), the target value of m may vary between 64 to 2000, for example. Selecting μ and m as 1000 and 64, respectively, for a network employing optical distributors, the target number of access nodes would be 64,000. Selecting u and m as 1000 and 256, respectively, for a network employing electronic distributors, the target number of access nodes would be 256,000. The use of optical distributors eliminates the need for optical-to-electrical conversion at input ports of distributors and electric-to-optical conversion at output ports of distributors. The use of electronic distributors has the advantage of higher scalability in addition to less stringent time-alignment due to availability of (short) buffers at input ports of distributors as illustrated in FIG. 40, FIG. 42, and FIG. 43.

Process 3010 defines a target (fully-populated) constellation configuration. Process 3020 creates a generic connectivity table as an allocation pattern to distributors of the target constellation, as illustrated in FIG. 26 and FIG. 27. Process 3030 accesses a memory device storing data organized into a data structure defining current constellation connectivity to access nodes. The data structure is initially set (reference 3025) to indicate "no allocation of any access node" to the distributors. Process 3040 acquires (from a network planner) requisite new access-group sizes (number of access nodes for each access group of the two access bands coupled to the constellation). Process 3050 determines connections from new access nodes to distributors based on the generic connectivity table produced in process 3020, the current constellation connectivity acquired in process 3030, and requisite new access-group sizes acquired in process 3040. Process 3060 updates the data defining current constellation connectivity according to result of process 3050 and stores an updated current connectivity data in said memory device.

A generic allocation table is created for each of the network's $(\Pi \times (\Pi-1))/2$ constellations interconnecting pairs of access bands. Each first-order or second-order constellation has $\Omega^2$ distributors with each distributor configured to grow gracefully to support $2 \times m$ dual ports, m being a predefined upper bound of the number of access nodes per access group. A fully populated access band comprises $\Omega \times m$ access nodes. Each access node connects to a constellation through $\Omega$ dual channels. A generic table for a constellation coupling access bands P and R, $0 \le P < R < \Pi$, assigns $\Omega$ dual channels of each access node of fully populated access bands P and R to respective distributors. In the exemplary constellation of FIG. 26 and FIG. 27, $\Omega=5$, and m is selected to equal $2 \times \Omega$.

A network of global coverage, employing optical distributors (FIGS. 34, 37, and 38) may support 17 access bands, with each access band comprising 31 access groups, with fully-populated access groups of 62 access nodes each ($\Pi=17$, $\Omega=31$, $m=2\times\Omega$), to a total of $17 \times 31 \times 62$ (that is 32674) access nodes. A network of global coverage, employing electronic distributors (FIGS. 40, 42, and 43) may support 17 access bands, with each access band comprising 31 access groups, with fully-populated access groups of 248 access nodes each ($\Pi=17$, $\Omega=31$, $m=8\times\Omega$), to a total of $17 \times 31 \times 248$ (that is 130696) access nodes.

A generic allocation table for each constellation indicates connectivity of each access node of respective fully-populated access groups. The access-node identifiers, $(\beta,\gamma,\nu)$, $0\le\beta<\Pi$, $0\le\gamma<\Omega$, $0\le\nu<m$, of the allocation table may serve as "placeholders", marked as "available" for future access nodes. Initially, the access groups may be partially populated. For example, for a network employing optical distributors, the access groups may contain different numbers of access nodes varying between 20 and 40, below the target level of 62 access nodes. For an access group comprising 25 access nodes of the target 62 access nodes, any 25 of the 62 placeholders may be assigned and the remaining 37 placeholders are marked as "available". For the access band connecting to a constellation according to the first mode, each distributor of the constellation connects to an entire access group. For the access band connecting according to the second mode, the access nodes of any access group connect to $\Omega$ different distributors resulting in occupancy variance, within the target occupancy level, among the distributors. It may be desirable to reduce the distributors' occupancy variance as the network grows to the target level. This may be realized with judicial selection of access-node identifiers, from available placeholders, of the desired number of access nodes.

Figure 31:
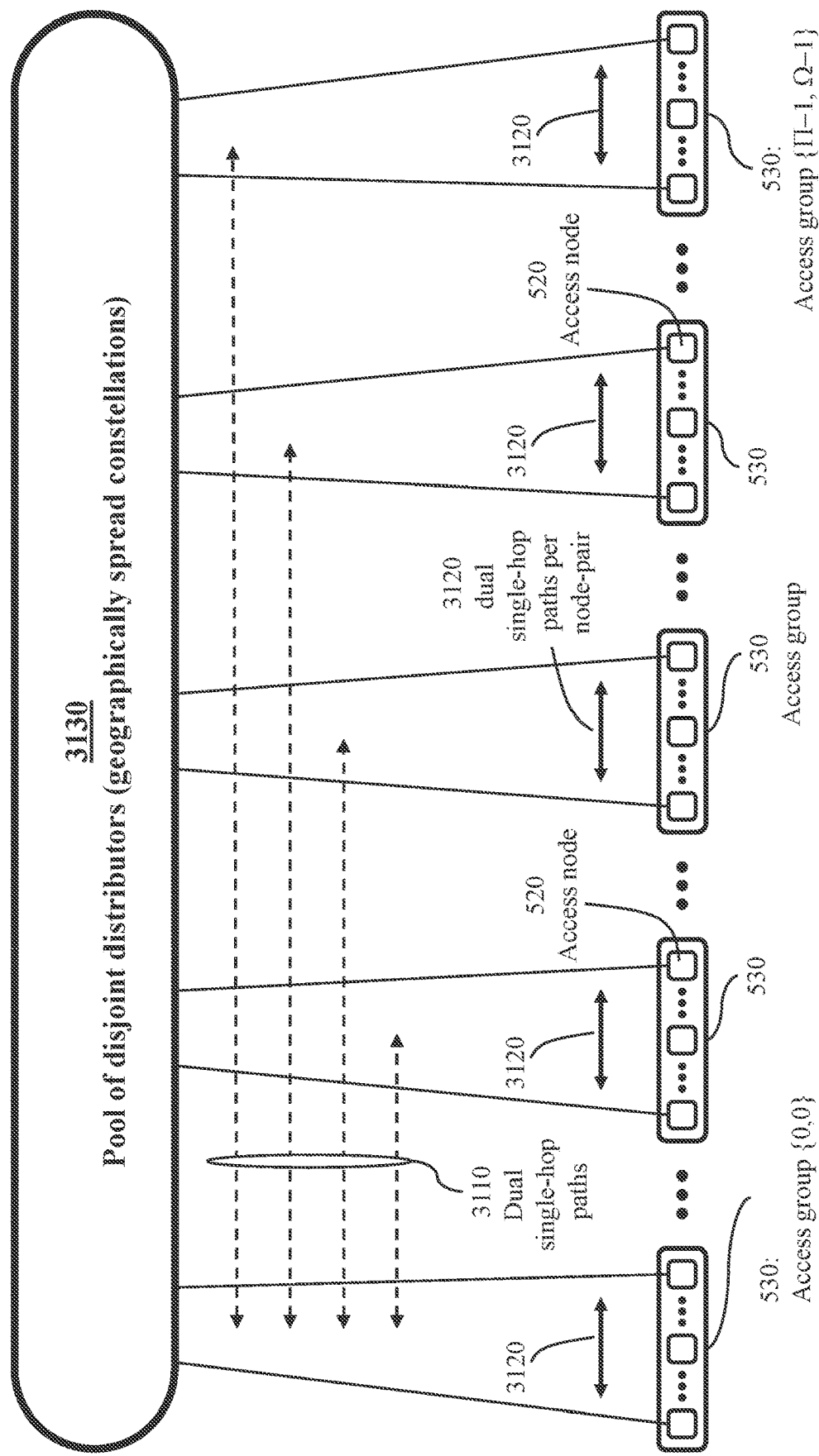
FIG. 31 is an overview of a contiguous network based on first-order fusing of a large number of Clos star networks, in accordance with an embodiment of the present invention.

FIG. 31 is an overview 3100 of a contiguous network based on first-order fusing of a large number of Clos star networks (CSNs). The access nodes of the network are arranged into a number $\mu$ of access groups, each group containing at most a predefined number, m, of access nodes. The access nodes are interconnected through a pool 3130 of disjoint distributors (none of the distributors is directly connected to any other distributor). Thus, the network supports at most $\mu \times m$ access nodes. The envisaged network would comprise a number of access groups of the order of 1000 ($\mu\approx1000$) with each access group having approximately 64 access nodes ($m\approx64$), to a total number of access nodes of the order of 64000. It is noted that while the access nodes are logically arranged into access groups and access bands as illustrated in FIG. 6 for routing and control purposes, the access nodes are naturally geographically distributed. As described above, the access groups are logically arranged into a number $\Pi$ of access bands, each access band containing a predefined number $\Omega$ of access groups.

In one network configuration, the pool 3130 of distributors is organized into $\Pi$ intra-band constellations and $(\Pi \times (\Pi-1))/2$ first-order constellations each interconnecting a respective pair of access bands where each distributor of a first-order constellation interconnects a respective pair of access groups belonging to different bands. The resulting network provides a dual single-hop path 3110 for each pair of access nodes that belong to different access groups but provides a large number of single-hop paths, 3120, for each pair of access nodes that belong to a same access group.

In an alternate network configuration, the pool of distributors is arranged into $(\Pi \times (\Pi-1))/2$ second-order inter-band constellations, each interconnecting a respective pair of access bands where each distributor of a second-order constellation interconnects one access group of one of two access bands to selected access nodes from all of $\Omega$ access groups of the other access band. This arrangement eliminates the need for intra-band constellations.

Figure 32:
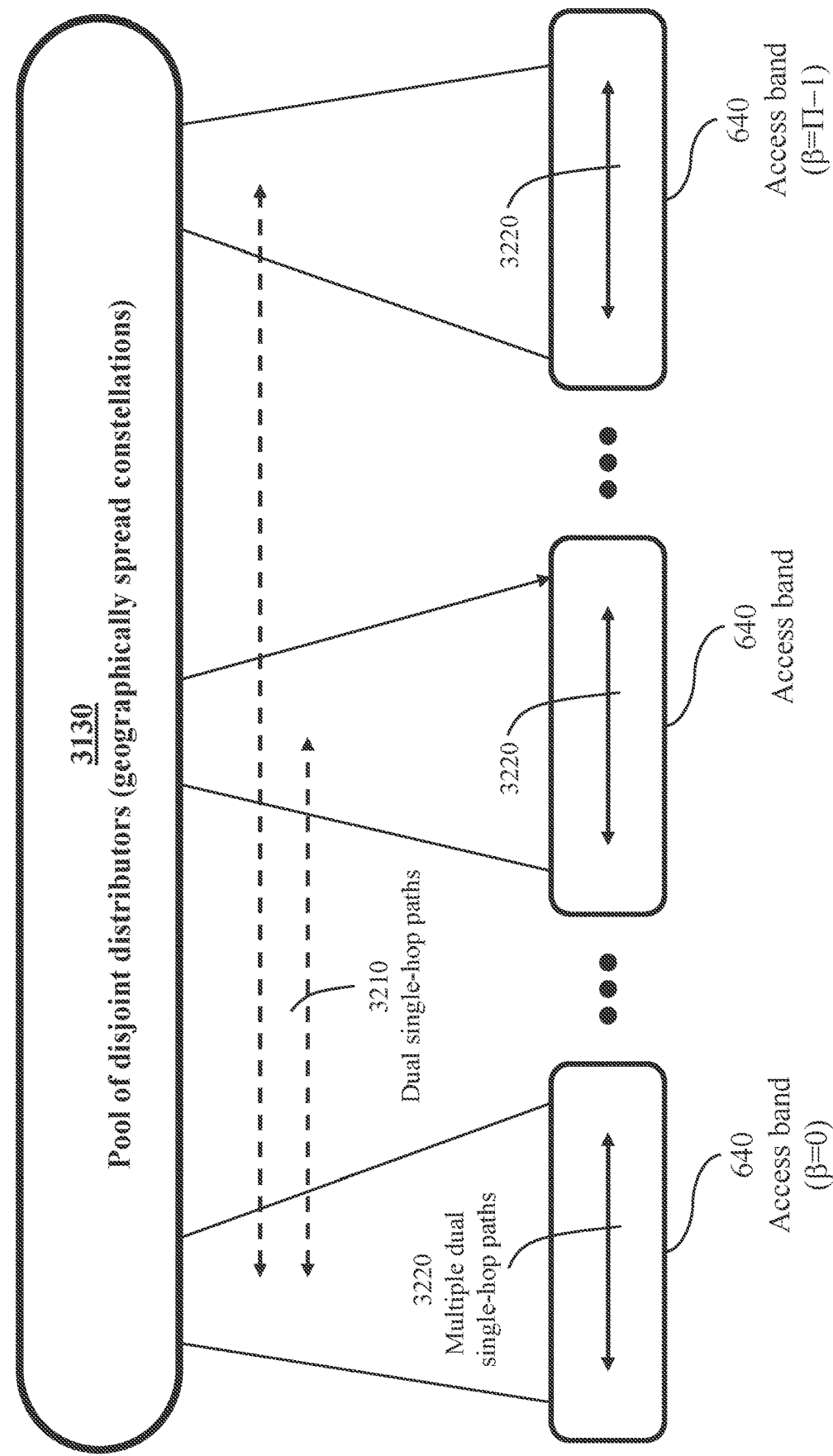
FIG. 32 illustrates inter-band connectivity within a contiguous network based on second-order fusing of a large number of Clos star networks, in accordance with an embodiment of the present invention.

FIG. 32 illustrates inter-band connectivity 3200 within a contiguous network based on second-order fusing (also referenced as "deep fusing") of a large number of Clos star networks (CSNs). Each access node of any access band in configuration of FIG. 32 has one single-hop path 3210 to each access node of each other access band. The configuration of FIG. 32 provides multiple dual single-hop paths 3220 for any pair of access nodes within an access band as detailed in FIG. 33.

The total number, $\mu$, of access groups equals $\Pi \times \Omega$. For a wide-coverage network, $\Pi \gg 1$ and $\Omega \gg 1$. The discipline, described above, of allocating access groups to distributors ensures that each access node has: a number, $\Omega \times \lfloor (\Pi-1)/2 \rfloor$, which is approximately equal to half the number $\mu$ of access groups ($\mu \gg 1$), of parallel single-hop paths to each other access node of a same access group; a number, $\lfloor (\Pi-1)/2 \rfloor$, which is approximately equal to half the number $\Pi$ of access bands (for $\Pi \gg 1$), of parallel single-hop paths to each access node of a different group within a same band; and one single-hop path to each other access node of a different access band.

Figure 33:
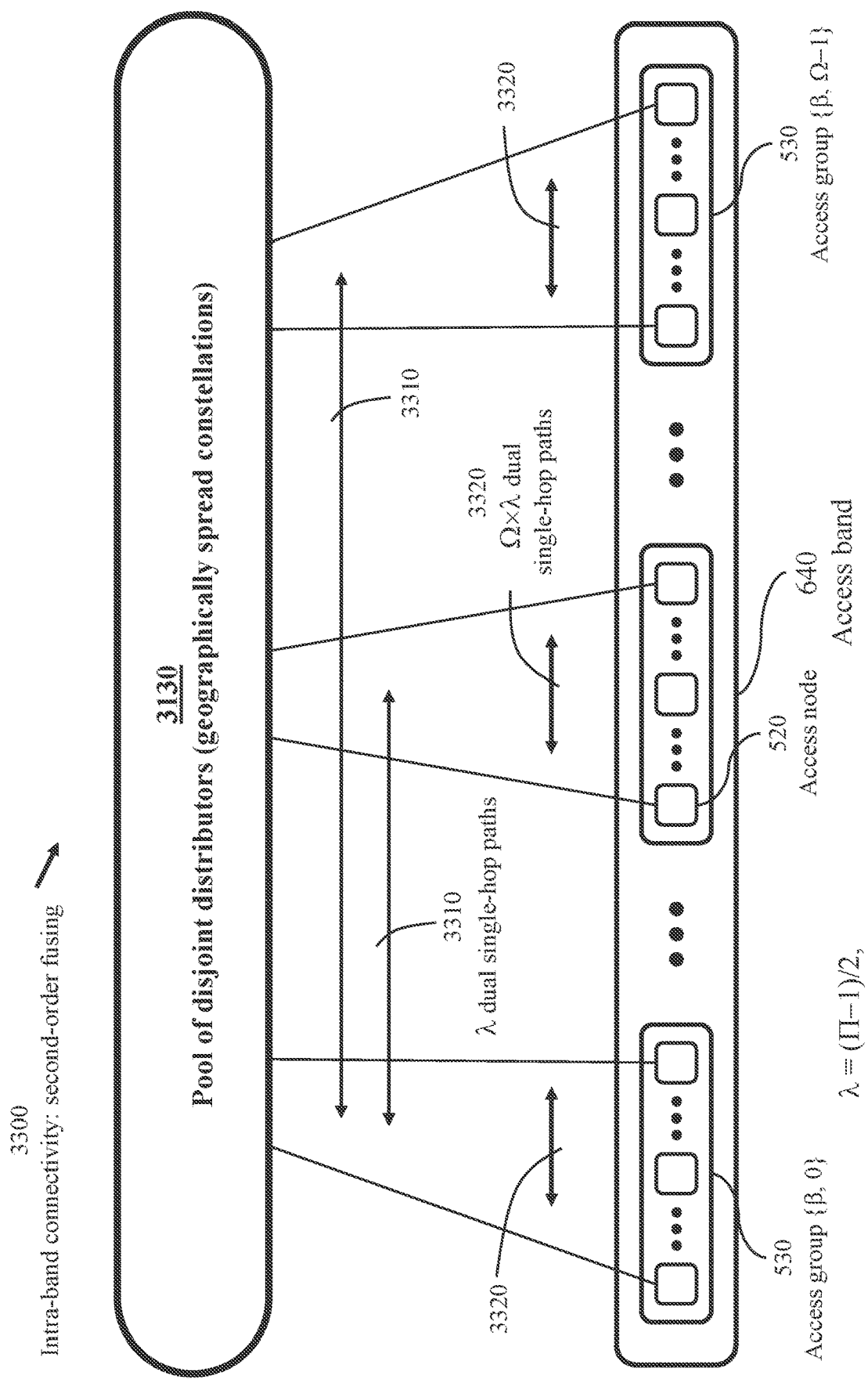
FIG. 33 illustrates intra-band connectivity within a contiguous network based on second-order fusing of a large number of Clos star networks, in accordance with an embodiment of the present invention.

FIG. 33 illustrates intra-band connectivity 3300 within the contiguous network of FIG. 32 which is based on second-order fusing of a large number of Clos star networks. Selecting the number $\Pi$ of bands to be an odd number, the number, $\lambda$, of inter-group paths 3310, for any pair of access nodes belonging to different access groups within an access band, is determined as $\lambda=(\Pi-1)/2$. With $\Pi=31$, for example, each pair of access nodes of different access groups of a same access band would connect through up to 15 parallel dual single-hop paths. The number of intra-group single-hop paths 3320 equals $\lambda$. In order to provide at least two independent single-hop paths from each access node of each access group of an access band to any access node of any other access group of the same band, the number $\Pi$ of access bands should exceed four.

Selecting $\Pi$ and $\Omega$ to be 17 and 31, respectively, the total number of access groups is $\Pi \times \Omega=527$. The number, $\lambda$, of independent parallel paths from any access node to any other access node of a same access band but a different access group is 8. The number of independent parallel paths from any access node to another access node of a same access group is 248. Each access node has one single-hop path to each access node of a different access band. Employing optical distributors (FIGS. 34, 37, 38), the maximum number m of access nodes per access group may be limited to 64, for example. With a mean number of access nodes per access group of 40, the total number of access nodes would be approximately 21,000. Employing electronic distributors (FIGS. 40, 42, 43), the maximum number m of access nodes per access group may be set to 256, for example. With a mean number of access nodes per access group of 160, the total number of access nodes would be approximately 84,000.

If the data flow rates for access-node pairs are spatially balanced, providing one (switched) single-hop path for each access-node pair would be sufficient to avoid noticeable overflow. However, with typical spatial traffic imbalance, more than one single-hop path may be needed. In the example above, it is plausible that the availability of eight (switched) independent parallel single-hop paths for access-node pairs of different access groups within an access band result in insignificant overflow. The availability of 248 independent parallel single-hop paths for access-node pairs of a same access group renders the probability of overflow infinitesimally small.

Thus, the bulk of the data traffic for access-node pairs within an access band may be transferred over single-hop paths. With 31 access groups per access band ($\Omega=31$) and a mean number of access nodes per access band of 40, for the case of using optical distributors, an access band comprises 1240 access nodes and the bulk of traffic exchange among the 1240 access nodes occurs over single-hop paths. With 31 access groups per access band and a mean number of access nodes per access band of 160, for the case of using electronic distributors, an access band comprises 4960 access nodes and the bulk of traffic exchange among the 4960 access nodes occurs over single-hop paths.

The individual Π access bands may belong to different enterprises or other administrative entities with relatively high rate of data exchange among the access nodes of a same access band and limited data exchange between access bands. Although each band has a same number (of access groups, the number of access nodes per access group may vary significantly below the predefined maximum number m. Thus, the numbers of access nodes of the access bands may differ significantly.

In the case where all designated single-hop paths from a source access node to a destination access node are fully occupied, the data traffic may be routed over a single-hop path to any intermediate access node, other than the destination access node, then routed from the intermediate access node to the destination access node. Since each access node in the entire network has a single-hop path to each other access node, the number of candidate intermediate access nodes is the total number of access nodes (21000 or 84000 in the example above) minus two. However, given the large number of independent parallel single-hop paths for any access-node pair within an access group, it is preferable that an intermediate node, where needed, be selected from among access nodes of the access group of the source access nodes or from among the access nodes of the access group of the destination access node.

Table-5 below summarizes single-hop connectivity ($\pi_1 + \pi_2 = \Pi - 1$). Table-6, provides single-hop connectivity data for a case of a miniature network. Table-7, provides single-hop connectivity data for a case of a larger network.

TABLE-5

Single-hop connectivity of a specific access node of a specific group of a specific band

| Specifics | specific group | All other groups of the specific band | All other bands |
|---|---|---|---|
| Number of access nodes | m | $\Omega \times m - m$ | $(\mu - \Omega) \times m$ |
| Access-node indices | 0 to (m − 1) | m to ($\Omega \times m - 1$) | ($\Omega \times m$) to ($\mu \times m$) − 1 |
| Number of dual ports | $\pi_1 \times \Omega$ | $\pi_2 \times \Omega$ | $\mu - \Omega$ |
| Dual-port indices | 0 to ($\pi_1 \times \Omega$) − 1 | ($\pi_1 \times \Omega$) to ($\mu - \Omega - 1$) | 0 to ($\mu - \Omega - 1$) |

TABLE-6

Example, $\Pi = 3$, $\Omega = 5$, $m = 5$, $\mu = \Pi \times \Omega = 15$, number of access nodes $\Pi \times \Omega \times m = 75$, dual ports per access node: $\mu - \Omega = 10$

| Specifics | specific access group | All other groups of the specific band | All other bands |
|---|---|---|---|
| Number of access nodes | 5 | 20 | 50 |
| Access-node indices | 0 to 4 | 5 to 24 | 25 to 74 |
| Number of dual ports | 5 | 5 | 10 |
| Dual-port indices | 0 to 4 | 5 to 9 | 0 to 9 |

TABLE-7

Example, $\Pi = 23$, $\Omega = 31$, $m = \Omega$, $\mu = \Pi \times \Omega = 713$, Number of access nodes $\mu \times m = 22103$, dual ports per access node: $(\mu - \Omega) = 682$

| Specifics | specific access group | All other groups of the specific band | All other bands |
|---|---|---|---|
| Number of access nodes | 31 | 930 | 21142 |
| Access-node indices | 0 to 30 | 31 to 960 | 961 to 22102 |
| Number of dual ports | 31 | 682 | 713 |
| Dual-port indices | 0 to 30 | 31 to 712 | 0 to 712 |

Distributor Configuration

FIG. 34 illustrates a first configuration 3400 of an optical distributor comprising an optical distributing mechanism 3430, a set of input ports 3431, a set of output ports 3432, a local time indicator 3445, a distributor controller 3440, and a steering controller 3435. The steering controller 3435 directs data from an input port 3431 to an output port 3432 according to instructions from the distributor controller 3440. Distributor controller 3440 comprises at least one hardware processor and memory devices storing software instructions causing the at least one processor to perform control functions including scheduling paths establishment through distributing mechanism 3430 and exchanging control messages with access nodes connecting to the distributing mechanism 3430.

A set 3410 of upstream channels from access nodes belonging to a first access band, connects to a first set of input ports 3431. A set 3412 of upstream channels from access nodes belonging to a second access band connects to a second set of input ports 3431. A set 3490 of downstream channels directed to the access nodes belonging to the first access group connects to a first set of output ports 3432. A set 3492 of downstream channels directed to the access nodes belonging to the second access band connects to a second set of output ports 3432.

Each upstream channel 3410 or 3412 carries an optical signal from a respective access node 120 modulated with content data and control data. The content data is directed to other access nodes and the control data is directed to distributor controller 3440 and may include an indication of time according to a time indicator of the respective access node.

Figure 35:
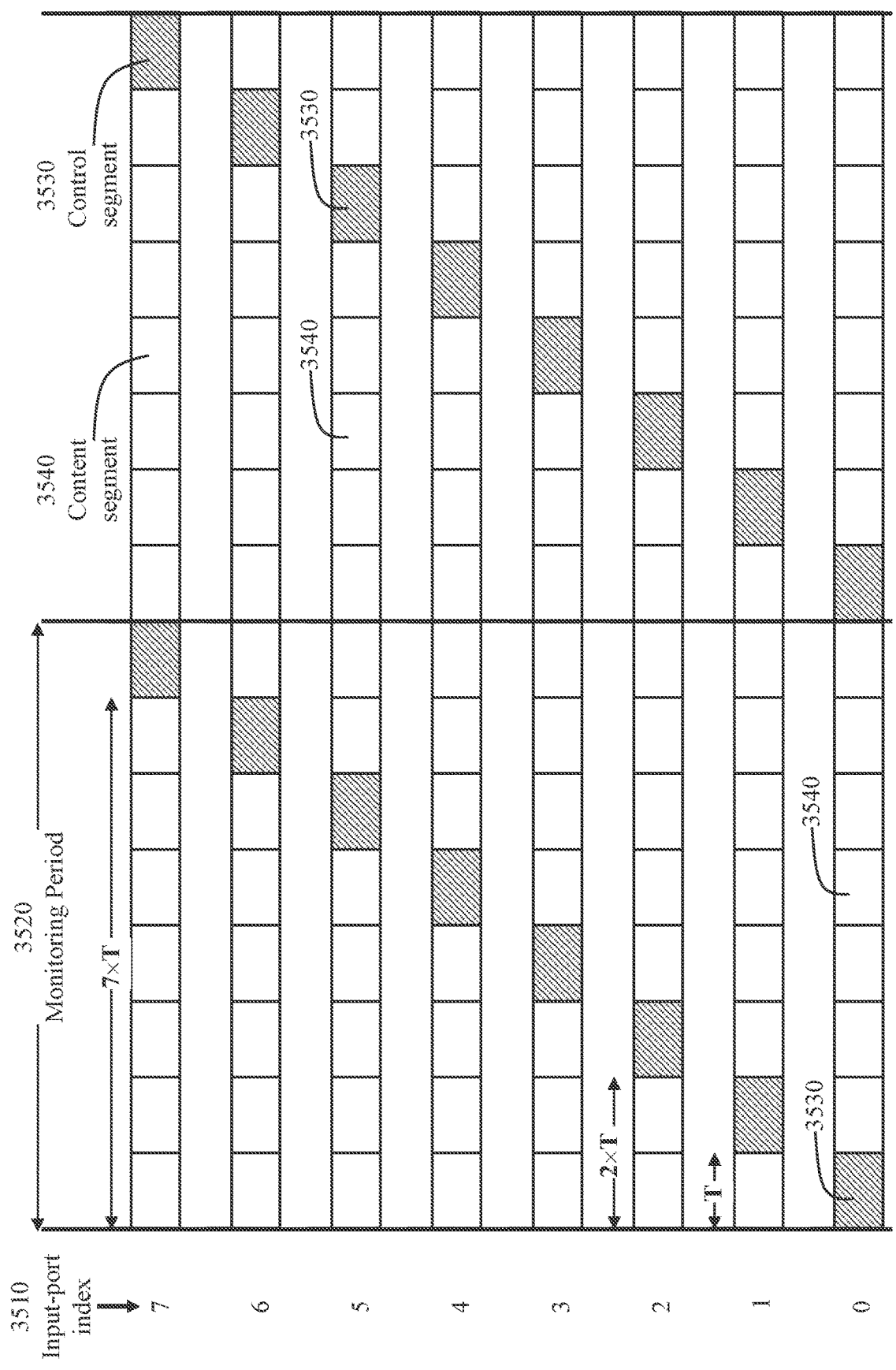
FIG. 35 illustrates an exemplary organization of a cyclic monitoring period into content time slots and at least one control time slot, in accordance with an embodiment of the present invention.

FIG. 35 illustrates an exemplary organization of a monitoring period 3520 into a number of time slots at least equal to the number of dual ports of a distributor connecting to access nodes. The duration, T, of a time slot may be of the order of 0.1 to 1.0 microseconds, for example. The time slots of a monitoring period comprise content time slots and at least one control time slot. Each input port 3431 of the distributor 3400 is allocated at least one control time slot per monitoring period. In the illustrated example, the monitoring period 3520 comprises 8 time slots indexed as 0 to 7. Content data segments 3540 are transferred from input ports 3431 to output ports 3432 during scheduled content time slots which change according to data-traffic spatial-temporal variation. A control data segment 3530 is communicated from an input port 3431 to distributor controller 3440 during a respective predetermined control time slot of duration T. For example, control data segments from an input port 3431 of index j (reference 3510) may be transferred to the distributor controller 3440 during a time slot of index j of each monitoring period 3520, $0 \leq j < 8$.

The data of a control segment 3530 may include a time indication at an originating access node, flow-rate-allocation requests to specified destination access nodes, and messages from the originating access node to other access nodes. The data of each segment 3530 or 3540 includes an indication of a cyclic segment identifier within a monitoring period 3520.

Figure 36:
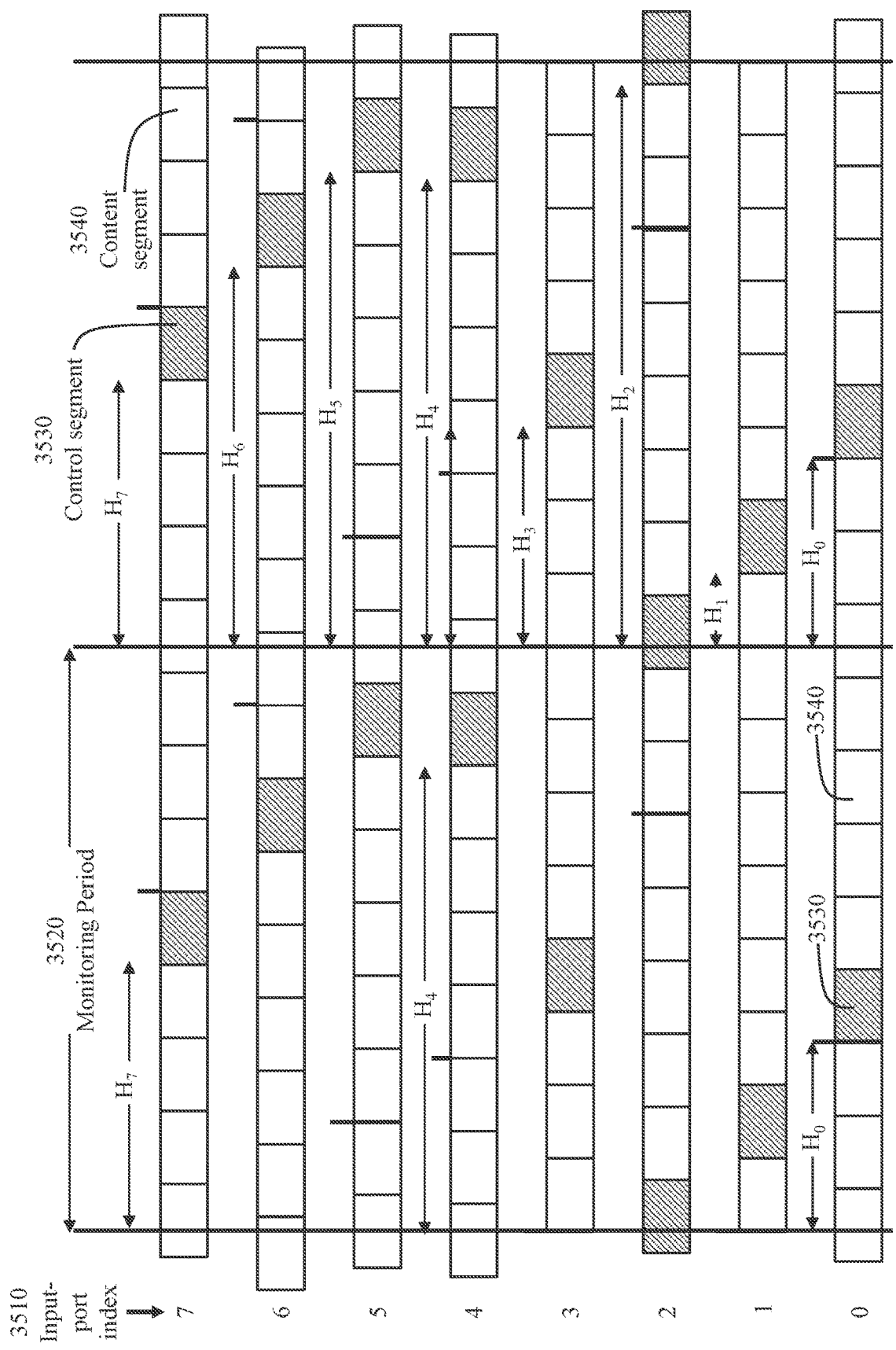
FIG. 36 illustrates a case where control time slots of signals received at input ports of a distributor are not time aligned to respective designated time slots of a reference monitoring period.

FIG. 36 illustrates a case where control time slots of signals received at input ports 3431 of the distributor are not time aligned to respective designated time slots of reference monitoring period 3520. The temporal discrepancy between misaligned arrival times of control segments (such as 3932, FIG. 39) and designated time slots of control segments for signals received at input ports 3431 need be determined and communicated to respective originating access nodes 120 to restore time alignment. In the illustrated example, the instants of arrival of control segments 3530 detected from signals received at the input ports 3431 are $H_0$, $H_1$, $H_2$, ..., $H_7$, while the corresponding designated instants of time are 0, T, 2T, ..., 7T, T being the duration of a time slot of a monitoring period 3520.

Each upstream channel, 3410 or 3412, connects to a respective 1:2 optical splitter 3414 which directs predetermined portions of power of an upstream optical signal to a respective input port 3431 and a respective optical-to-electrical (O-E) converter 3420 of an array of O-E converters. The output electrical signal of each O-E converter is directed to a respective time-alignment unit 3422, of an array of time-alignment units, which detects upstream control data, which may include a time indication at an originating access node, and forms a control data segment including receipt time according to a local time indicator 3445. The control data segments are placed in control-data buffers 3424 to be presented to distributor controller 3440. Preferably, the upstream control data are sent regularly at a predetermined rate. Thus, the control buffers 3424 would be short buffers, each with an expected occupancy of a very small number (two, for example) of control data segments.

The distributor controller 3440 computes schedules for flow-rate allocations and generates downstream control data to be sent, together with downstream content data collected at the output ports 3432, to destination access nodes. An electrical-to-optical converter 3450 produces optical signals carrying the downstream control data. A temporal demultiplexer 3460 cyclically supplies to optical combiners 3470 control segments directed to the destination access nodes. Each optical combiner 3470 receives an optical signal carrying downstream content data from a respective output port 3432 and inserts corresponding downstream control data received through the temporal demultiplexer 3460.

FIG. 37 illustrates a second configuration 3700 of an optical distributor. As in the configuration of FIG. 34, configuration 3700 comprises an optical distributing mechanism 3430, a set of input ports 3431, a set of output ports 3432, a local time indicator 3445, a distributor controller 3740, and a steering controller 3435. The Steering controller 3435 directs data from an input port 3431 to an output port 3432 according to instructions from the distributor controller 3740.

Each upstream channel, 3410 or 3412, connects to a respective 1:2 optical splitter 3414 which directs predetermined portions of power of each upstream optical signal to a respective input port 3431 and a temporal multiplexer 3720. The temporal multiplexer 3720 cyclically connects optical splitters 3414, connecting to upstream channels from access nodes, to an optical-to-electrical converter 3725 during designated control time slots within each monitoring period as illustrated in FIG. 35. The optical-to-electrical (O-E) converter 3725 receives optical-signal portions (samples) captured during successive time slots of each monitoring period 3520 and produces corresponding electric signals to be supplied to distributor controller 3740.

If the control time slots of upstream signals received at input ports 3431 of the distributor are time aligned to respective designated time slots of reference monitoring period 3520 as illustrated in FIG. 35, the output of the temporal multiplexer 3720 would be a sequence of control segments 3530 originating from the access nodes. If a control time slot of an upstream signal from a specific access node 120 is not time-aligned to a respective designated control time slot, the captured optical signal portion during the respective designated time slot need be examined to determine the temporal discrepancy and instruct the specific access node to correct transmission time to the distributor accordingly. The data of a control segment 3530 of a received upstream signal may include: a time indication at originating access node, flow-rate-allocation requests to specified destination access nodes, and messages from an originating access node to other access nodes.

FIG. 38 illustrates a third configuration 3800 of an optical distributor. Configuration 3800 comprises a distributor controller 3840, steering controller 3835, a local time indicator 3445, an optical distributing mechanism 3830 which supports input ports 3831, output ports 3832, an input port 3833 (downstream control port) connecting to output of distributor controller 3840, and an output port 3834 (upstream control port) connecting to input of distributor controller 3840. As in configurations 3400 and 3700, distributor controller 3840 uses local time indicator 3445 for temporal alignment of upstream signals.

Distributor controller 3840 comprises at least one hardware processor and memory devices storing software instructions causing the at least one processor to perform control functions including scheduling paths establishment through distributing mechanism 3830 and exchanging control messages with access nodes connecting to the distributing mechanism 3830.

Steering controller 3835 directs signals from input ports 3831 to output ports 3832 according to instructions from the distributor controller 3840. Additionally, steering controller 3835 cyclically directs upstream control signals from input ports 3831 to output port 3834 (upstream control port) which connects to distributor controller 3840 through an optical-to-electrical converter 3850. The distributor controller 3840 sends downstream control signals to input port 3833 (downstream control port) through electrical-to-optical converter 3852. Steering controller 3835 cyclically directs downstream control signals from input port 3833 to output ports 3832. Thus, rather than using optical temporal multiplexer 3720 and optical temporal demultiplexer 3460 of the configuration of FIG. 37, the upstream control signals are communicated from input ports 3831 to the distributor controller 3840 and the downstream control signals are communicated from the distributor controller 3840 to the output ports 3832 through the distributing mechanism 3830.

Figure 39:
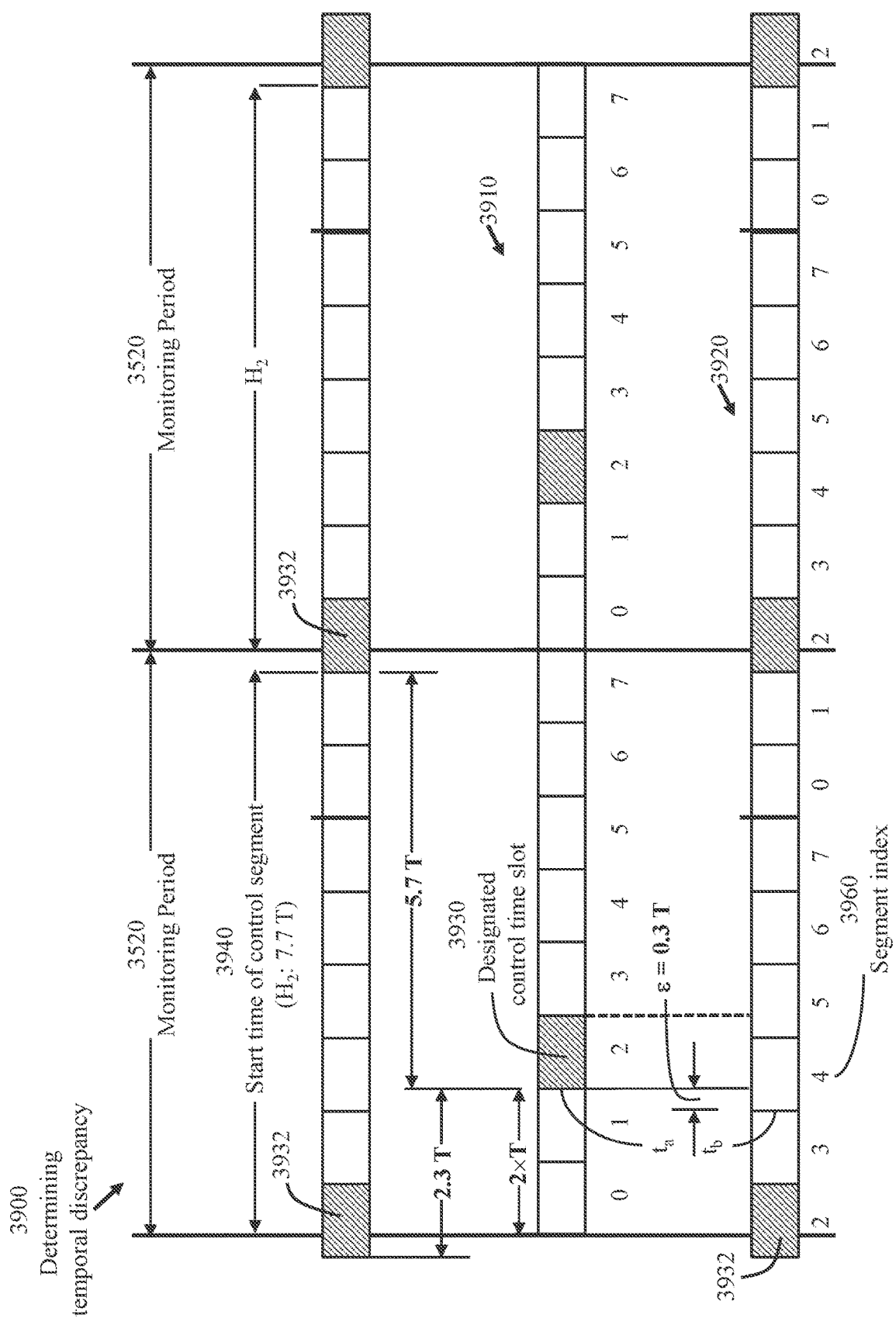
FIG. 39 illustrates temporal misalignment of a signal received at a distributor from a specific access node.

FIG. 39 illustrates an example 3900 of temporal misalignment of a signal 3920 received at a distributor from a specific access node connecting to input port of index 2 of distributing mechanism 3430 or 3830. As illustrated in FIG. 35, the monitoring period 3520 is organized into a number of time slots where during each time slot an access node transmits a control segment 3530 or a content segment 3540. The time slots within a monitoring period are indexed as j, $0 \leq j < p$, where the integer p at least equals the total number of input ports connecting to upstream channels from subtending access nodes and input ports connecting to a controller of a distributor; p>4. A cyclic time slot of index j is (arbitrarily) assigned to an input port of index j. Thus, time slot 3930 is designated as a control time slot for a signal stream originating from an access node connecting to an input port of index 2.

In the distributor configuration of FIG. 34, temporal alignment is based on detecting the start time of a control segment within a monitoring period. In the distributor configuration of FIG. 37 and the distributor configuration of FIG. 38, temporal alignment is based on identifying content of an upstream signal during a corresponding designated control time slot.

Referring to FIG. 34, a time-alignment unit 3422 detects the start time 3940 of a control segment within a monitoring period. As illustrated in FIG. 36, the actual start time of a control segment for an input port of index j is denoted $H_j$, $0 \leq j < p$. With the start time of a control segment for an input port of index j set to be $j \times T$, T being the duration of a time slot, the temporal discrepancy of a received signal directed to an input port of index j is determined as: $\theta_j = (j \times T - H_j)$.

If the magnitude of θj exceeds a predefined permissible value (0.01×T, for example), an access node originating the signal would be instructed to adjust transmission; adding a delay of:

$\theta_j$ if $\theta_j > 0.0$; or $(p \times T + \theta_j)$, otherwise.

In the example of FIG. 39, j=2, p=8, $H_2$=7.7×T. Hence $\theta_2$=−5.7×T, and the requisite added delay at the originating access node is (8×T−5.7×T)=2.3×T.

Referring to FIG. 37, distributor controller 3740 examines a portion of the output signal of optical-to-electrical converter 3725 during each time slot of the monitoring period 3520. In the configuration of FIG. 34, the output signal of each optical-to-electrical converter 3420 is examined to determine the start time of a control segment according to a reading of time indicator 3445. In the configuration of FIG. 37, the distributor controller 3740 examines a portion of the output signal of optical-to-electrical converter 3725 during each reference time slot of the monitoring period to detect:

(a) an index of a segment, which may be a control segment or a content segment; and
(b) a displacement of the start time of the segment from the start time of a corresponding reference time slot.

For a reference time slot of index x, $0 \leq x < p$, a detected index y, $0 \leq y < p$, and a displacement ε, the temporal discrepancy of a received signal directed to an input port of index j is determined as: $\theta_j = (y - x - \varepsilon)$. If the magnitude of θj exceeds the predefined permissible value, an access node originating the signal is instructed to adjust transmission time adding a delay of:

$\theta_j$, if $\theta_j > 0.0$; or $(p \times T + \theta_j)$, otherwise.

In the example of FIGS. 39, x=2, y=4, ε=−0.3×T; hence $\theta_j$=2.3×T.

Referring to FIG. 38, distributor controller 3840 examines a portion of the output signal of optical-to-electrical converter 3850 during each reference time slot of the monitoring period to detect an index of a segment and a displacement of the start time of the segment from the start time of a corresponding reference time slot. The temporal discrepancy of a received signal and transmission-time adjustment at an originating access node are determined as described above with reference to FIG. 37.

FIG. 40 illustrates a first configuration 4000 of an electronic distributor comprising an electronic distributing mechanism 4030, a set of input ports 4031, a set of output ports 4032, a local time indicator 4045, a distributor controller 4040, and a steering controller 4035. The steering controller 4035 directs data from an input port 4031 to an output port 4032 according to instructions from the distributor controller 4040.

Distributor controller 4040 comprises at least one hardware processor and memory devices storing software instructions causing the at least one processor to perform control functions including scheduling paths establishment through distributing mechanism 4030 and exchanging control messages with access nodes connecting to the distributing mechanism 4030.

A set 4011 of upstream channels from selected access nodes of a first access band connects to a first set of input ports 4031. A set 4012 of upstream channels from selected access nodes of a second access band connects to a second set of input ports 4031. A set 4091 of downstream channels directed to the selected access nodes of the first access band connects to a first set of output ports 4032. A set 4092 of downstream channels directed to the selected access nodes of the second access band connects to a second set of output ports 4032.

Each upstream channel 4011 or 4012 carries an optical signal from a respective access node 120 modulated with content data and control data. The content data is directed to other access nodes and the control data is directed to distributor controller 4040 and may include an indication of time according to a time indicator of the respective access node.

Content data segments are transferred from input ports 4031 to output ports 4032 during scheduled content time slots which change according to data-traffic spatial-temporal variation. A control data segment 3530 is communicated from an input port 4031 to distributor controller 4040 during a respective predetermined control time slot of duration T (FIG. 35). For example, control data segments from an input port 4031 of index j (reference 3510) are transferred to the distributor controller 4040 during a time slot of index j of each monitoring period 3520, $0 \leq j < 8$.

In each of distributor configurations of FIGS. 34, 37, 38, and 40, the data of a control segment 3530 may include a time indication at an originating access node, flow-rate-allocation requests to specified destination access nodes, and messages from the originating access node to other access nodes. The data of a content segment 3540 includes content data (payload data) in addition to an indication of a cyclic segment identifier within a monitoring period 3520.

Each upstream channel, 4011 or 4012, connects to an optical-to-electrical (O-E) converter 4010 to detect a baseband signal from a modulated optical carrier originating from a respective access node, the baseband signal containing both content data and control data. Each output baseband signal from an O-E converter 4010 is directed, through a 1:2 fanout unit 4014, to a buffer 4020 preceding an input port 4031 and to a time-alignment unit 4022 of an array of time-alignment units. Each time-alignment unit 4022 detects upstream control data (which may include a time indication at an originating access node), and forms a control data segment including receipt time according to the local time indicator 4045 collocated with distributor controller 4040. The control data segments are placed in control-data buffers 4025 to be presented to distributor controller 4040. Preferably, the upstream control data are sent regularly at a predetermined rate. Thus, the control buffers 4025 would be short buffers, each with an expected occupancy of a very small number (two, for example) of control data segments.

The distributor controller 4040 computes schedules for flow-rate allocations and generates downstream control data to be sent, together with downstream content data collected at the output ports 4032, to destination access nodes. Downstream control data from the distributor controller 4040 is distributed through an electronic temporal demultiplexer 4060 to individual 2:1 temporal multiplexers 4070. Each temporal multiplexer 4070 receives an electronic signal carrying downstream content data from a respective output port 4032 and inserts corresponding downstream control data received through the temporal demultiplexer 4060. Temporal demultiplexer 4060 cyclically supplies to the temporal multiplexers 4070 control segments directed to the destination access nodes. The output of each 2:1 electronic temporal multiplexer modulates an optical carrier in a respective electrical-to-optical (E-O) converter 4090 of an array of E-O converters coupled to downstream channels 4091 and 4092.

For each access node connecting to the electronic distributor 4000, distributor controller 4040 examines data in a respective control buffer 4025 and compares receipt time, as determined from local time indicator 4045, of each segment, or of at least one segment per monitoring period 3520, with a corresponding scheduled arrival time at the distributor. Where there is no discrepancy, or a discrepancy within a permissible value (one nanosecond, for example) is determined, the electronic distributing mechanism 4030 continues to transfer data received at a corresponding input port 4031 to output ports 4032 according to schedule. If the magnitude of the discrepancy exceeds the permissible value, the distributor controller 4040: instructs the steering controller 4035 to halt data transfer from the corresponding input port 4031; and communicates the value of the discrepancy to a respective access node through a downstream channel 4091 or 4092.

Figure 41:
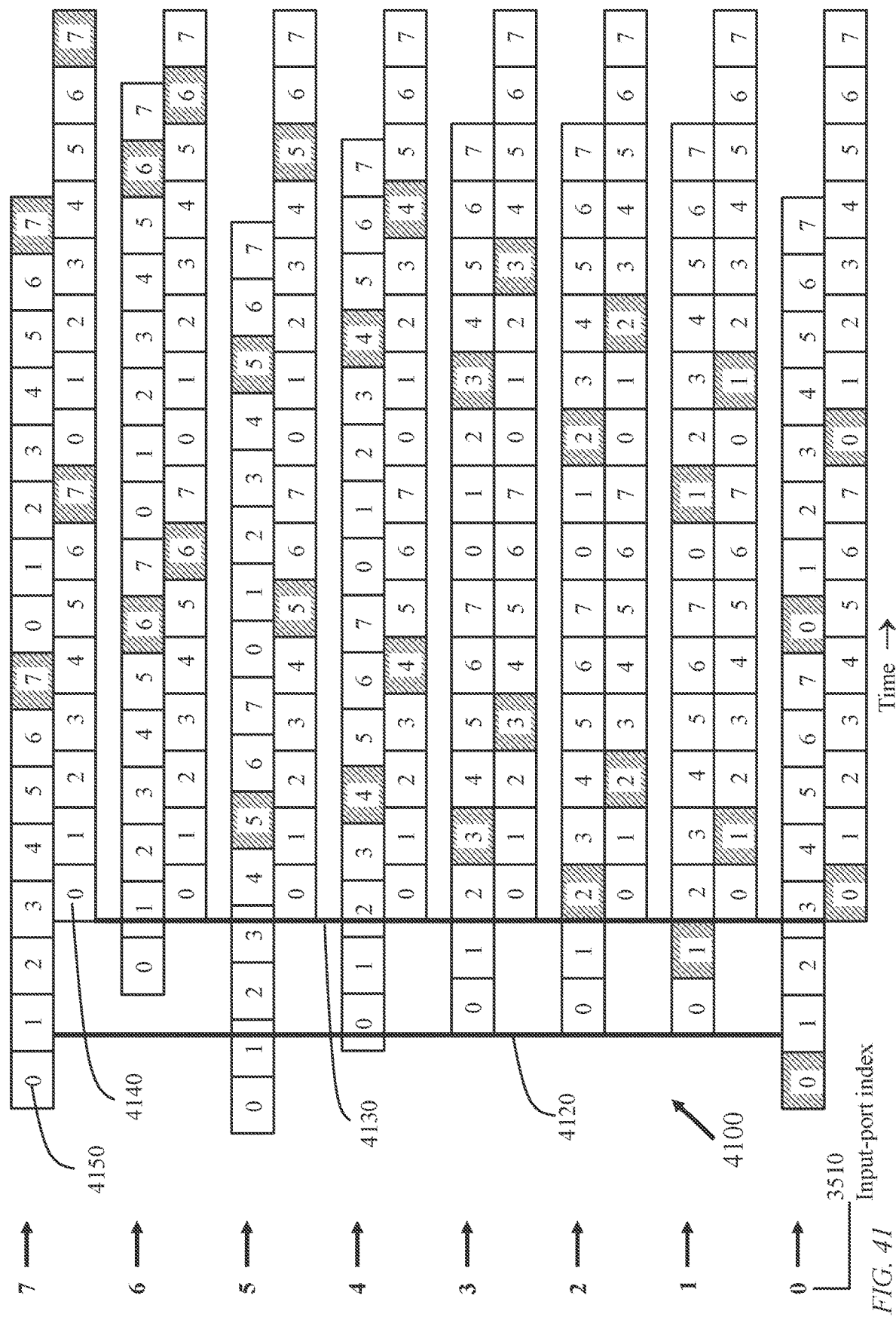
FIG. 41 illustrates an exemplary organization of a cyclic monitoring period for data transmission from access nodes to input buffers of an electronic distributor and corresponding cyclic data transfer from the input buffers to output ports of the electronic distributor.

FIG. 41 illustrates an exemplary organization 4100 of a cyclic monitoring period for data transmission from access nodes to input buffers 4020 of an electronic distributor 4000 and corresponding cyclic data transfer from the input buffers 4020 to output ports of the electronic distributor.

A major difference between the optical distributor 3400 and the electronic distributor 4000, apart from the differing distributing mechanisms 3430 and 4030, is the feasibility of using input buffers 4020 preceding input ports 4031 of the electronic distributing mechanism. To compensate for the absence of buffers in optical distributor 3400, a precise time alignment system based on timing-data exchange with subtending access nodes is employed in distributor 3400. A similar time-alignment mechanism may be used in distributor 4000 as described above. With precise time alignment, input buffers 4020 would not be needed as long as data segments from an access node are received at distributor 4000 within a permissible deviation from a respective scheduled time instant. The permissible deviation would be a small fraction of a time slot (a time slot being transfer duration of one data segment).

As described above, distributor controller 4040 computes schedules for flow-rate allocations and generates downstream control data to be sent, together with downstream content data collected at the output ports 4032, to destination access nodes. The access nodes transmit data segments to distributor 4000 according to the schedule. To permit deviation, of up to $\Delta$ time slots, of an arrival time of a data segment from a requisite scheduled arrival time, each input buffer 4020 may be operated as a circular buffer retaining at least $2 \times \Delta$ data segments. For $\Delta=2$, for example, each buffer 4020 would only retain most recent four data segments, regardless of the data-segment type. The distributor control 4040 instructs the steering controller 4035 to transfer a data from an input buffer 4020 to a respective output port 4032 after a deterministic artificial time delay, from a scheduled arrival time, of A time slots, regardless of the actual arrival time. As illustrated in FIG. 41, the difference between a designated start time 4130 of data transfer from input buffers 4020 to output ports 4032 and a designated start time 4120 of cyclic monitoring period 3520 (FIG. 35) is $\Delta$ time slots; $\Delta=2$ in the example of FIG. 41.

As indicated, data transmitted from access nodes, during a monitoring period, through upstream channels directed to input ports 4031 of indices 1, 2, and 3 arrived at scheduled start time 4120. The distributing mechanism 4030 starts to transfer individual data segments to respective output ports 4032 after an artificial delay of A time slots (two time slots in this case). At the instant of time of data-segment transfer through the electronic distributor, each of input buffers 4020(1), 4020(2), and 4020(3) would hold exactly two data segments.

Data transmitted from an access node, during a monitoring period, through upstream channels directed to input port 4031 of index 0 arrived earlier than the scheduled start time 4120. The distributing mechanism 4030 starts to transfer individual data segments to respective output ports 4032 after an artificial delay of $\Delta$ time slots. At the instant of time of data-segment transfer through the electronic distributor, input buffer 4020(0) would hold three data segments, and a fraction of a fourth data segment. With the input buffer 4020(0) configured to hold four data segments, the received data segment corresponding to each transfer time slot would be still available (i.e., not overwritten) in buffer 4020(0).

Likewise, data transmitted from access nodes, during a monitoring period, through upstream channels directed to input ports 4031 of indices 5 and 7 arrived earlier than the designated arrival time 4120 but were present in respective input buffers 4020(5) and 4020(7) at respective transfer times to output ports 4032.

Data transmitted from access nodes, during a monitoring period, through upstream channels directed to input port 4031 of indices 4 and 6 arrived after the scheduled start time 4120 but before designated transfer time 4130. The distributing mechanism 4030 starts to transfer individual data segments to respective output ports 4032 after an artificial delay of A time slots of the designated arrival time 4120 not the actual arrival time. At the instant of time of data-segment transfer through the electronic distributor, input buffers 4020(4) and 4020(6) would each hold a respective sought data segment.

FIG. 42 illustrates a second configuration 4200 of an electronic distributor comprising an electronic distributing mechanism 4230, a set of input ports 4231, a set of output ports 4232, a local time indicator 3445, a steering controller 4235, and a distributor controller 4240. The steering controller 4235 directs data from an input port 4231 to an output port 4232 according to instructions from the distributor controller 4240.

A set 4011 of upstream channels from a first set of access nodes connects to a first set of 1:2 fan-out units 4224. A set 4012 of upstream channels from a second set of access nodes connects to a second set of 1:2 fan-out units 4224. Each 1:2 fan-out unit connects to temporal multiplexer 4226 and an input buffer 4228 of an input port 4231. The temporal multiplexer 4226 cyclically connects output data from the 1:2 fan-out units 4224 to distributor controller 4240 during designated control time slots within each monitoring period 3520.

Each upstream channel 4011 or 4012 carries an optical signal from a respective access node 120 modulated with upstream data organized into periodic monitoring periods 3520 as illustrated in FIG. 35. Each monitoring period 3520 is organized into content time slots and at least one control time slot. The data of a control segment 3530, communicated during a control time slot, may include: a time indication at originating access node, flow-rate-allocation requests to specified destination access nodes, and messages from an originating access node to other access nodes. The data of a content segment 3540 includes content data (payload data) in addition to an indication of a cyclic segment identifier (0 to (p−1)) within a monitoring period 3520.

A set 4091 of downstream channels directed to the first set of access nodes connects to a first set of electrical-to-optical converters 4285. A set 3492 of downstream channels directed to the second set of access nodes connects to a second set of electrical-to-optical converters 4285. Each electrical-to-optical converter 4285 receives output of a 2:1 temporal multiplexer 4280. Each 2:1 temporal multiplexer receives content data from an output port 4232 and control data from distributor controller 4240 through temporal demultiplexer 4270.

The distributor controller 4240 examines a portion of the output signal of temporal multiplexer 4226 during each reference time slot of the monitoring period to detect an index of a segment, which may be a control segment 3530 or a content segment 3540, and a displacement of the start time of the segment from the start time of a corresponding reference time slot as described above with reference to FIG. 37. For a reference time slot of index x, $0 \le x < p$, a detected index y, $0 \le y < p$, and a displacement $\varepsilon$, the temporal discrepancy of a received signal directed to an input port 4231 of index x is determined as: $\theta_j = (y - x - \varepsilon)$. If the magnitude of $\theta j$ exceeds the predefined permissible value (a small fraction of time-slot duration T), an access node originating the signal is instructed to adjust transmission time; adding a delay of: $\theta_j$, if $\theta_j > 0.0$; or $(p \times T + \theta_j)$, otherwise.

FIG. 43 illustrates a third configuration 4300 of an electronic distributor comprising an electronic distributing mechanism 4330, a set of input ports 4331 connecting to upstream channels 4011 and 4012, a set of output ports 4332 connecting to downstream channels 4091 and 4092, an input port 4333 (downstream control port) connecting to output of distributor controller 4340, an output port 4334 (upstream control port) connecting to input of distributor controller 4340, a steering controller 4335, and a distributor controller 4340.

As in configurations 4000 and 4200, a local time indicator 3445 is used for temporal alignment of upstream signals.

The steering controller 4335 directs data from input ports 4331 to output ports 4332 according to instructions from the distributor controller 4340. Additionally, steering controller 4335 cyclically directs upstream control signals from input ports 4331 to output port 4334 (upstream control port), which connects to distributor controller 4340, and cyclically directs downstream control signals from input port 4333 (downstream control port), which connects to distributor controller 4340, to output ports 4332. Thus, rather than using temporal multiplexer 4226 and temporal demultiplexer 4270 of the configuration of FIG. 42, the upstream control signals are communicated from input ports 4331 to the distributor controller 4340 and the downstream control signals are communicated from the distributor controller 4340 to the output ports 4332 through the distributing mechanism 4330.

Each of distributor controllers 4240 and 4340 comprises a respective set of hardware processors and memory devices storing software instructions causing the respective set of processors to perform control functions including scheduling paths establishment, through a respective distributing mechanism, and exchanging control messages with access nodes connecting to the respective distributing mechanism.

As described in U.S. Pat. No. 11,356,240, each upstream signal originating from an access node is organized into content segments and control segments with each control segment and each content segment including a front segment-marker and a back segment-marker. Each of the two signal markers of a segment includes a segment index to identify the segment. As illustrated in FIGS. 21 to 24 and 46 to 49, each input port of a distributors is coupled to an upstream channel emanating from an output port of a respective access node. Thus, the originating access node of an upstream signal received at a particular input port of a distributor is known. However, an identifier of an originating access node may also be included in the two signal markers.

For each of the four implementations of distributors of FIGS. 34, 37, 38, 40, 42, and 43, in order to time-align an output port of a particular access node to a distributor to which the output port connects, each upstream optical signal originating from the particular access node is organized into segments, including content segments and control segments, each segment occupying a time slot of a predefined duration. Each segment contains two identical identifiers of the particular access node starting at designated time instants within a respective time slot. The distributor controller is configured to: extract one of the two identical identifiers during a respective designated control time slot; determine an arrival time of the extracted identifier according to the time indicator; and determine a magnitude of discrepancy between the arrival time and a respective designated time instant.

If the magnitude of discrepancy exceeds a prescribed threshold, the distributor controller communicates a value of the discrepancy to the particular access node to adjust transmission time accordingly.

Access-Node Connectivity

Figure 44:
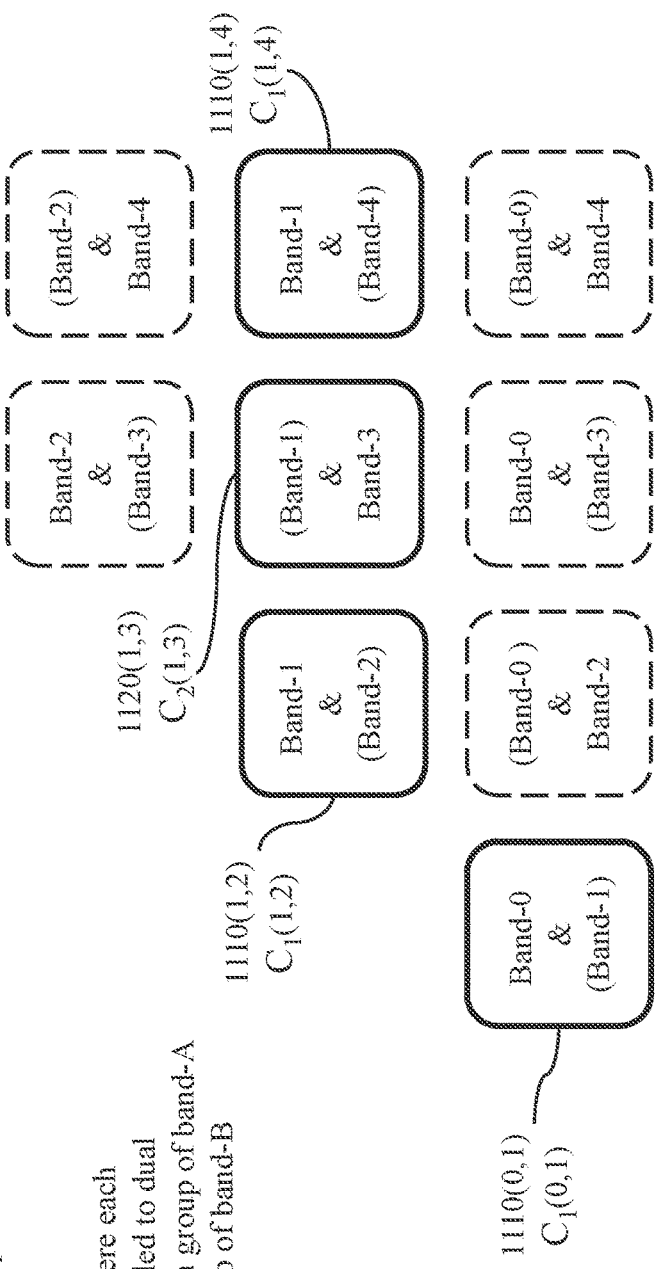
FIG. 44 illustrates a network comprising access nodes arranged in five bands (Π=5) interconnected through 10 constellations.

FIG. 44 illustrates a network 4400 comprising access nodes arranged in Π bands interconnected through a plurality of constellations 4460 where Π=5. The bands are denoted Band-0 to band-4. Each pair of bands connects to a respective constellation of a total of (Π×(Π−1))/2 constellations (10 constellations: $C_1(0,1)$, $C_1(0,3)$, $C_1(1,2)$, $C_1(1,4)$, $C_1(2,3)$, $C_1(3,4)$, $C_2(0,2)$, $C_2(0,4)$, $C_2(1,3)$, $C_2(2,4)$).

Each band connects to (Π−1) constellations. With Π selected to be an odd number, each band connects to $\pi_1=(\Pi-1)/2$ constellations according to the first mode (type-1 formations of access nodes) and $\pi_2$ constellations ($\pi_2=\pi_1$) constellations according to the second mode (type-2 formations of access nodes).

Each constellation comprises $\Omega^2$ distributors, $\Omega$ being the number of groups per band. The constellation of FIG. 22 interconnects two bands denoted P and R, $0 \le P < R < \Pi$, where band-P connects according to the first mode and band-R connects according to the second mode. The constellation of FIG. 23 interconnects the two bands with band-P connecting according to the second mode and band-R connecting according to the first mode.

Each access node of the plurality of access nodes connects to each constellation of a selected set of (Π−1) constellations through a respective dual link of Ω dual channels, where each dual channel connects an access dual port of an access node to a dual port of a respective distributor of a constellation.

Each dual channel connecting an access dual port of an access node to a distributor dual port of a distributor comprises an upstream channel from the access dual port to the distributor dual port and a downstream channel from the distributor dual port to the access dual port. The access dual port is time aligned to the distributor dual port along the upstream channel.

Figure 45:
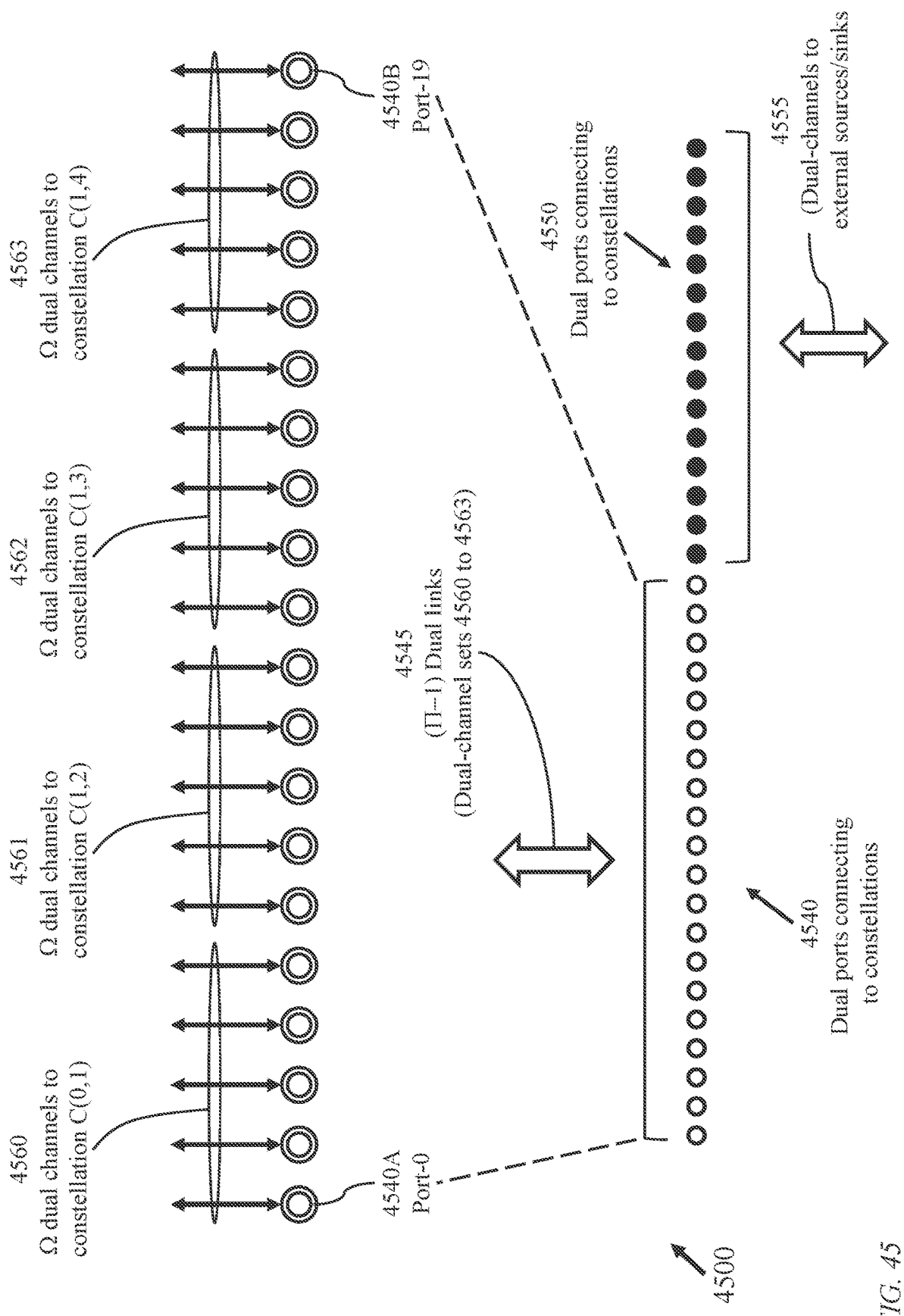
FIG. 45 illustrates division of dual ports of an access node into inner dual ports connecting to respective constellations and outer dual ports connecting to data sources and sinks.

FIG. 45 illustrates partitions 4500 of dual ports of an access node into inner dual ports 4540 connecting to respective constellations and outer dual ports 4550 connecting to external data sources and sinks.

Each access node connects to each constellation of a respective subset of (Π−1) constellations, of the total of (Π×(Π−1))/2 constellations, through a dual links 4545 of Ω dual channels. For Ω=5, and Ω=5, the total number of inner ports is Ω×(Π−1), indexed sequentially as 0 to 19.

Consider a selected access node (P, 1, 2), belonging to group 1 of band P, with P=1. Band-1 connects to constellations $C_1(1,2)$ and $C_1(1,4)$ according to the first mode and connects to constellations $C_1(0,1)$ and $C_2(1,3)$ according to the second mode ($\pi_1=2$ and $\pi_2=2$).

A dual link comprising a set 4560 of Ω dual channels coupled to inner ports 4540 of indices 0 to 4 is directed to constellation $C_1(0,1)$ of network 4400.

A dual link comprising a set 4561 of Ω dual channels coupled to inner ports 4540 of indices 5 to 9 is directed to constellation $C_1(1,2)$ of network 4400.

A dual link comprising a set 4562 of Ω dual channels coupled to inner ports 4540 of indices 10 to 14 is directed to constellation $C_2(1,3)$ of network 4400.

A dual link comprising a set 4563 of Ω dual channels coupled to inner ports 4540 of indices 15 to 19 is directed to constellation $C_1(1,4)$ of network 4400.

Thus, each access node of the plurality of access nodes comprises dual inner ports connecting to distributors of selected (Π−1) constellations and dual outer ports connecting to data sources and data sinks through outer dual channels. The dual inner ports connect to the (Π−1) constellations though respective (Π−1) dual links of Ω dual channels each. The collective capacity of the outer dual channels is determined according to a total capacity of the (Π−1) dual links and a predetermined dilation factor.

Each inner dual port of an access node is designated to connect to a respective constellation. Each access node of the plurality of access nodes comprises an access controller configured to determine for each inner dual port of an access node an identifier of a respective constellation.

Figure 46:
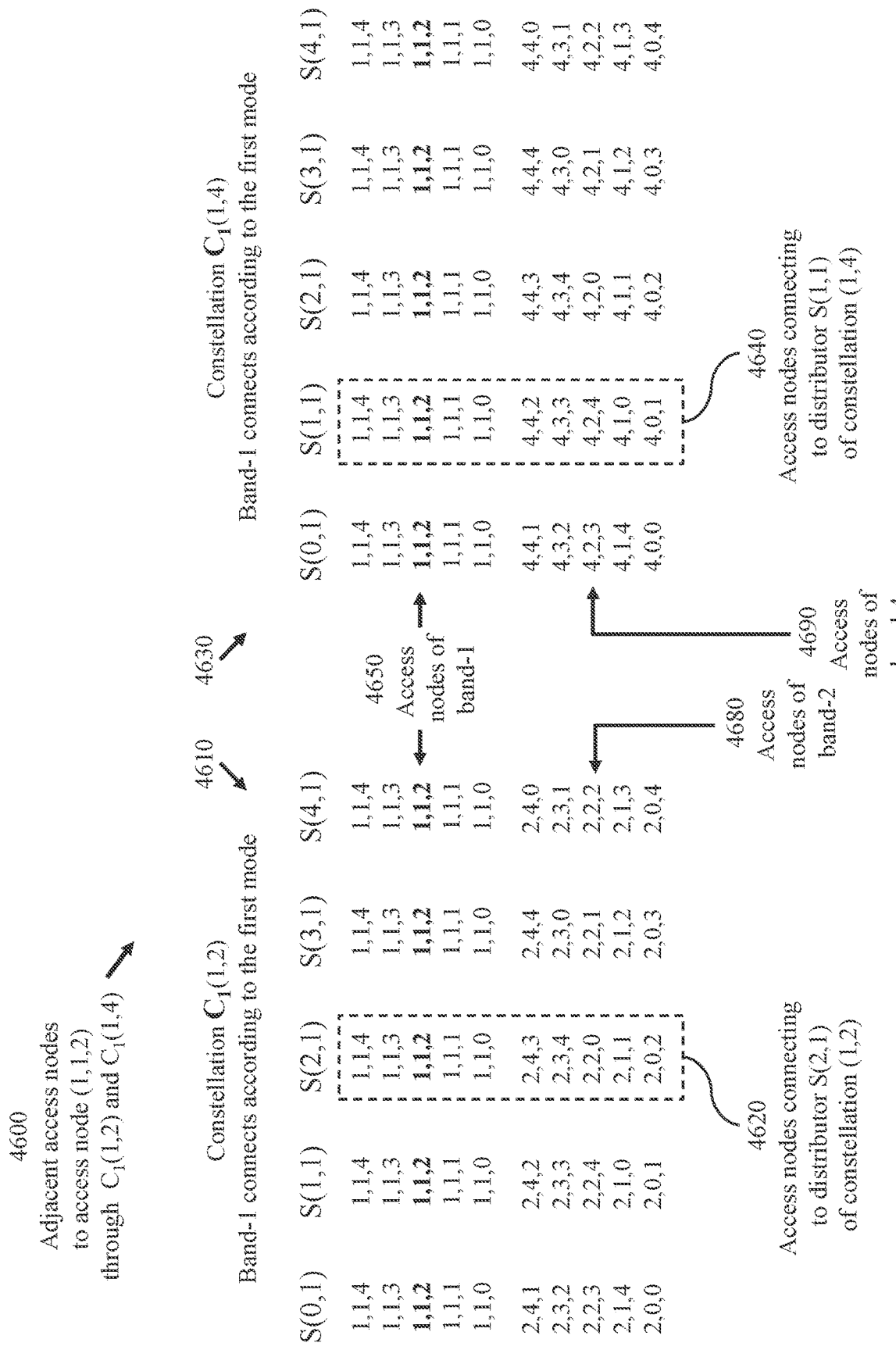
FIG. 46 illustrates adjacent access nodes of a specific access node, in a configuration of five bands of access nodes each band comprising five access groups, comprising access nodes of the same group of the specific access node and access nodes belonging to bands other than the band of the specific access node.

FIG. 46 lists adjacent access nodes 4600 to the selected access node (1,1,2), through two constellations $C_1(1,2)$ and $C_1(1,4)$, in the configuration of FIG. 44 having five bands of access nodes each band comprising five access groups. (Two access nodes are said to be adjacent if interconnected through a path traversing only one distributor.) The adjacent nodes comprise access nodes of the same group of the selected access node and access nodes belonging to bands other than the band of the selected access node. The list of adjacent access nodes is derived from the connectivity illustrated in FIG. 22 which applies to constellations $C_1(1,2)$ and $C_1(1,4)$, since band-1 connects according to the first mode in the two constellations.

Access nodes 4610 connect to constellation $C_1(1,2)$.
Access nodes 4620 connect to distributor S(2,1) of $C_1(1,2)$.
Access nodes 4630 connect to constellation $C_1(1,4)$.
Access nodes 4640 connect to distributor S(1,1) of $C_1(1,4)$.
Access nodes 4650, belonging to band-1, connect to $C_1(1,2)$ and $C_1(1,4)$.
Access nodes 4680, of band-2, connect to $C_1(1,2)$.
Access nodes 4690 of band-4 connect to $C_1(1,4)$.

Figure 47:
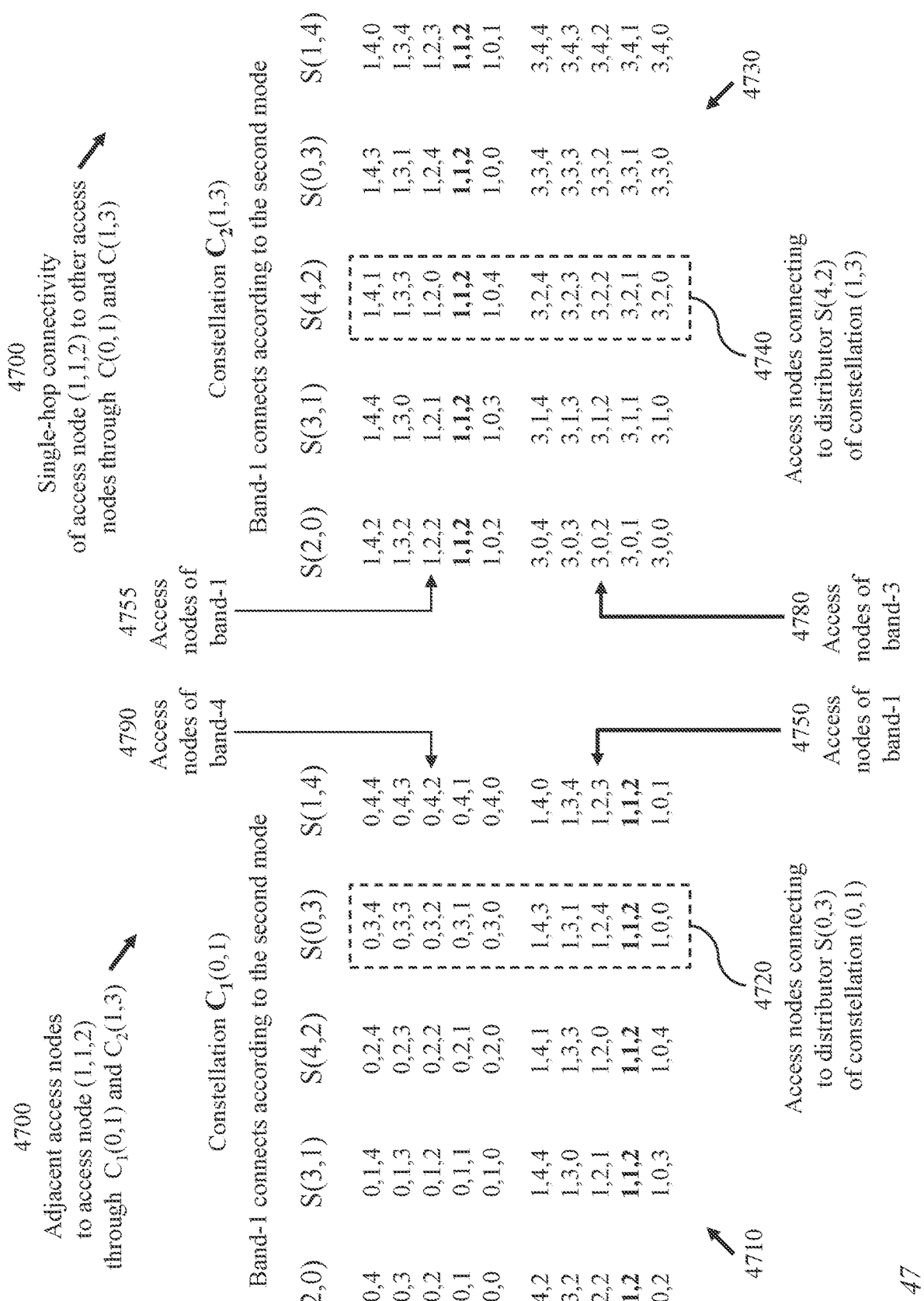
FIG. 47 illustrates adjacent access nodes of the specific access node of FIG. 46 comprising access nodes of the same band of the specific access node and access nodes belonging to bands other than the band of the specific access node.

FIG. 47 lists adjacent access nodes 4700 to the selected access node (1,1,2), through two constellations $C_1(0,1)$ and $C_2(1,3)$, in the configuration of FIG. 44 having five bands of access nodes each band comprising five access groups. The adjacent nodes comprise access nodes of the same group of the selected access node and access nodes belonging to bands other than the band of the selected access node. The list of adjacent access nodes is derived from the connectivity illustrated in FIG. 23 which applies to constellations $C_1(0,1)$ and $C_2(1,3)$ since band-1 connects according to the second mode in the two constellations.

Access nodes 4710 connect to constellation $C_1(0,1)$.
Access nodes 4720 connect to distributor S(0,3) of $C_1(0,1)$.
Access nodes 4730 connect to constellation $C_2(1,3)$.
Access nodes 4740 connect to distributor S(4,2) of $C_2(1,3)$.
Access nodes 4750 of band-1 connect to $C_1(0,1)$.
Access nodes 4755 band-1 connect to $C_2(1,3)$.
Access nodes 4780 band-3 connect to $C_2(1,3)$.
Access nodes 4790 of band-0 connecting to $C_1(0,1)$.

Figure 48:
FIG. 48 illustrates adjacent access nodes to the specific access node accessible from each dual port of the specific access node, the adjacent access nodes comprising access nodes of the same band of the specific access node and access nodes of the same group of the specific access node.

FIG. 48 illustrates adjacent access nodes 4800 to the selected access node (1,1,2) accessible from each dual port of access node (1,1,2), the adjacent access nodes comprising access nodes of the same group of specific access node (1,1,2) and access nodes of other groups of the same band of access node (1,1,2). Access node (1,1,2) has $\pi_1 \times \Omega$ single-hop paths ($\pi_1=2$, $\Omega=5$) to each access node of the same group. For example, access node (1,1,2) and access node (1,1,4) connect to 10 distributors through 10 dual ports {Port-0 to Port-9}. Access node (1,1,2) has $\pi_2$ single-hop paths ($\pi_2=2$) to each access node belonging to other groups of the same band. Access node (1,1,2) and access node (1,4,2) connect to 2 distributors through 2 dual ports {Port-10 and Port-15}.

Figure 49:
FIG. 49 illustrates adjacent access nodes to the specific access node accessible from each dual port of the specific access node, the adjacent access nodes belonging to bands other than the band of the specific access node.

FIG. 49 lists adjacent access nodes 4900 to selected access node (1,1,2) accessible from each dual port of the specific access node, the adjacent access nodes 4900 belonging to bands other than band-1 of access node (1,1,2). Each band comprises $\Omega$ groups, and each group comprises a respective number of access nodes not exceeding a predetermined upper bound. In the illustrated example, each group is considered to contain five access nodes, hence, with $\Omega=5$, each band comprises 25 access nodes. FIG. 49 lists access nodes belonging to band-0, band-2, band-3, and band-4. The access nodes accessible from each of Port-0 to Port-19 are listed.

The invention is defined in the claims.

The invention claimed is:

1. A contiguous network comprising:
   a plurality of access nodes arranged into $\Pi$ bands, each band comprising $\Omega$ groups, each group comprising a respective number of access nodes, $\Pi>4$, $\Omega>2$, said each band arranged into:
      a first arrangement of $\Omega$ type-1 formations each comprising $\Omega$ identical type-1 sets of access nodes of a respective group; and
      a second arrangement of $\Omega$ type-2 formations each comprising $\Omega$ type-2 sets of access nodes, each type-2 set comprising one access node of each group of said each band selected so that:
         the type-2 sets of each type-2 formation are disjoint; and
         each type-2 set of each type-2 formation is orthogonal to each type-2 set of each other type-2 formation, having at most a predefined number of common access node;
   and
   a plurality of distributors arranged into a plurality of constellations, each constellation comprising $\Omega^2$ distributors;
   each pair of bands connecting to a respective constellation so that each type-1 set of each type-1 formation of one band and a respective type-2 set of a respective type-2 formation of other-band of said each pair connect to a respective distributor of said respective constellation;
   wherein said each band connects according to said first arrangement to at least one constellation and at most ($\Pi-2$) constellations;
thereby, the network provides multiple parallel single-hop paths for each pair of access nodes belonging to a same band and one single-hop path for each pair of access nodes belonging to different bands.

2. The contiguous network of claim 1 wherein:
   said respective type-2 formation is any of $\Omega$ type-2 formations of said other-band; and
   said respective type-2 set is any of $\Omega$ type-2 sets of said respective type-2 formation.

3. The contiguous network of claim 1 wherein each access node of said plurality of access nodes connects to each constellation of selected ($\Pi-1$) constellations through a respective dual link of $\Omega$ dual channels, each dual channel of which connecting an access dual port of said each access node to a distributor dual port of a respective distributor of said each constellation.

4. The contiguous network of claim 3 wherein:
   said each dual channel comprises an upstream channel from said access dual port to said distributor dual port and a downstream channel from said distributor dual port to said access dual port; and
   said access dual port is time aligned to said distributor dual port along said upstream channel.

5. The contiguous network of claim 1 wherein each access node of said plurality of access nodes is configured to:
   connect to each constellation of selected ($\Pi-1$) constellations through a respective inner dual link of $\Omega$ inner dual channels; and
   connect to a plurality of data sources and data sinks through a plurality of outer dual channels;
wherein the collective capacity of said plurality of outer dual channels is determined according to a total capacity of a number ($\Pi-1$)×$\Omega$ of said inner channels and a predetermined dilation factor.

6. The contiguous network of claim 1 further comprising a global controller coupled to a selected access node of said plurality of access nodes.

7. The contiguous network of claim 1 wherein each distributor of said plurality of distributors comprises a respective distributing mechanism and a respective distributor controller configured to schedule paths through said respective distributing mechanism including a path from an upstream channel from a selected access node coupled to said each distributor to a downstream channel to said selected access node; thereby enabling said selected access node to test a round-trip path through said each distributor.

8. The contiguous network of claim 1 wherein each access node of said plurality of access node comprises:
   a plurality of inner dual ports each designated to connect to a respective constellation; and
   an access controller configured to determine for each inner dual port an identifier of a constellation to which said each inner dual port connects.

9. The contiguous network of claim 1 wherein said predefined number is a rounded-up ratio of an upper bound of said respective number of access nodes and said number, $\Omega$, of groups per band.

10. The contiguous network of claim 3 wherein an access node of index $\nu$ within a group of index $\gamma$ of a band of index $\beta$, $0 \leq \nu < M(\beta,\gamma)$, $0 \leq \gamma < \Omega$, $0 \leq \beta < \Pi$, $M(\beta,\gamma)$ denoting a predetermined number of access nodes within a group of index $\gamma$ of a band of index $\beta$, is allocated to $\Omega$ type-1 sets of indices $\rho$, $0 \leq \rho < \Omega$, of a type-1 formation of index $\gamma$, wherein said $\Pi$ bands are indexed sequentially between 0 and ($\Pi-1$), groups within any band are indexed sequentially between 0 and ($\Omega-1$), and access nodes within a group are indexed sequentially in steps of 1.

11. The contiguous network of claim 3 wherein an access node of index $\nu$ within a group of index $\gamma$ of a band of index $\beta$, is allocated to $\Omega$ type-2 sets of indices $(\nu+\gamma\times\chi)_{modulo\ \Omega}$, $\chi$ being an index of a type-2 formation, $0 \leq \chi < \Omega$, where $0 \leq \nu < M(\beta,\gamma)$, $0 \leq \gamma < \Omega$, $0 \leq \beta < \Pi$, $M(\beta,\gamma)$ denoting a predetermined number of access nodes within a group of index $\gamma$ of a band of index $\beta$, wherein said $\Pi$ bands are indexed sequentially between 0 and ($\Pi-1$), groups within any band are indexed sequentially between 0 and ($\Omega-1$), and access nodes within a group are indexed sequentially in steps of 1.

12. The contiguous network of claim 3 wherein a type-1 set of index $\rho$ of a type-1 formation of index $\chi$, of a band of index $\beta$, $0 \leq \rho < \Omega$, $0 \leq \chi < \Omega$, $0 \leq \beta < \Pi$, comprises a number M($\beta,\gamma$) of access nodes of indices ($\beta,\gamma,\nu$) where $\gamma=\chi$, and $0\leq\nu<M(\beta,\gamma)$, $\gamma$ being a group index and $\nu$ being an access-node index, wherein said $\Pi$ bands are indexed sequentially between 0 and ($\Pi$–1), groups within any band are indexed sequentially between 0 and ($\Omega$-1), and access nodes within a group are indexed sequentially in steps of 1.

13. The contiguous network of claim 3 wherein a type-2 set of index $\rho$ of a type-2 formation of index $\chi$, of a band of index $\beta$, $0\leq\rho<\Omega$, $0\leq\chi<\Omega$, $0\leq\beta<\Pi$, comprises a number M($\beta,\gamma$) of access nodes of indices ($\beta,\gamma,\nu$), $\gamma$ being a group index and $\nu$ being an access-node index, where for each value of $\gamma$, $0\leq\gamma<\Omega$, there are (J+1) values of $\nu$ determined as:

$$((\rho-\gamma\times\chi)_{modulo\ \Omega} + J\times\Omega), 0\leq J<[M(\beta,\gamma)/\Omega],$$

wherein said $\Pi$ bands are indexed sequentially between 0 and ($\Pi$–1), groups within any band are indexed sequentially between 0 and ($\Omega$-1), and access nodes within a group are indexed sequentially in steps of 1.

14. The contiguous network of claim 1 wherein at least one distributor of said plurality of distributors comprises:
an optical distributing mechanism having a plurality of input ports and a plurality of output ports;
an optical temporal multiplexer;
an optical temporal demultiplexer;
a distributor controller;
a time indicator;
a plurality of optical splitters, each optical splitter directing an upstream optical signal, organized into segments, each segment occupying a time slot of a predefined duration, originating from a respective access node to:
a respective input port; and
said optical temporal multiplexer configured to cyclically connect the plurality of optical splitters to the distributor controller, during designated time slots, through an optical-to-electrical converter;
a plurality of optical combiners cyclically connecting to said distributor controller through said optical temporal demultiplexer, each optical combiner for inserting a respective downstream message from said distributor controller into a respective downstream signal directed from a respective output port to a corresponding access node.

15. The contiguous network of claim 14 wherein said each segment contains two identical identifiers of said respective access node, said distributor controller being configured to:
extract a single access-node identifier during each said designated time slot;
determine a respective arrival time of said single access-node identifier according to said time indicator;
determine a magnitude of discrepancy between said respective arrival time and a respective designated time instant; and
where said magnitude exceeds a prescribed threshold, communicate said discrepancy to an access node of said single access-node identifier to adjust transmission time to said at least one distributor accordingly.

16. The contiguous network of claim 1 wherein at least one distributor of said plurality of distributors comprises:
an optical distributing mechanism having:
a plurality of input ports for receiving upstream optical signals originating from respective access nodes, each upstream optical signal organized into segments, each segment occupying a time slot of a predefined duration;
a plurality of output ports for sending downstream optical signals to said respective access nodes;
an upstream control port; and
a downstream control port;
and
a distributor controller coupled to:
a steering controller;
a time indicator;
said upstream control port; and
said downstream control port;
said distributor controller configured to:
exchange control messages with said respective access nodes; and
schedule paths establishment through said optical distributing mechanism;
said steering controller configured to:
direct signals from the input ports to the output ports, through said optical distributing mechanism, according to instructions from the distributor controller;
cyclically direct upstream control signals from the input ports to the upstream control port during designated time slots; and
cyclically direct downstream control signals from the downstream control port to the output ports.

17. The contiguous network of claim 16 wherein said each segment contains two identical identifiers of a respective access node, said distributor controller being configured to:
extract a single access-node identifier during each said designated time slot;
determine a respective arrival time of said single access-node identifier according to said time indicator;
determine a magnitude of discrepancy between said respective arrival time and a respective designated time instant; and
where said magnitude exceeds a prescribed threshold, communicate said discrepancy to an access node of said single access-node identifier to adjust transmission time to said at least one distributor accordingly.

18. The contiguous network of claim 1 wherein at least one distributor of said plurality of distributors comprises:
an electronic distributing mechanism having a plurality of input ports and a plurality of output ports;
a plurality of fan-out units;
an electronic temporal multiplexer;
an electronic temporal demultiplexer;
a distributor controller;
a time indicator;
a plurality of optical-to-electrical converters for detecting baseband signals from upstream optical signals received from a number of access nodes, each upstream optical signal organized into segments, each segment occupying a time slot of a predefined duration, each optical-to-electrical converters coupled to a respective fan-out unit connecting to:
a buffer preceding a respective input port; and
said electronic temporal multiplexer to cyclically connect the plurality of fan-out units to the distributor controller, during designated time slots;
a plurality of 2:1 temporal multiplexers cyclically connecting to said distributor controller through said electronic temporal demultiplexer, each 2:1 temporal multiplexers for inserting, during a respective control time slot, a respective control message from said distributor controller into a respective downstream signal directed from a respective output port to a respective access node.

19. The contiguous network of claim 18 wherein said each segment contains two identical identifiers of a respective access node, said distributor controller being configured to:
- extract a single access-node identifier during each said designated time slot;
- determine a respective arrival time of said single access-node identifier according to said time indicator;
- determine a magnitude of discrepancy between said respective arrival time and a respective designated time instant; and
- where said magnitude exceeds a prescribed threshold, communicate said discrepancy to an access node of said single access-node identifier to adjust transmission time to said at least one distributor accordingly.

20. The contiguous network of claim 1 wherein at least one distributor of said plurality of distributors comprises:
- a plurality of optical-to-electrical converters for detecting baseband signals from upstream optical signals received from a number of access nodes, each upstream optical signal organized into segments, each segment occupying a time slot of a predefined duration;
- a plurality of input buffers each for holding a portion of a respective baseband signal;
- an electronic distributing mechanism having:
  - a plurality of input ports each coupled to a respective input buffer;
  - a plurality of output ports each coupled to a respective electrical-to-optical converter coupled to a respective downstream optical channel to a respective access node;
  - an upstream control port; and
  - a downstream control port;
- a distributor controller coupled to:
  - a steering controller;
  - a time indicator
  - said upstream control port; and
  - said downstream control port;
- said distributor controller configured to:
  - exchange control messages with said number of access nodes; and
  - schedule paths establishment through said electronic distributing mechanism;
- said steering controller configured to:
  - direct signals from the input ports to the output ports, through said electronic distributing mechanism, according to instructions from the distributor controller;
  - cyclically direct upstream control signals from the input ports to the upstream control port during designated time slots; and
  - cyclically direct downstream control signals from the downstream control port to the output ports.

21. The contiguous network of claim 20 wherein said each segment contains two identical identifiers of a respective access node, said distributor controller being configured to:
- extract a single access-node identifier during each said designated time slot;
- determine a respective arrival time of said single access-node identifier according to said time indicator;
- determine a magnitude of discrepancy between said respective arrival time and a respective designated time instant; and
- where said magnitude exceeds a prescribed threshold, communicate said discrepancy to an access node of said single access-node identifier to adjust transmission time to said at least one distributor accordingly.

* * * * *